US008562720B2

(12) United States Patent
Stutzman et al.

(10) Patent No.: US 8,562,720 B2
(45) Date of Patent: Oct. 22, 2013

(54) METHOD OF REDUCING SILICOSIS CAUSED BY INHALATION OF SILICA-CONTAINING PROPPANT, SUCH AS SILICA SAND AND RESIN-COATED SAND, AND APPARATUS THEREFOR

(71) Applicants: Scott S. Stutzman, Indiana, PA (US); Robert Sean Reininger, Nolensville, TN (US); David S. Balthaser, Indiana, PA (US)

(72) Inventors: Scott S. Stutzman, Indiana, PA (US); Robert Sean Reininger, Nolensville, TN (US); David S. Balthaser, Indiana, PA (US)

(73) Assignee: Proppant Controls, LLC, Nolensville, TN (US)

( * ) Notice: Subject to any disclaimer, the term of this patent is extended or adjusted under 35 U.S.C. 154(b) by 0 days.

(21) Appl. No.: 13/836,108

(22) Filed: Mar. 15, 2013

(65) Prior Publication Data

US 2013/0233439 A1 Sep. 12, 2013

Related U.S. Application Data

(63) Continuation-in-part of application No. 13/416,256, filed on Mar. 9, 2012, and a continuation-in-part of application No. 13/606,913, filed on Sep. 7, 2012.

(60) Provisional application No. 61/786,274, filed on Mar. 14, 2013.

(51) Int. Cl.
*B01D 45/00* (2006.01)

(52) U.S. Cl.
USPC .................... 95/272; 95/273; 55/356; 55/467

(58) Field of Classification Search
USPC ............................... 55/356, 467; 95/272, 273
See application file for complete search history.

(56) References Cited

U.S. PATENT DOCUMENTS

| | | | | |
|---|---|---|---|---|
| 5,183,086 | A * | 2/1993 | Fanta et al. | 141/10 |
| 5,840,102 | A * | 11/1998 | McCracken | 95/268 |
| 6,887,290 | B2 * | 5/2005 | Strauser et al. | 55/283 |
| 2012/0304860 | A1 * | 12/2012 | Matson | 95/273 |

* cited by examiner

*Primary Examiner* — Dung H Bui
(74) *Attorney, Agent, or Firm* — Nils H. Ljungman & Associates

(57) ABSTRACT

A method of reducing silicosis caused by inhalation of silica-containing proppant, such as silica sand and resin-coated silica sand, and apparatus therefor. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

17 Claims, 71 Drawing Sheets

METHOD OF REDUCING SILICOSIS CAUSED BY INHALATION OF SILICA-CONTAINING PROPPANT, SUCH AS SILICA SAND AND RESIN-COATED SAND, AND APPARATUS THEREFOR

CONTINUING APPLICATION DATA

This application is a Continuation-In-Part application of U.S. patent application Ser. No. 13/416,256, filed on Mar. 9, 2012, which claims priority to U.S. Provisional Patent Application 61/451,435, filed Mar. 10, 2011, and U.S. Provisional Patent Application 61/590,233, filed Jan. 24, 2012, and U.S. Provisional Patent Application 61/601,875, filed Feb. 22, 2012. This application is also a Continuation-In-Part application of U.S. patent application Ser. No. 13/606,913, filed on Sep. 7, 2012. This application additionally claims priority to U.S. Provisional Patent Application 61/786,274, filed Mar. 14, 2013.

BACKGROUND

1. Technical Field

The present application relates to a method of reducing silicosis caused by inhalation of silica-containing proppant, such as silica sand and resin-coated silica sand, and apparatus therefor.

2. Background Information

Hydraulic fracturing is the propagation of fractures in a rock layer, which process is used by oil and gas companies in order to release petroleum, natural gas, coal seam gas, or other substances for extraction. The hydraulic fracturing technique is known in the oil and gas industry as “fracking” or “hydrofracking.” In hydraulic fracturing, a proppant is used to keep the fractures open, which proppant is often a silica-containing material, such as silica sand and resin-coated silica sand. Many tons of proppant are used at a fracking site, thereby exposing workers to inhalation of silica dust, which can lead to a lung disease known as silicosis, or Potter’s rot. Silicosis is a form of occupational lung disease caused by inhalation of crystalline silica dust, and is marked by inflammation and scarring in forms of nodular lesions in the upper lobes of the lungs. It is a type of pneumoconiosis, or lung disease caused by the inhalation of dust, usually from working in a mining operation.

When preparing proppant for use in hydraulic fracturing, large amounts of dust, such as silica dust and other proppant dust, are created by the movement of proppants. This dust can produce potential detrimental effects, such as contaminating atmospheric air, creating a nuisance to adjacent landowners, and damaging equipment on the hydraulic fracturing site. A significant concern, as discussed above, is the inhalation of silica dust or other proppant dust, which can lead to lung conditions such as silicosis and other specific forms of pneumoconiosis.

Hydraulic fracturing jobs use a large amount of proppant, often as much as 15,000 tons. This large quantity of proppant is brought in by pneumatic tankers and then blown into proppant storage trailers known as “mountain movers,” “sand hogs” or “sand kings.” Some well-known storage devices of this type have been developed by Halliburton (headquartered in Houston, Tex. and Dubai, UAE), such as the Model FSR-2500 Mountain Mover®. This particular model is capable of storing 2,500 cubic feet of proppant in five individual compartments consisting of two 560 cubic feet compartments and three 460 cubic feet compartments. The FSR-2500 has a length of 48 feet, width of 8.5 feet, height of 13.5 feet, and a total weight of 51,400 pounds. Other storage devices of this type are the Sand King 3000 and the Sand King 4000 developed by Convey-All Industries, 130 Canada Street, Winkler, Manitoba, Canada R6W 4B7. The Model FSR-2500 Mountain Mover®, Sand King 3000, and the Sand King 4000, and the technical data relating thereto, are hereby incorporated by reference as if set forth in their entirety herein, except for the exceptions indicated herein. The dimensions and weight of such storage trailers may require a permit for transport, depending on the states, territories, or countries in which the storage trailers are to be transported. For example, U.S. federal rules require that gross vehicle weight be no more than 80,000 pounds, and that the overall vehicle length be no longer than 65 feet, or 75 feet, depending on the type of connection between the tractor and the trailer. Such storage trailers are generally designed such that the gross vehicle weight and overall vehicle length during transport is less than the federal limit. The motor vehicle codes relating to trucks and/or trailers of the various states, provinces, and/or territories in which such motor vehicle codes are utilized, are hereby incorporated by reference as if set forth in their entirety herein, except for the exceptions indicated herein.

Other types of proppant storage devices can be used as an alternative to proppant storage trailers. Such storage devices could be pre-filled with proppant, either by dumping proppant into the storage devices or by pneumatically conducting proppant into the storage devices, and then delivered to a hydraulic fracturing work site. Such storage devices could be in the form of stationary containers, hoppers, or bins, and could be placed directly over a conveyor or belt conveyor which conveys proppant to a proppant mixer or blender. The storage devices have dispensing openings or ports which can be opened to release the proppant onto the conveyor.

The storage trailers discussed above generally have access doors on top which vent the incoming air to the atmosphere. The flow of air creates large dust clouds, such as silica dust clouds, which blow out of the access doors, which can be especially problematic for workers who are looking into the interior of the storage trailers to monitor the proppant fill level. The proppant is then gravity fed onto a conveyor belt that carries the proppant to another conveyor, usually a T-belt which runs transverse to and collects the proppant from multiple storage trailers. The gravity feed of the proppant once again disturbs the proppant resulting in additional dust clouds. The T-belt then carries the proppant to be discharged into the hopper of one or more blenders, at which point the proppant is again disturbed and additional dust clouds are created. In addition, the stationary storage devices discussed above, which are an alternative to the storage trailer, also generate dust during operation. Dust can be generated by the gravity feed of proppant onto the conveyor belt. The proppant dispensed from the storage devices also must be dumped into the blender, so dust is generated there as well. In other words, whether a storage trailer is used or an alternative storage device is used to supply proppant to the T-belt or similar conveyor, proppant will always eventually be dumped into a blender hopper and will generate substantial dust during the drop off and during blending or mixing.

In summary, dust can be generated or ejected at various points at a hydraulic fracturing site, including, but not limited to, the following: 1) the access ports or doors (also known as “thief hatches”) on top of the proppant storage trailers during filling of the proppant storage trailers; 2) open filling ports in the proppant storage trailers during filling of the proppant storage trailers; 3) surrounding ground or roads; 4) transfer belts under the proppant storage trailers; 5) the transfer belt device (also known as a dragon’s tail) at the end of the proppant storage trailer; 6) transfer belts (also known as T-belts) between the proppant storage trailer or proppant storage device and the blender; and 7) the blender which mixes proppant with liquids and chemicals. To further explain, proppant storage trailers are filled under pressure by pneumatically blowing the proppant into the proppant storage trailer. Because of the pressure generated inside the proppant storage trailer, dust is ejected or propelled out of the ports or hatches located on top of the sand storage trailer, and also out of any open filling ports. Proppant storage trailers generally have two or more filling ports, each of which can be utilized simultaneously to fill a proppant storage trailer. However, if one or more of the filling ports is not in use during filling, the unused filling port(s) can essentially act as a vent, much like the top ports or hatches, and thus dust can be ejected out through the unused filling port(s). During a hydraulic fracturing process, also known as a stage, the proppant is transported from the proppant storage trailer to the blender. To do so, proppant is first dropped out through openings or valves or ports underneath the proppant storage trailer and then onto a conveyor or belt located underneath the proppant storage trailer. The act of dropping the proppant onto the belt generates dust. The proppant is then conveyed to the end of the proppant storage trailer, at which point the belt is inclined at an angle on a structure which extends from the end of the proppant storage trailer, which structure is known as a dragon's tail. The dragon's tail elevates the proppant to a position above another transport belt known as a T-belt, since the transport belt in most cases runs substantially perpendicular to the belt of the proppant storage trailer. The proppant is then dropped off of the dragon's tail and onto the T-belt. Dust is generated at the drop-off point, off of the returning conveyor belt, and at the point of impact of the proppant on the T-belt. Alternative proppant storage devices located above the T-belt also drop the proppant onto the T-belt, which can generate dust. The T-belt then conveys the proppant on a first portion thereof which is substantially parallel to the ground, and then on a second portion which is inclined at an angle. At the second portion, the T-belt elevates the proppant to a position above the hopper(s) of the blender. The proppant is then dropped off of the elevated T-belt and into the blender hopper(s). Dust is generated at the drop-off point, off of the returning T-belt, at the point of impact of the proppant in the blender hopper(s), and in the blender hopper(s) as the proppant is agitated during mixing. The preceding design and operation of the T-belt and blender is used in conjunction with either a proppant storage trailer or the alternative proppant storage device. Finally, dust which was previously generated, but has since settled on the ground and/or roadways surrounding the work site, can again become propelled into the air by vehicles driving over or on the settled dust. The generation of dust at all of these points or areas can be substantial, and the total effect can be a rather substantial or massive dust cloud covering both the work site and surrounding areas. To solve this problem, dust could be collected at the various proppant handling points, which would also in turn minimize the amount of dust on the ground for vehicles to stir up.

During this entire process, workers are often standing near or directly in the path of a cloud or airborne flow of silica dust or proppant dust. When small silica dust particles are inhaled, they can embed themselves deeply into the tiny alveolar sacs and ducts in the lungs, where oxygen and carbon dioxide gases are exchanged. The lungs cannot clear out the embedded dust by mucous or coughing. Substantial and/or concentrated exposure to silica dust can therefore lead to silicosis.

Some of the signs and/or symptoms of silicosis include: dyspnea (shortness of breath), persistent and sometimes severe cough, fatigue, tachypnea (rapid breathing), loss of appetite and weight loss, chest pain, fever, and gradual dark shallow rifts in nails which can eventually lead to cracks as protein fibers within nail beds are destroyed. Some symptoms of more advanced cases of silicosis could include cyanosis (blue skin), cor pulmonale (right ventricle heart disease), and respiratory insufficiency.

Aside from these troublesome conditions, persons with silicosis are particularly susceptible to a tuberculosis infection known as silicotuberculosis. Pulmonary complications of silicosis also include chronic bronchitis and airflow limitation (similar to that caused by smoking), non-tuberculous *Mycobacterium* infection, fungal lung infection, compensatory emphysema, and pneumothorax. There is even some data revealing a possible association between silicosis and certain autoimmune diseases, including nephritis, scleroderma, and systemic lupus erythematosus. In 1996, the International Agency for Research on Cancer (IARC) reviewed the medical data and classified crystalline silica as "carcinogenic to humans."

In all hydraulic fracturing jobs, a wellbore is first drilled into rock formations. A hydraulic fracture is then formed by pumping a fracturing fluid into the wellbore at a rate sufficient to increase pressure downhole to exceed that of the fracture gradient of the rock to be fractured. The rock cracks and the fracture fluid continues farther into the rock, thereby extending the crack or fracture. To keep this fracture open after the fluid injection stops, the solid proppant is added to the fluid. The fracturing fluid is about 95-99% water, with the remaining portion made up of the proppant and chemicals, such as hydrochloric acid, methanol propargyl, polyacrylamide, glutaraldehyde, ethanol, ethylene glycol, alcohol and sodium hydroxide. The propped fracture is permeable enough to allow the flow of formation fluids to the well, which fluids may include gas, oil, salt water, fresh water and fluids introduced during completion of the well during fracturing. The proppant is often a silica-containing material, such as sand, but can be made of different materials, such as ceramic or other particulates. These materials are selected based on the particle size and strength most suitable to handle the pressures and stresses which may occur in the fracture. Some types of commercial proppants are available from Saint-Gobain Proppants, 5300 Gerber Road, Fort Smith, Ark. 72904, USA, as well as from Santrol Proppants, 50 Sugar Creek Center Boulevard, Sugar Land, Tex. 77478, USA.

The most commonly used proppant is silica sand or silicon dioxide ($SiO_2$) sand, known colloquially in the industry as "frac sand." The frac sand is not just ordinary sand, but rather is chosen based on certain characteristics according to standards developed by the International Organization for Standardization (ISO) or by the American Petroleum Institute (API). The current ISO standard is ISO 13503-2:2006, entitled "Petroleum and natural gas industries—Completion fluids and materials—Part 2: Measurement of properties of proppants used in hydraulic fracturing and gravel-packing operations," while the API standards are API RP-56 and API RP-19C. In general, these standards require that the natural sands must be from high silica (quartz) sandstones or unconsolidated deposits. Other essential requirements are that particles are well rounded, relatively clean of other minerals and impurities and will facilitate the production of fine, medium and coarse grain sands. Frac sand is preferably >99% quartz or silica, and high purity quartz sand deposits are relatively common in the U.S. However, the tight specifications for frac sands—especially in relation to roundness and sphericity—make many natural sand deposits unsuitable for frac sand production. One primary source of such high quality sand is the St. Peter sandstone formation, which spans north-south from Minnesota to Missouri and east-west from Illinois into Nebraska and South Dakota. Sand from this formation is commercially known as Ottawa sand. This sand generally is made of a very high percentage of silica, and some samples, such as found in Missouri, consist of quartz sand that is 99.44% silica.

One characteristic used to determine suitability of a proppant material, such as silica sand, is grain size, which can be measured using standard length measurements or by mesh size. Mesh size is determined by the percentage of particles that are retained by a series of mesh sieves having certain-sized openings. In a mesh size number, the small number is the smallest particle size while the larger number is the largest particle size in that category. The smaller the number, the coarser the grain. The vast majority of grains range from 12 to 140 mesh and include standard sizes such as 12/20, 16/30, 20/40, 30/50, and 40/70, whereby 90% of the product falls between the designated sieve sizes. Some specific examples are 8/12, 10/20, 20/40, and 70/140. Grain size can also be measured in millimeters or micrometers, with some examples being grain size ranges of 2.38-1.68 mm, 2.00-0.84 mm, 0.84-0.42 mm, and 210-105 micrometers.

Another important characteristic of a proppant material, such as silica sand, for hydraulic fracturing is the sphericity and roundness of the grains, that is, how closely the grains conform to a spherical shape and its relative roundness. The grains are assessed by measuring the average radius of the corners over the radius of a maximum inscribed circle. Krumbein and Sloss devised a chart for the visual estimation of sphericity and roundness in 1955, as shown in FIG. 4. The API, for example, recommends sphericity and roundness of 0.6 or larger based on this scale.

An additional characteristic of a proppant material, such as silica sand, is crush resistance, which, as the phrase implies, is the ability of the proppant to resist being crushed by the substantial forces exerted on the proppant after insertion into a fracture. The API requires that silica sand withstand compressive stresses of 4,000 to 6,000 psi before it breaks apart or ruptures. The tested size range is subjected to 4,000 psi for two minutes in a uniaxial compression cylinder. In addition, API specifies that the fines generated by the test should be limited to a maximum of 14% by weight for 20-40 mesh and 16-30 mesh sizes. Maximum fines for the 30-50 mesh size is 10%. Other size fractions have a range of losses from 6% for the 70-40 mesh to 20% for the 6-12 mesh size. According to the anti-crushing strength measured in megapascals (MPa), types of frac sand can possibly be divided, for example, into 52 Mpa, 69 Mpa, 86 Mpa and 103 Mpa three series.

Yet another characteristic of a proppant material, such as silica sand, is solubility. The solubility test measures the loss in weight of a 5 g sample that has been added to a 100 ml solution that is 12 parts hydrochloric acid (HCl) and three parts hydrofluoric acid (HF), and heated at 150° F. (approx. 65.5° C.) in a water bath for 30 minutes. The test is designed to determine the amount of non-quartz minerals present. However, a high silica sandstone or sand deposit and its subsequent processing generally removes most soluble materials (e.g. carbonates, iron coatings, feldspar and mineral cements). The API requires (in weight percent) losses of <2% for the 6-12 mesh size through to the 30-50 mesh size and 3% for the 40-70 mesh through to 70-140 mesh sizes.

OBJECT OR OBJECTS

An object of the present application is to prepare proppant, such as silica sand, resin-coated silica sand, and ceramic proppant materials, for use in hydraulic fracturing while minimizing dust production in order to reduce exposure of workers to silica dust and proppant dust, and thereby minimize the chances of the workers developing silicosis or other types of pneumoconiosis.

SUMMARY

As discussed above, in a hydraulic fracturing operation, large quantities (as much as 15,000 tons or more) of proppant, such as silica sand, resin-coated silica sand, and ceramic proppant materials, are used. One of the drawbacks of using proppant materials, especially silica sand, is that dust clouds, such as silica dust clouds, are formed during the handling of the proppant material. The dust clouds can be controlled by using a control arrangement. According to one possible embodiment of the application, the control arrangement is separate from but connectable to the proppant storage device. According to another possible embodiment of the application, at least a portion of the control arrangement is integrated into the body of the proppant storage device.

DESCRIPTION OF EMBODIMENT OR EMBODIMENTS

Figure 1:
FIG. 1 shows a microscopic view of silica dust particles.
Figure 2:
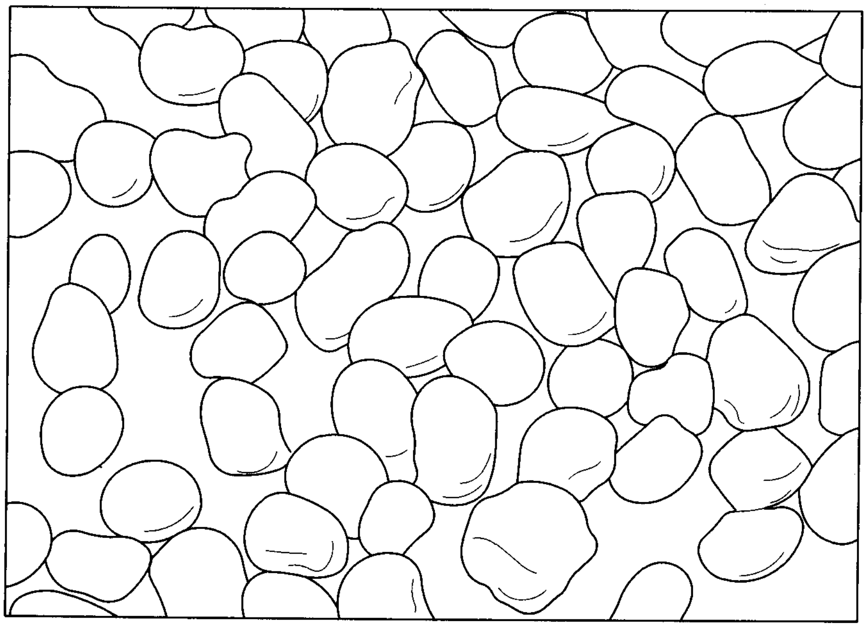
FIG. 2 shows proppant grains.
Figure 3:
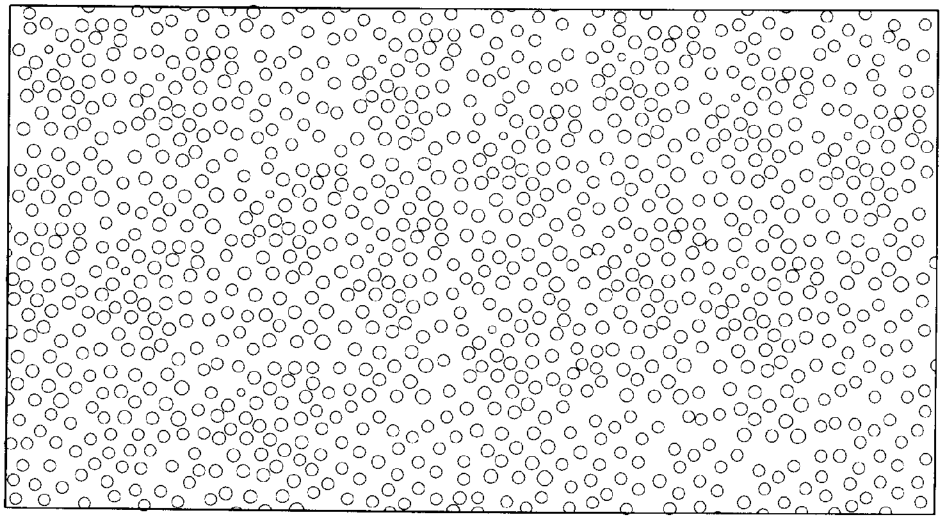
FIG. 3 shows proppant grains.
Figure 4:
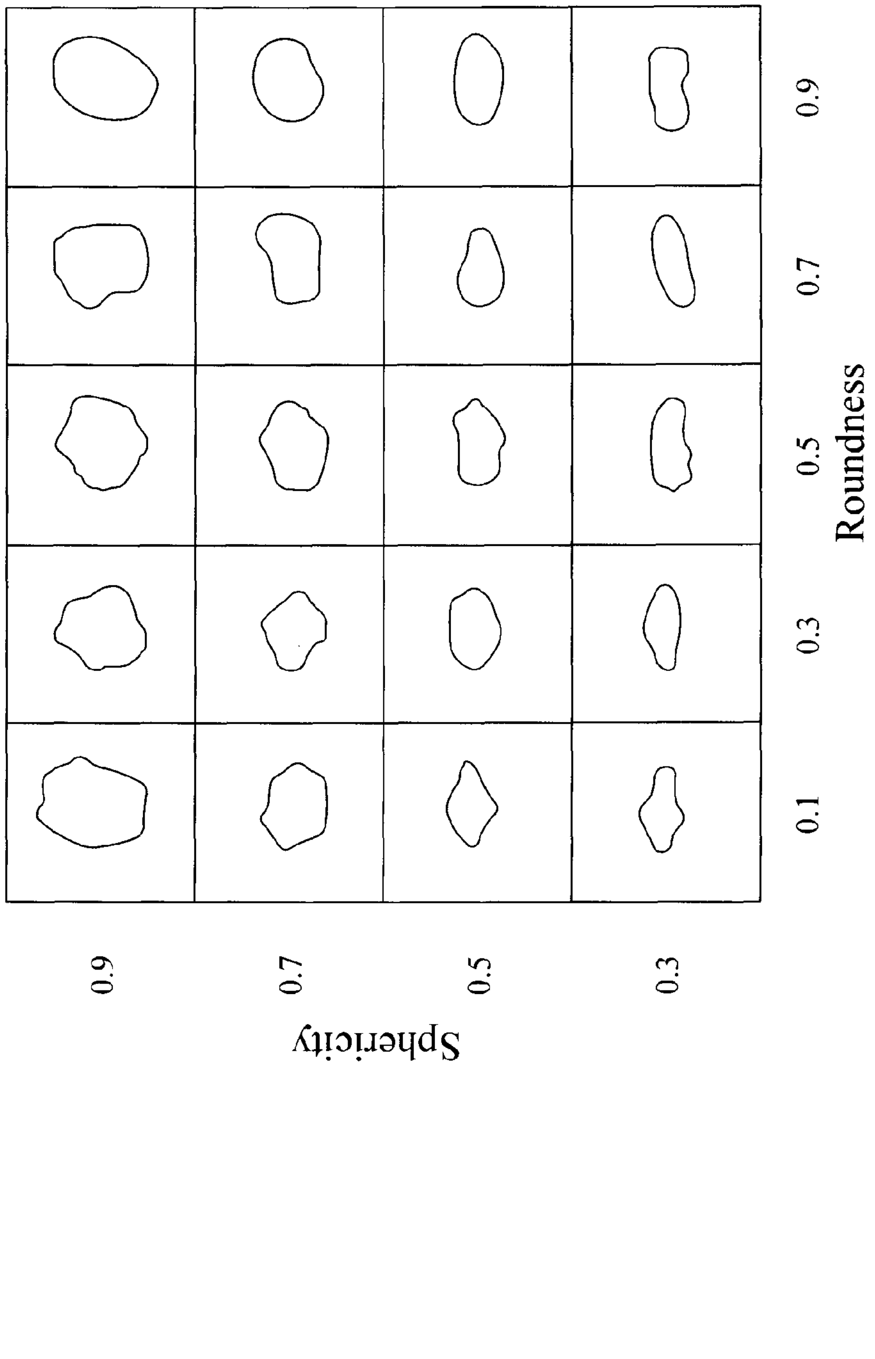
FIG. 4 shows the Krumbein and Sloss chart.
Figure 5:
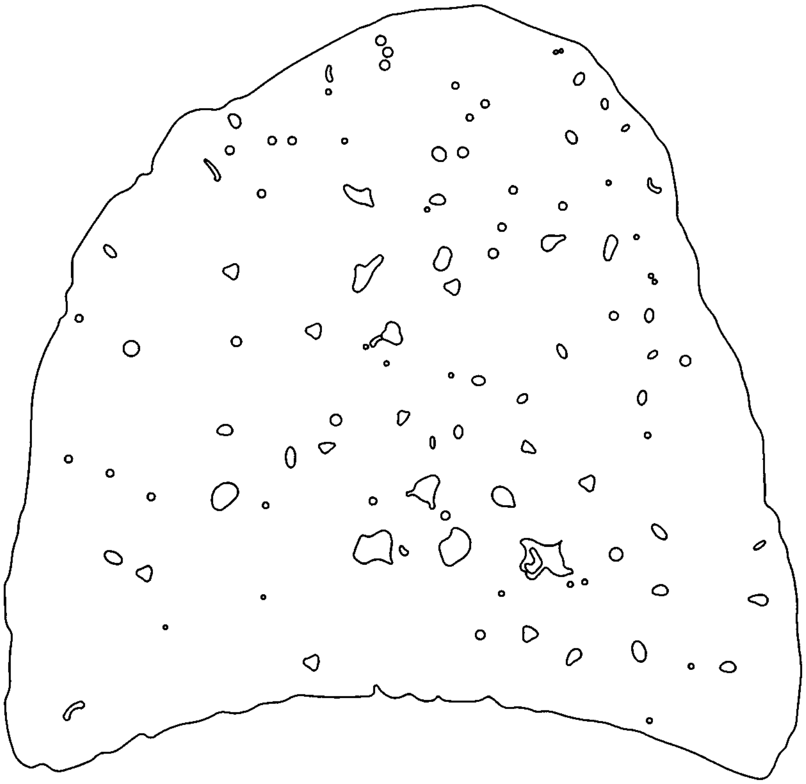
FIG. 5 shows a human lung affected by silicosis.

FIG. 1 shows a microscopic view of silica dust particles. These silica dust particles can become lodged in the lungs of a person who inhales the silica dust. Exposure to silica dust may lead to silicosis, a form of pneumoconiosis. FIGS. 2 and 3 show examples of proppant grains. FIG. 5 shows a human lung affected by silicosis. As can be easily seen, the lung is darkened and damaged by the presence of the silica dust particles.

Figure 6:
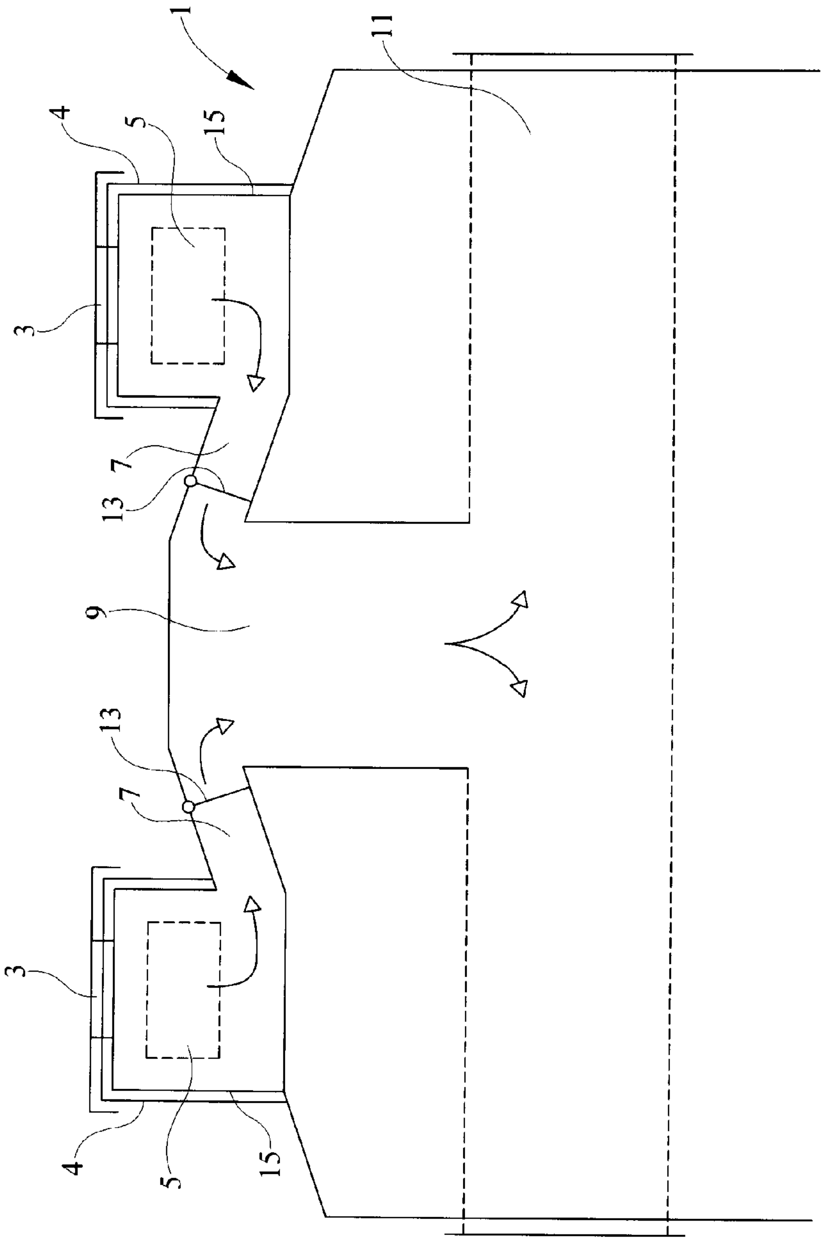
FIG. 6 shows a cross-sectional end view of a portion of the body of a proppant storage device according to at least one embodiment of the application.

FIG. 6 shows a cross-sectional end view of a portion of the body of a proppant storage device 1 according to at least one embodiment of the application. While the storage device 1 is being filled with proppant, the doors 3, which are shown in FIG. 6 as being closed, may be opened to allow air to vent through outlets 4 and to allow workers to monitor the fill level of proppant in the storage device 1. The exiting air and the feeding of the proppant disturb the proppant, causing the formation of dust clouds which exit via the outlets 4, regardless of whether the doors 3 are closed or opened. To minimize or prevent the spread or exit of these dust clouds, a vacuum suction system may be employed. In operation, a vacuum dust collection machine is connected via an air duct system to collect the dust. In FIG. 6, intake openings 5 are formed in the sides of the outlets 4. A junction duct 15 is located around the intake opening 5 and connects to a side air duct 7. The flow of air through the side air duct 7 can be controlled by a valve 13. The side air ducts 7 lead to a central air duct 9. The central air duct 9 ultimately leads to an exhaust duct 11, which is operatively connected to a dust collector (not shown). The flow of air therefore proceeds as follows: air is drawn in through the outlets 4, then through the intake openings 5, then through the side air ducts 7, then through the central air duct 9, and finally through the exhaust duct 11. The side air ducts 7, the central air duct 9, and the exhaust duct 11 may be located within the frame or body of the storage device 1.

Figure 7:
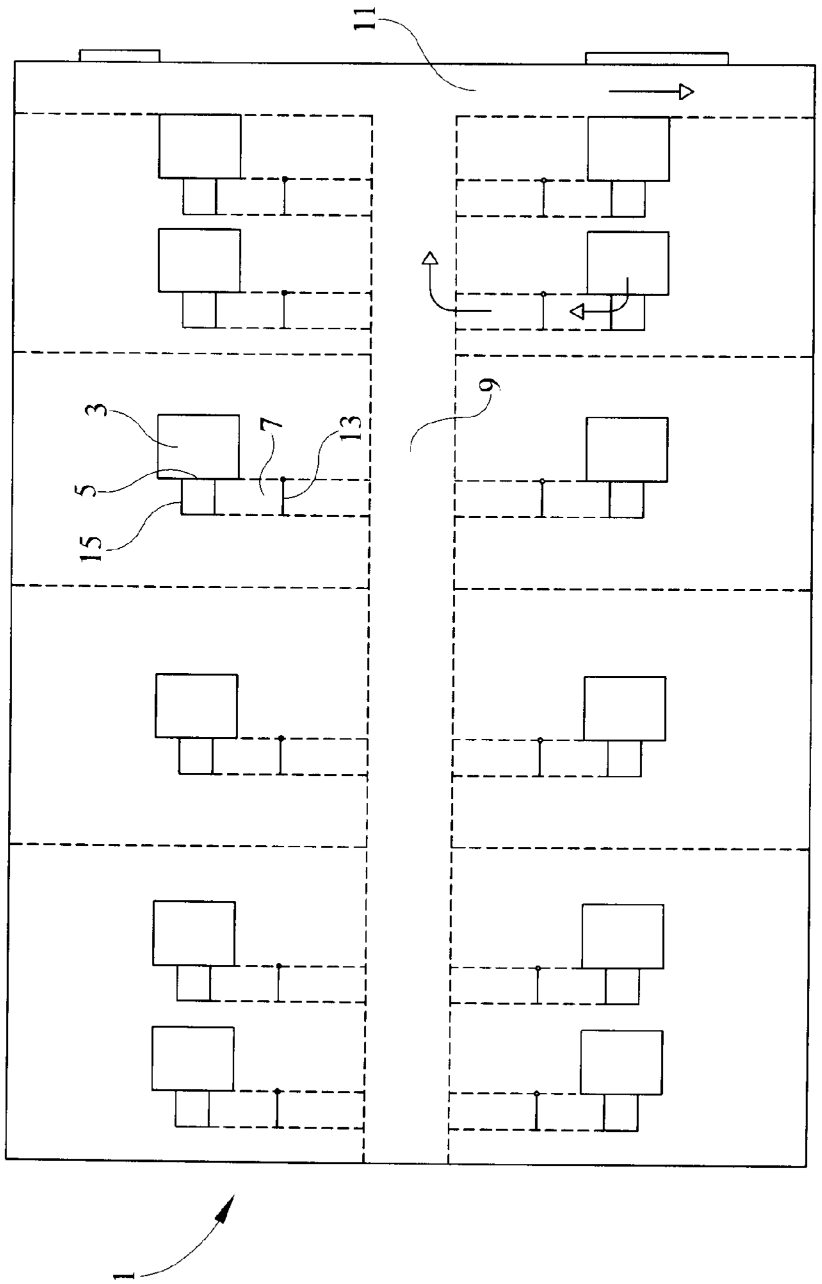
FIG. 7 shows a top view of a portion of the body of the proppant storage device according to FIG. 6.

FIG. 7 shows a top view of a portion of the body of the storage device 1 according to FIG. 6. As can be seen in this figure, each of the side air ducts 7 connects to the central air duct 9, which, in the embodiment shown, extends over the length of the storage device 1 before joining the exhaust duct 11 located at the rear of the storage device.

Figure 8:
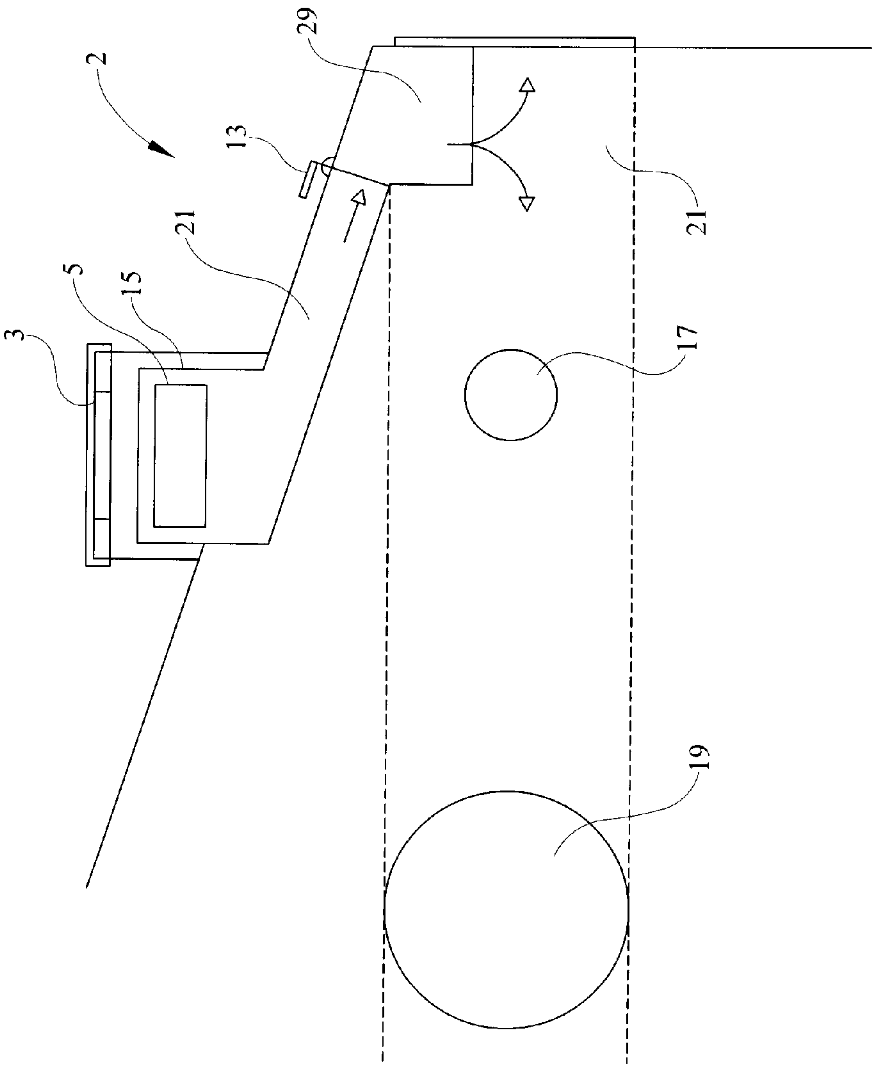
FIG. 8 shows a cross-sectional view of a portion of the body of a proppant storage device according to at least one embodiment of the application.
Figure 9:
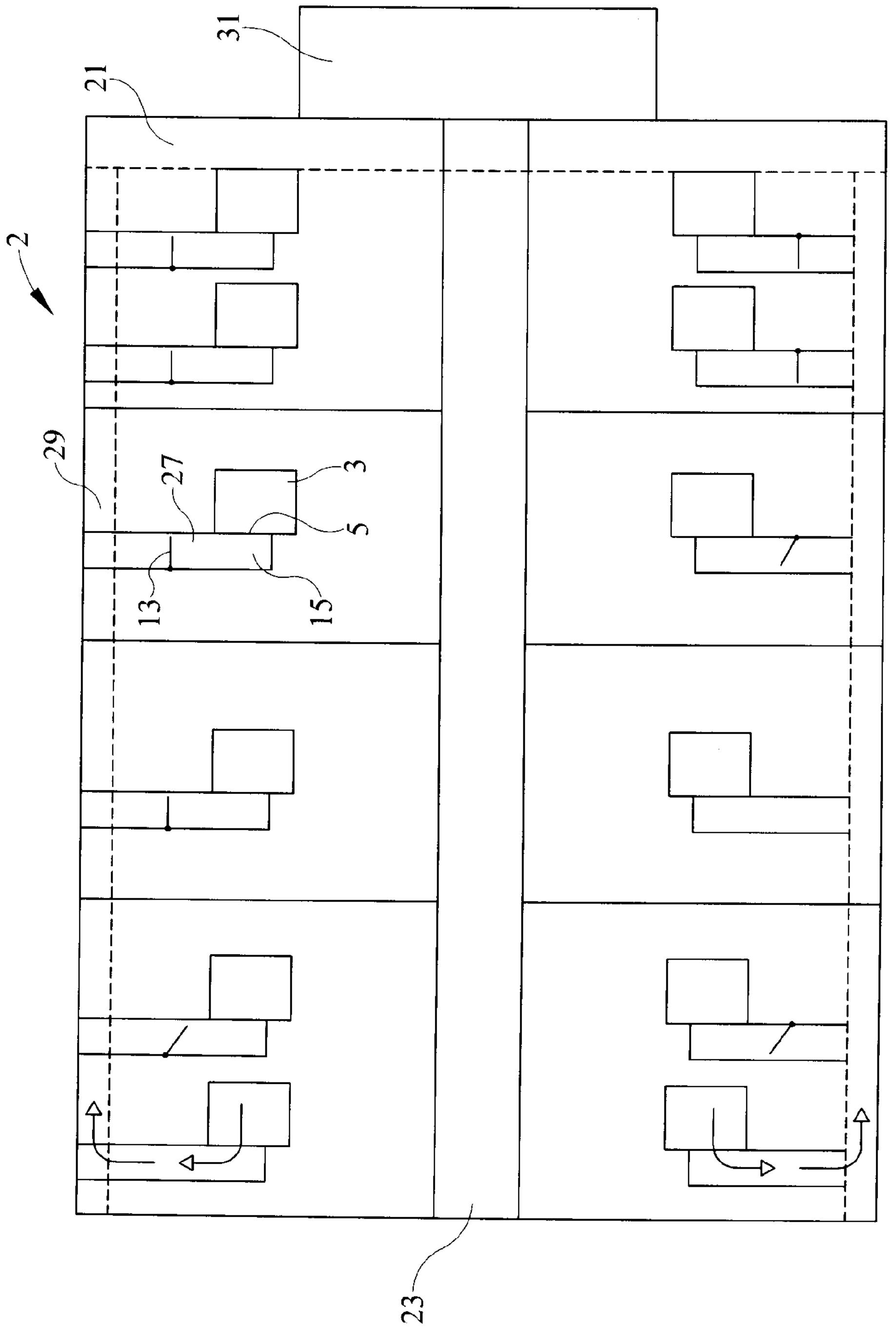
FIG. 9 shows a top view of a portion of the body of the proppant storage device according to FIG. 8.

FIG. 8 shows a cross-sectional view of a portion of the body of a proppant storage device 2 according to at least one embodiment of the application. The embodiment shown in FIG. 8 differs from that shown in FIG. 6 in that side air ducts 27 proceed outwardly, rather than inwardly, toward outer air ducts 29, which run along the outer edges of the storage device 2 (as shown in FIG. 9). Valves 13 control the flow of air through the side air ducts 27. The outer air ducts 29 connect to an exhaust duct 21, which is similar to the exhaust duct 11. The exhaust duct 21 also has a small air intake 17 and a large air intake 19, which can be connected to a vacuum arrangement used to collect dust produced by the transport of proppant on a conveyor positioned transverse to the length of the storage device 2, which conveyor is also known as a T-belt. FIG. 9 also shows a walkway 23 which is located on the roof or top surface of the storage device 2.

Figure 10:
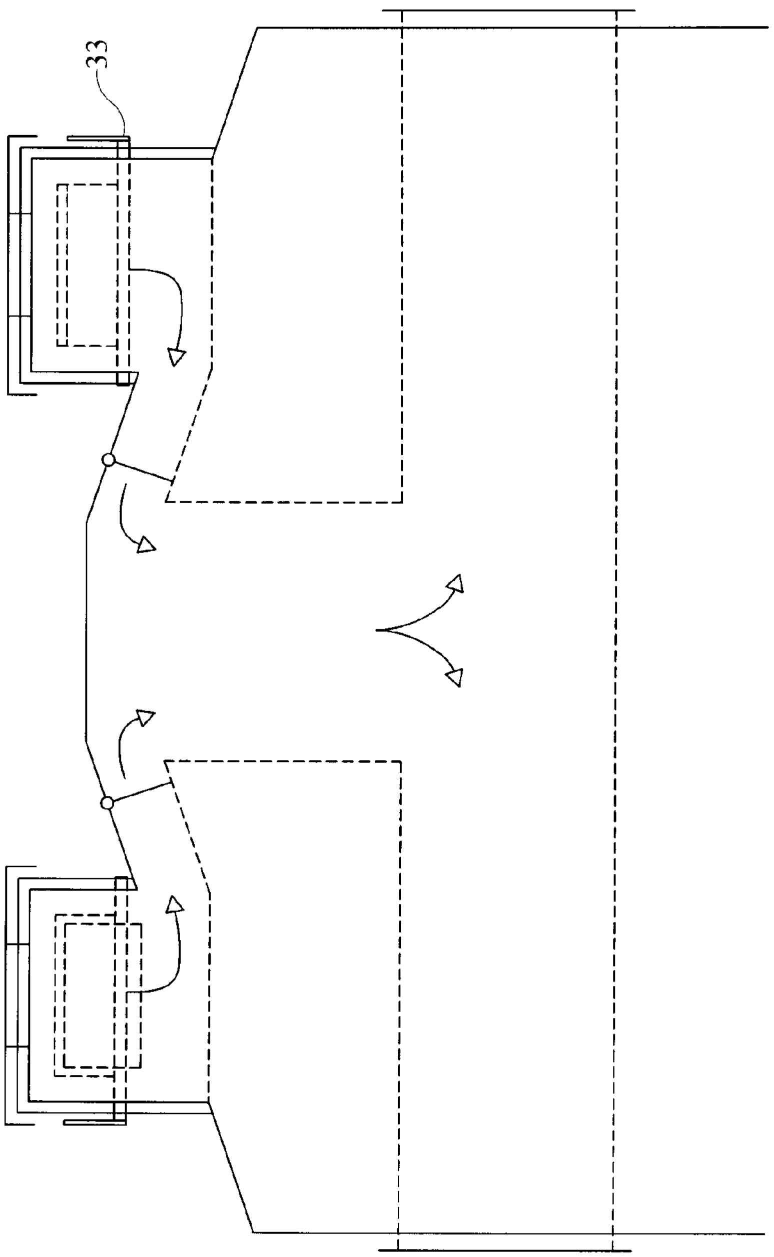
FIG. 10 shows a cross-sectional end view of a portion of the body of the proppant storage device according to FIG. 6 with additional features.
Figure 11:
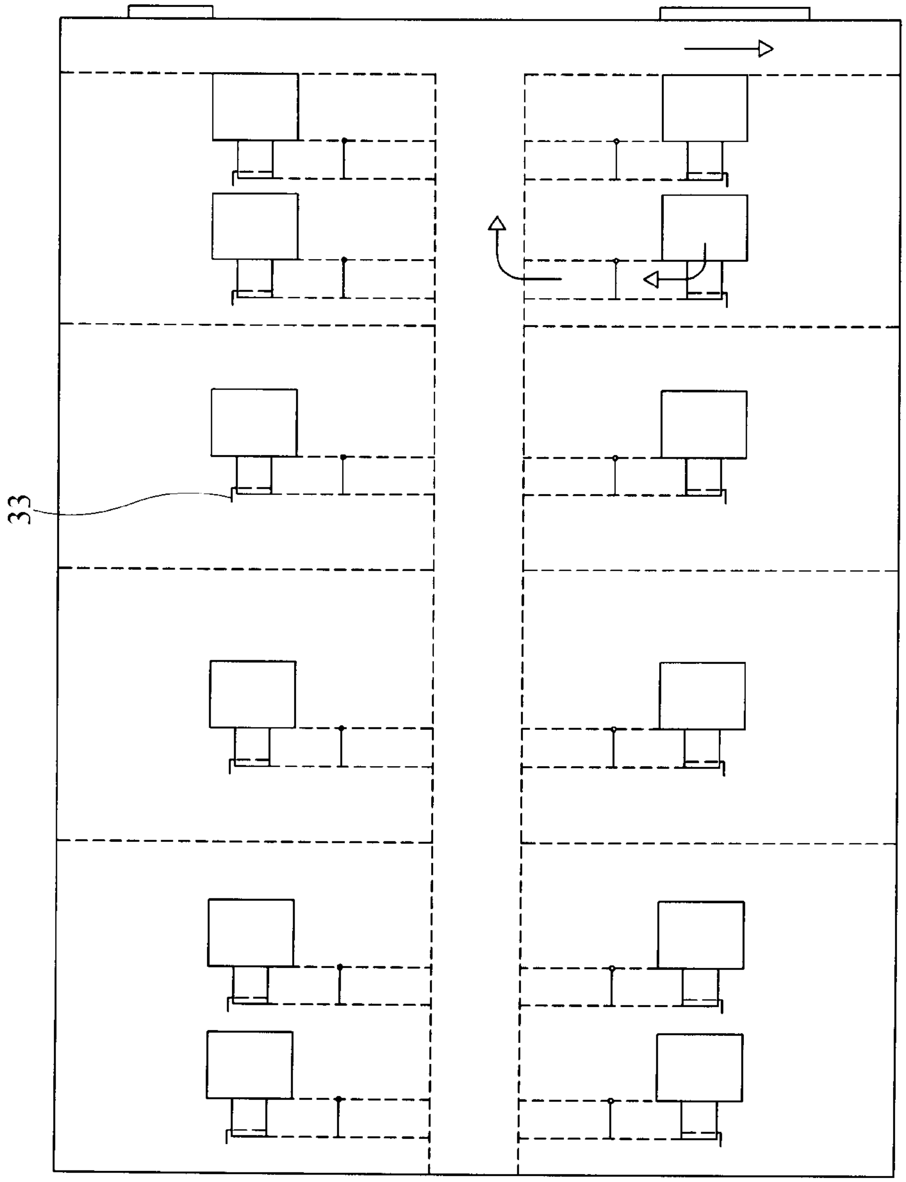
FIG. 11 shows a top view of a portion of the body of the proppant storage device according to FIG. 10.
Figure 12:
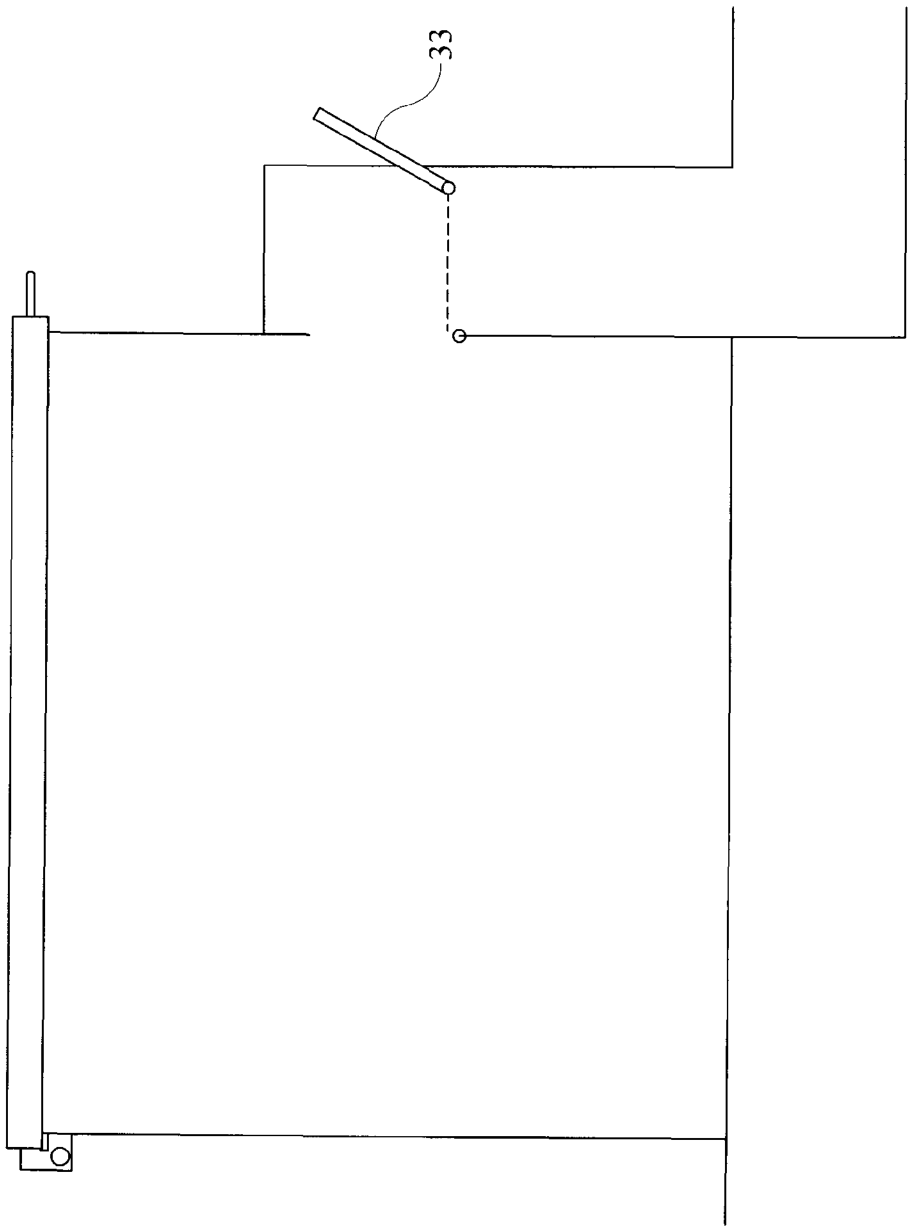
FIG. 12 shows a cross-sectional view of a portion of the proppant storage device according to FIG. 10.
Figure 13:
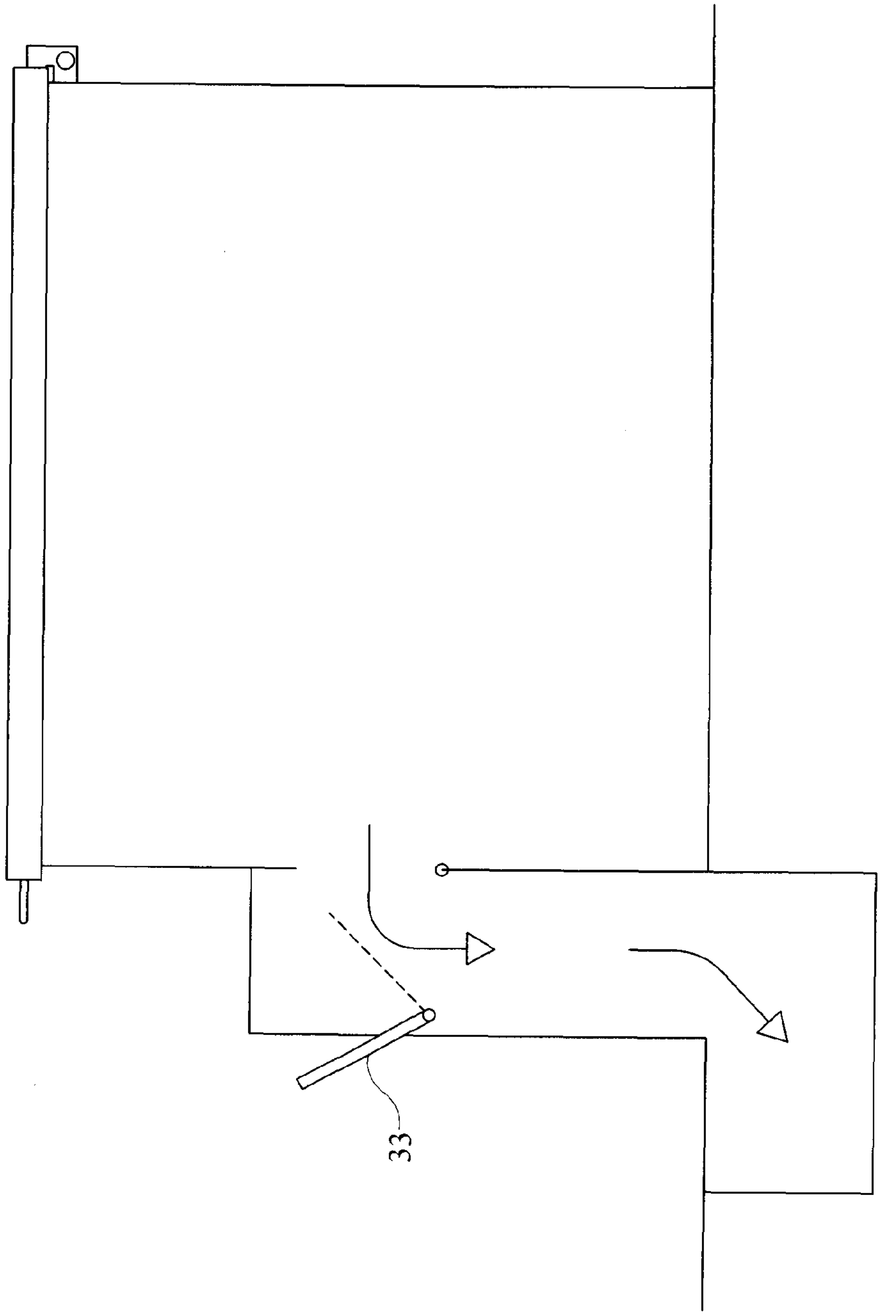
FIG. 13 shows another cross-sectional view of the portion of the proppant storage device according to FIG. 12.

FIG. 10 shows a cross-sectional end view of a portion of the body of the proppant storage device according to FIG. 6 with additional features, specifically valves 33, which can be used to allow or block airflow from the intake openings 5. FIG. 11 shows a top view of a portion of the body of the proppant storage device according to FIG. 10, with the valves 33 shown. FIGS. 12 and 13 show cross-sectional views of a portion of the proppant storage device according to FIG. 10, showing the valve 33.

Figure 14:
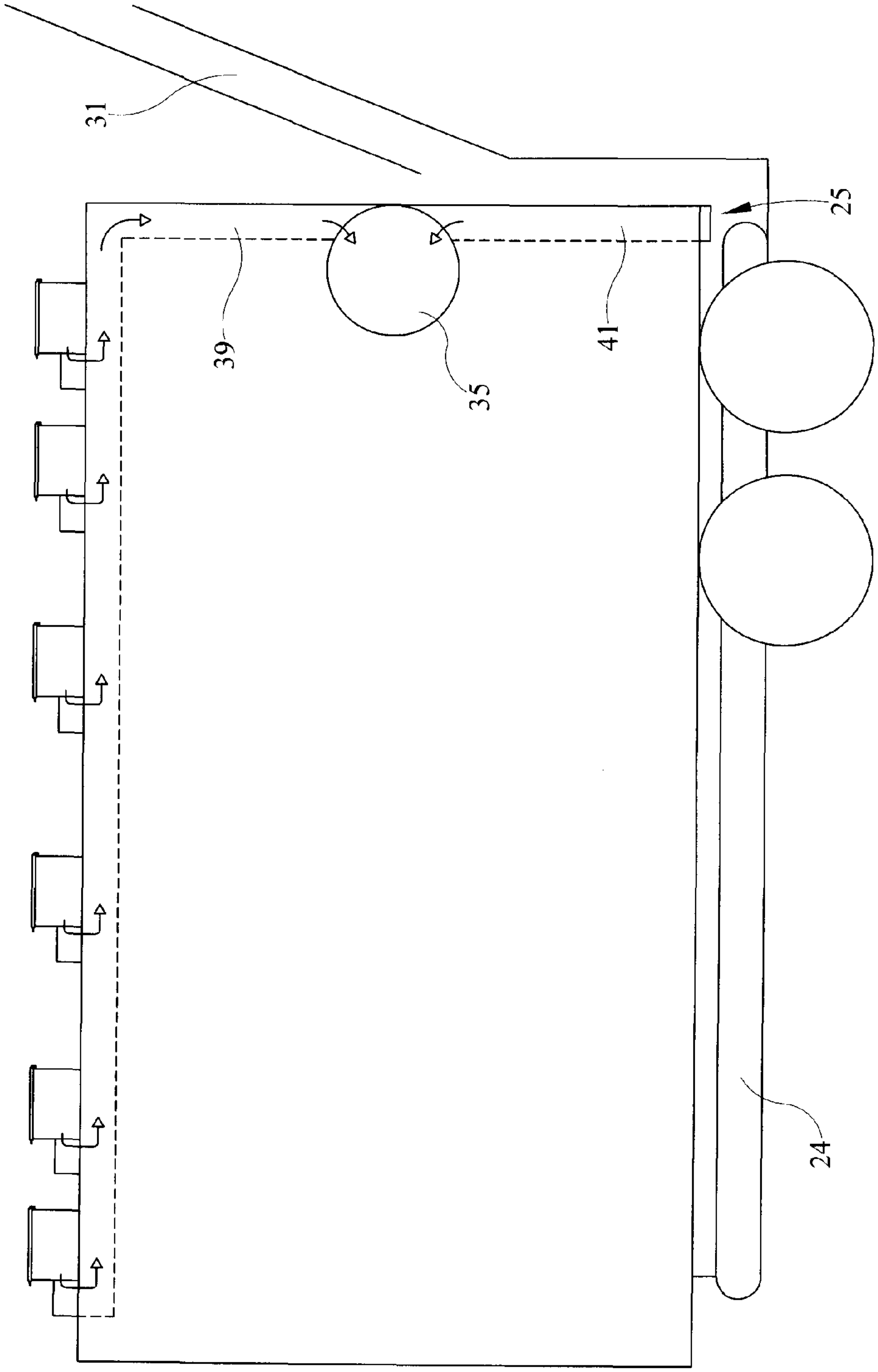
FIG. 14 shows a side view of the body of a proppant storage device according to at least one embodiment of the application.
Figure 16:
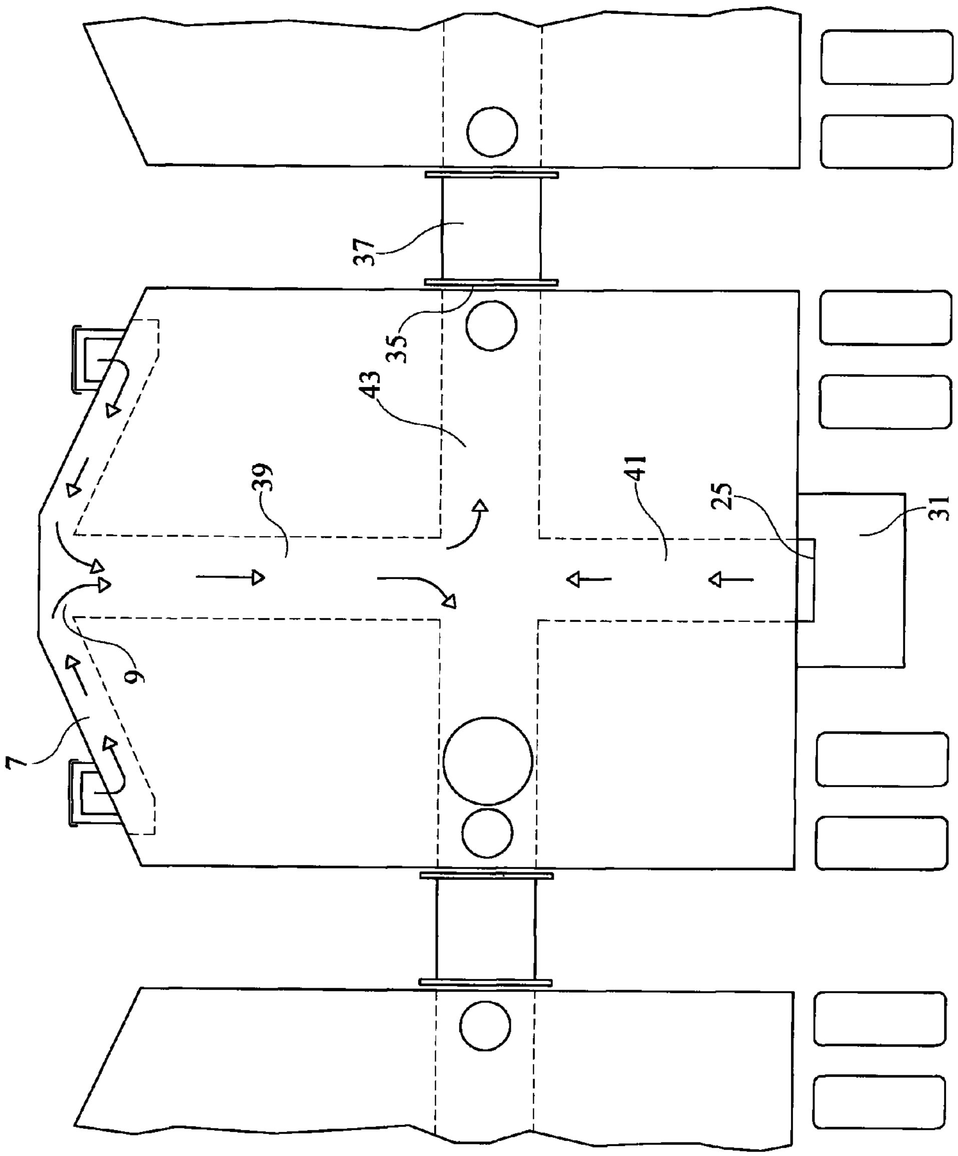
FIG. 16 shows a side view of the body of the proppant storage device according to FIG. 14 connected to additional proppant storage devices.

FIG. 14 shows a side view of the body of a proppant storage device according to at least one embodiment of the application. This embodiment is similar to the one shown in FIG. 6, but in this embodiment there is an upper connecting duct 39 which connects a central duct 9 to an exhaust duct 43. The exhaust duct 43 leads to exhaust ports 35 on the sides thereof. In addition, each of the storage devices has located on the underside thereof a conveyor 24. In operation, the proppant is released through openings in the underside of the storage device and onto the conveyor 24. The conveyor 24 transports the proppant to a second conveyer 31, which then deposits the proppant onto another conveyor, specifically a T-belt. The transport of the proppant on the conveyor 24 can disturb the proppant, especially at the point of transition from the conveyor 24 to the conveyor 31. A vacuum intake 25 is therefore located adjacent this transition point between the two conveyors 24, 31. The intake 25 is connected via a lower rear connecting duct 41 to the exhaust duct 43, as seen in FIG. 16. Also as seen in FIG. 16, the exhaust ducts 43 of multiple storage devices can be connected together to form a single exhaust which leads to the dust collecting device. Flexible sleeves 37 are used to connect the exhaust ducts 43.

Figure 15:
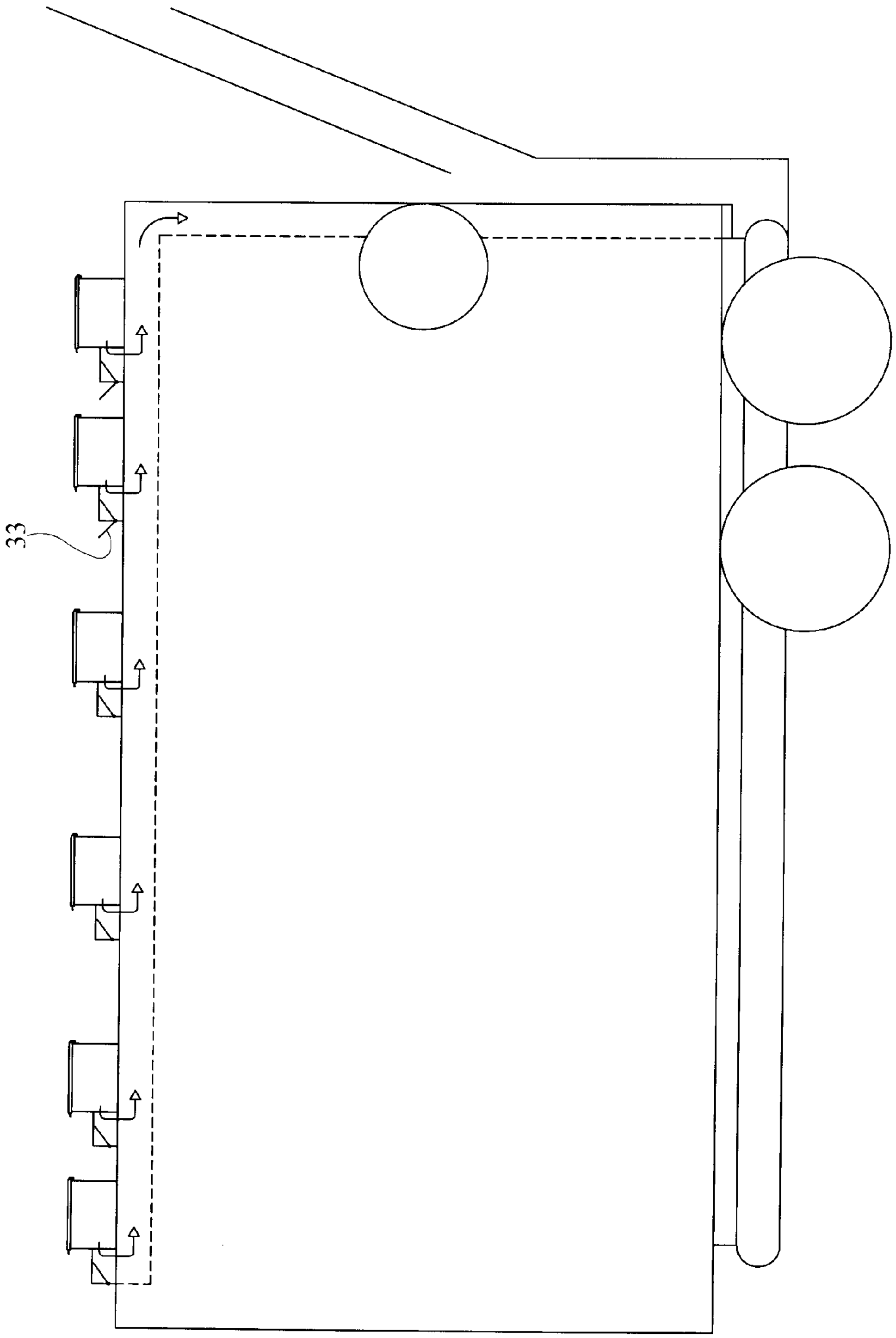
FIG. 15 shows a side view of a portion of the body of the proppant storage device according to FIG. 14 with additional features.

FIG. 15 shows a side view of a portion of the body of the proppant storage device according to FIG. 14 with additional features, specifically valves 33.

Figure 17:
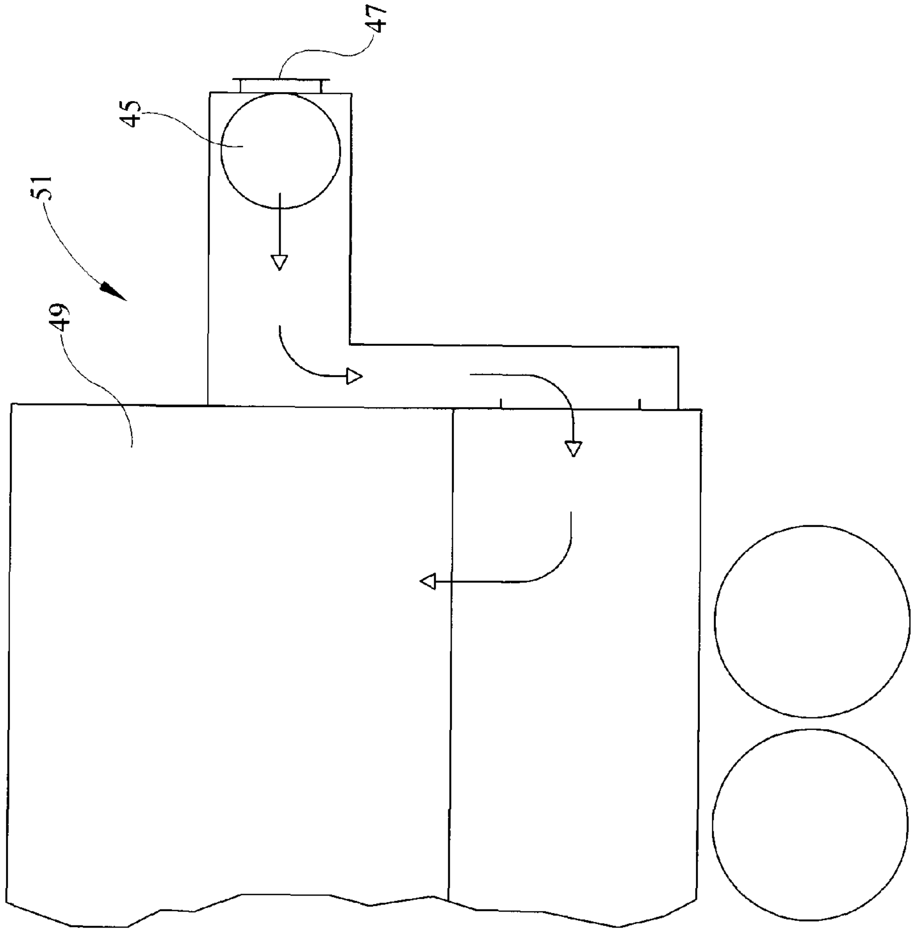
FIG. 17 shows a side view of a portion of a collection device according to at least one embodiment of the application.
Figure 18:
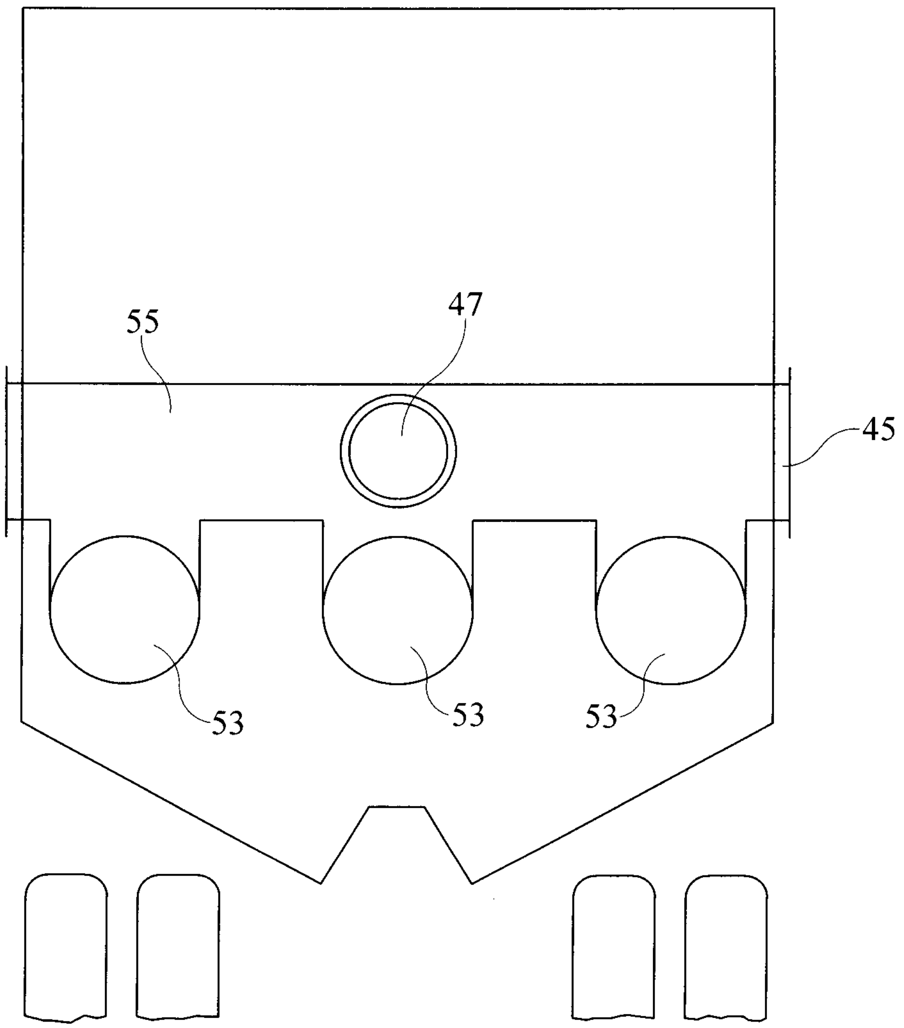
FIG. 18 shows a rear view of the collection device according to FIG. 17.

FIG. 17 shows a side view of a portion of a collection device 51 according to at least one embodiment of the application. The dust drawn into the vacuum system from the storage devices 1, 2 and/or the conveyor belts is ultimately collected in the collection device 51. An air intake 45 is connectable to tubes which connect to the storage devices 1, 2, and an air intake 47 is connectable to tubes which connect to air intakes for the T-belt. The collection device 51 houses air filter units 49. FIG. 18 shows a rear view of the collection device 51 according to FIG. 17. The air intake 45 is located at the end of a manifold 55, which is connected to ports 53 which lead into the interior of the collection device 51. Collection devices or dust collection devices which could be utilized or incorporated for use in at least one embodiment of the present application are manufactured by EnTech Industries, LLC, 10th Street NE, East Grand Forks, Minn. 56721. Some examples of such collection devices manufactured by EnTech Industries, LLC, are the Cyclone 45DC, Cyclone 40DC, Cyclone 30DC, and Cyclone 20DC. The Cyclone 45DC has a filter efficiency of 99.8% at 0.5 microns, and has a filtering capacity of 45,000 cubic feet per minute (cfm) at 14 inches water column (wc), or 14 inches water column gauge (wcg), or 14 inches water gauge (wg).

Figure 19:
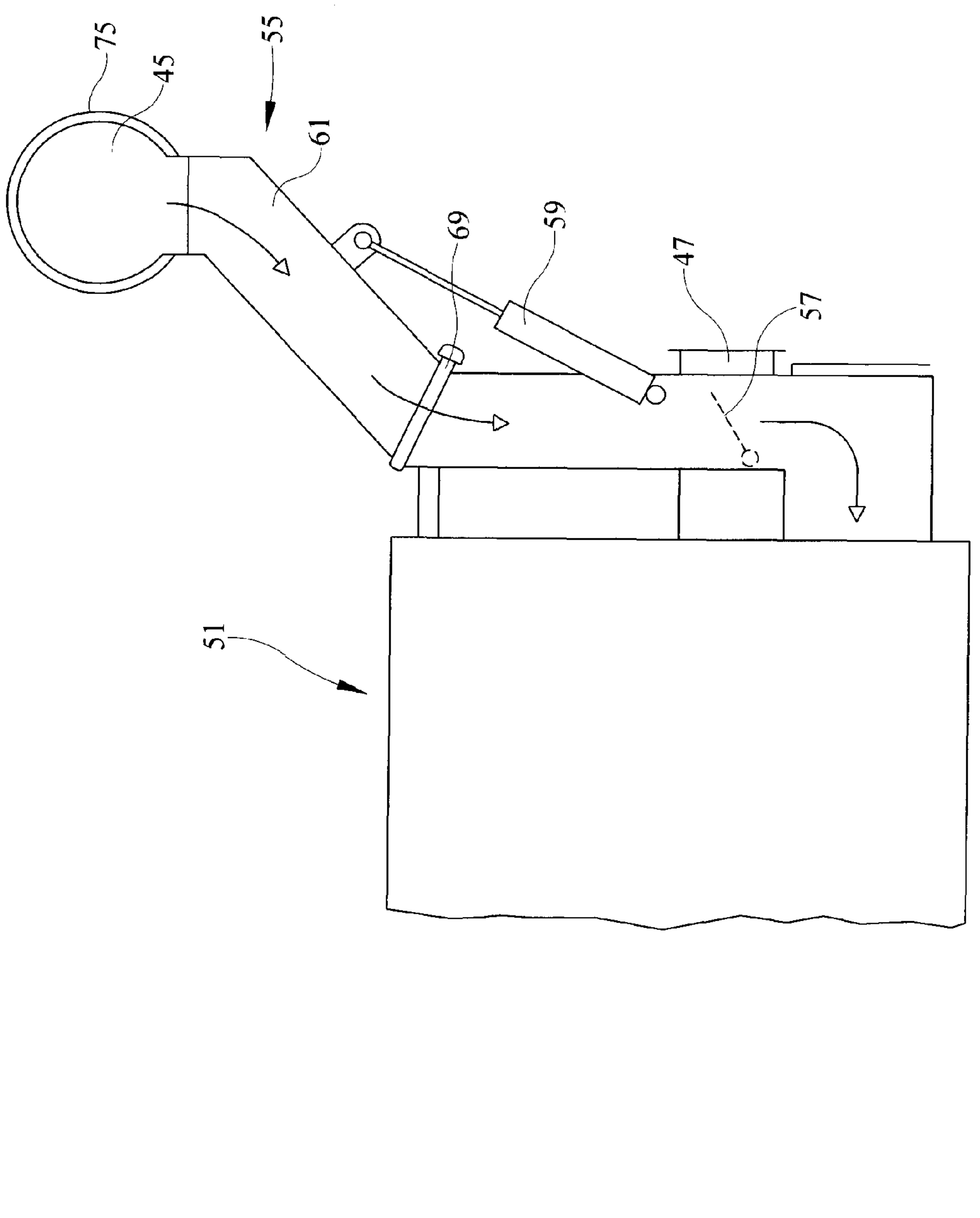
FIG. 19 shows a side view of a portion of a collection device according to at least one embodiment of the application.
Figure 20:
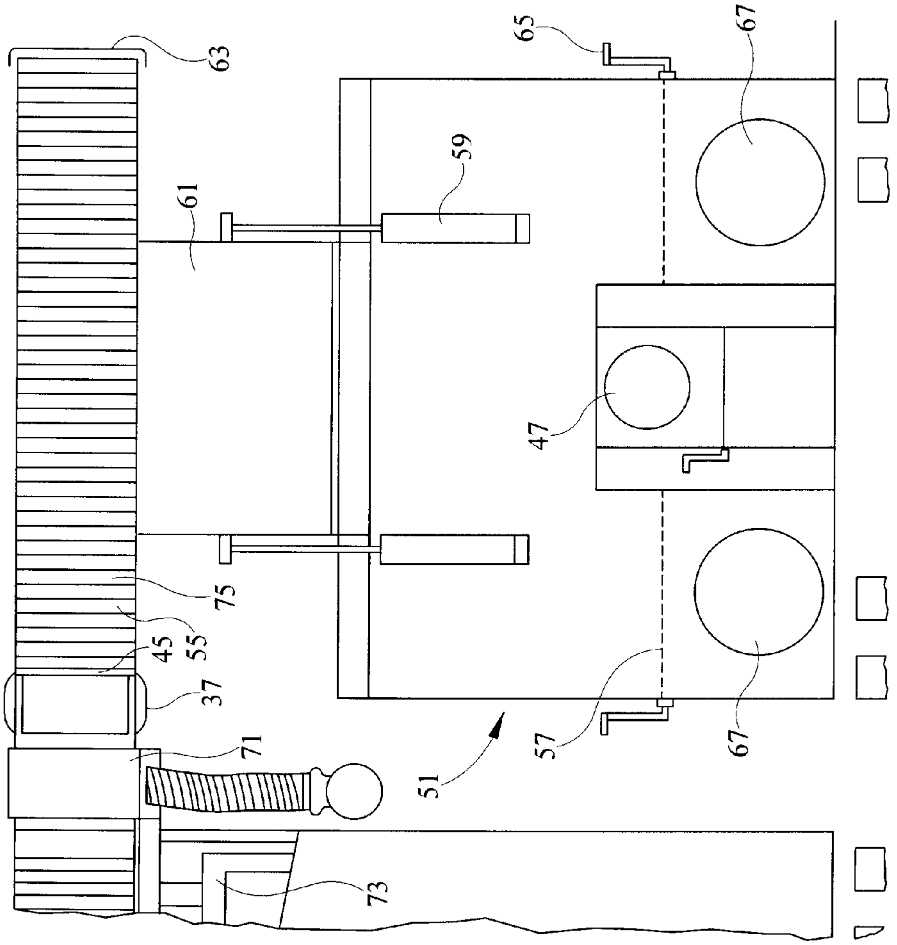
FIG. 20 shows a rear view of the collection device according to FIG. 19.

FIG. 19 shows a side view of a portion of a collection device 51 according to at least one embodiment of the application. The collection device 51 shown in FIG. 19 differs from that shown in FIG. 17 in that the manifold 55 is formed by a tube 75 and an articulated duct 61. The duct 61 is articulated at a hinge 69 and is movable by a hydraulic piston or arm 59. This movability allows for the upper portion of the duct 61 to be retracted downwardly for storage during the movement of the dust collector 51, and then extended upwardly to be connected to the vacuum system upon installation at a hydraulic fracturing site. As shown in FIG. 20, a valve 57 can be opened or closed using a valve handle 65. The tube 75 can be connected using a flexible connecting sleeve 37 to a connector box 71, which is supported by a connector box table 73. In this manner the dust collector 51 can be connected to other tubing which leads to the air intakes which draw dust from the storage devices and the areas around the conveyor belts.

Figure 21:
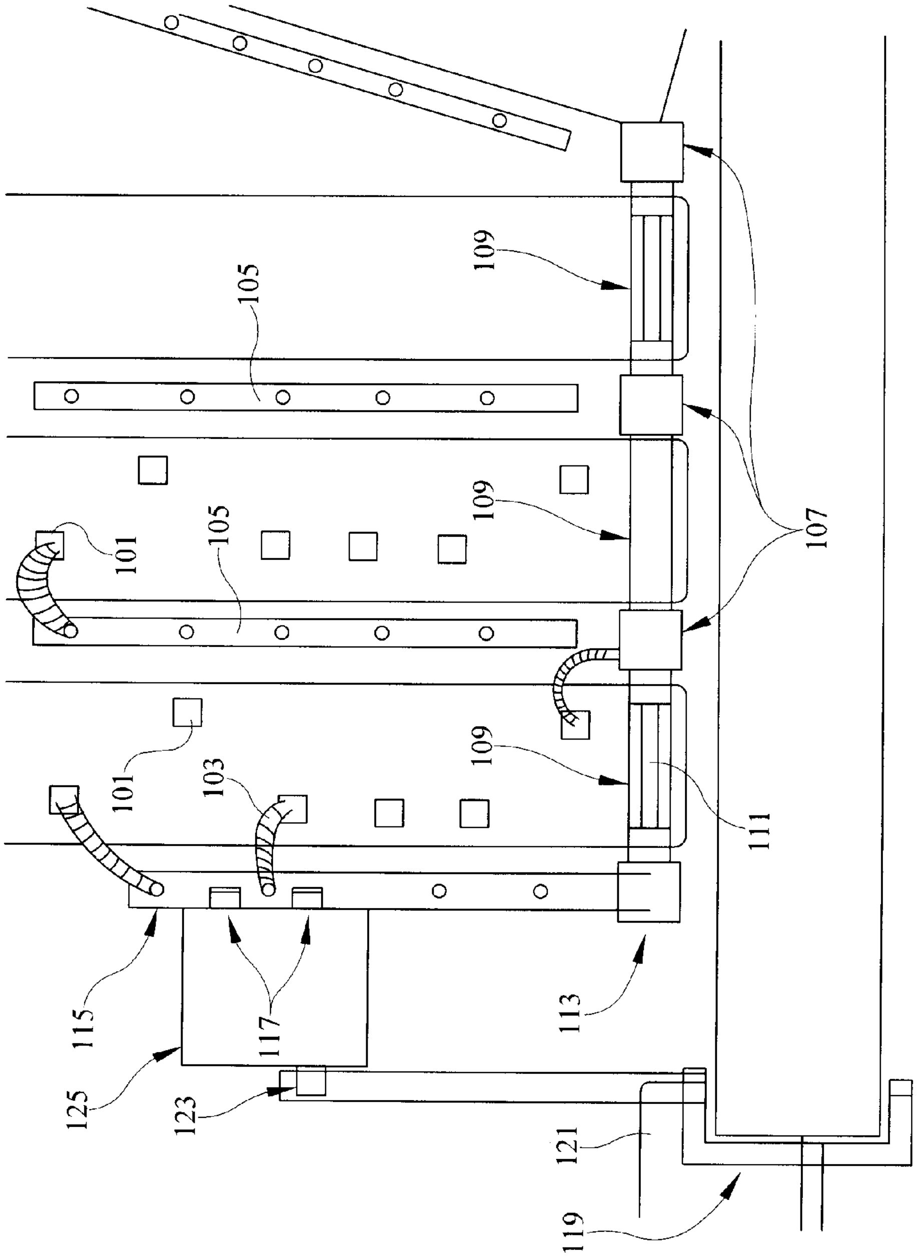
FIG. 21 shows a top view of an installed collection system according to at least one embodiment of the application.
Figure 21A:
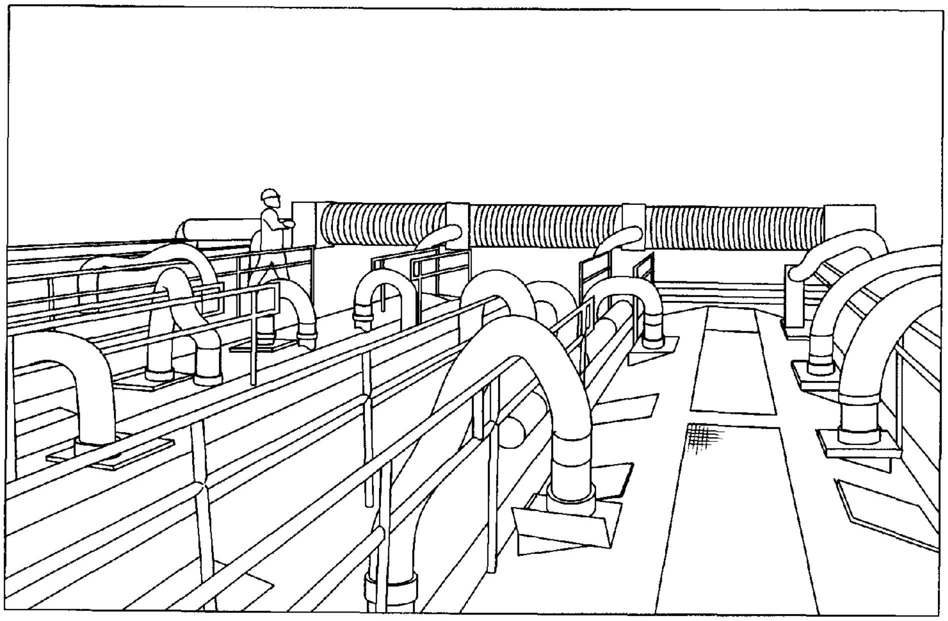
FIG. 21A shows a view of an installed collection system according to at least one embodiment of the application.
Figure 22:
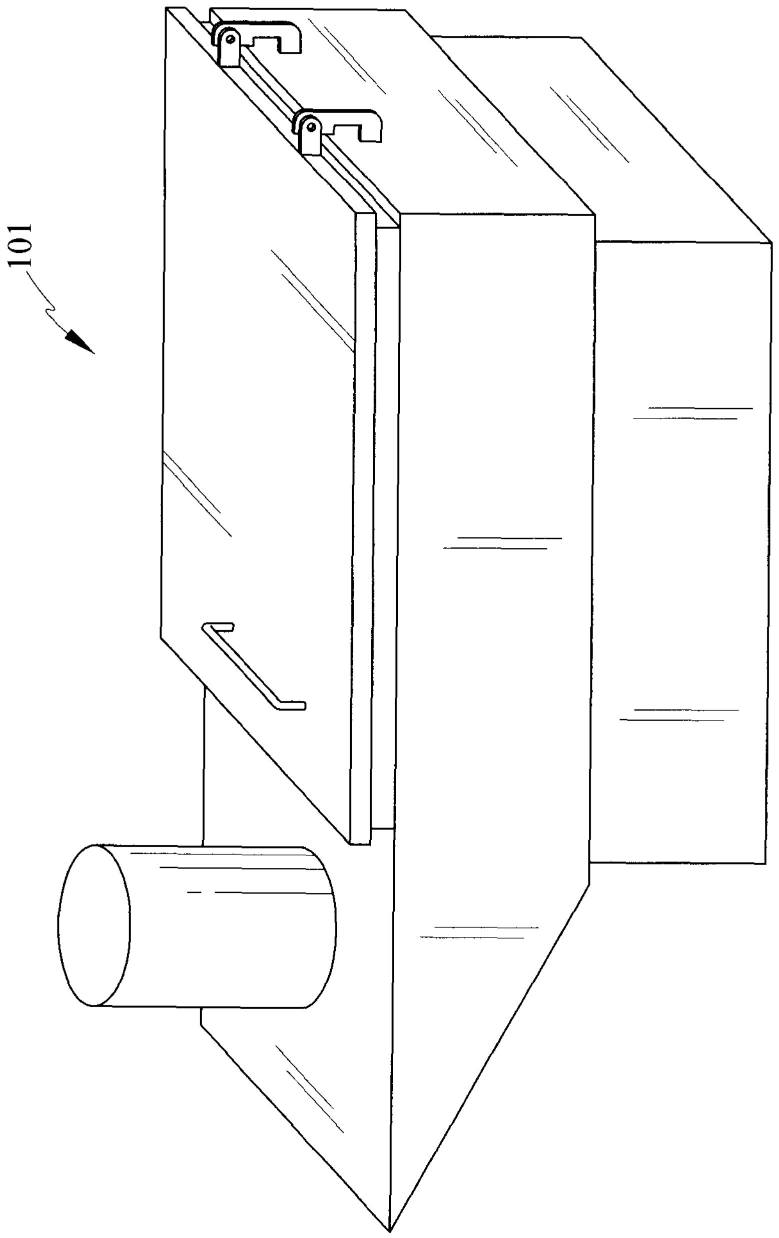
FIG. 22 shows a door arrangement of FIG. 21.

FIG. 21 shows a top view of an installed collection system according to at least one embodiment of the application. The collection system is connected to a series of proppant storage trailers once they have been positioned at the well site. The collection system has adaptable or portable doors or door arrangements 101 (see FIG. 22) that are designed to be placed over existing door openings in the storage trailers. The door arrangements 101 are such that an operator can open the door and look inside the storage trailer to determine the amount of product in the storage trailer and the amount being taken out of the storage trailer, while at the same time not interfere with the operation of the collection system. Each storage trailer requires different numbers of door arrangements 101 depending on sand storage manufacturers. The proppant dust is removed via flex tubing 103, which can be connected to one or more door arrangements 101 as necessary.

Figure 23:
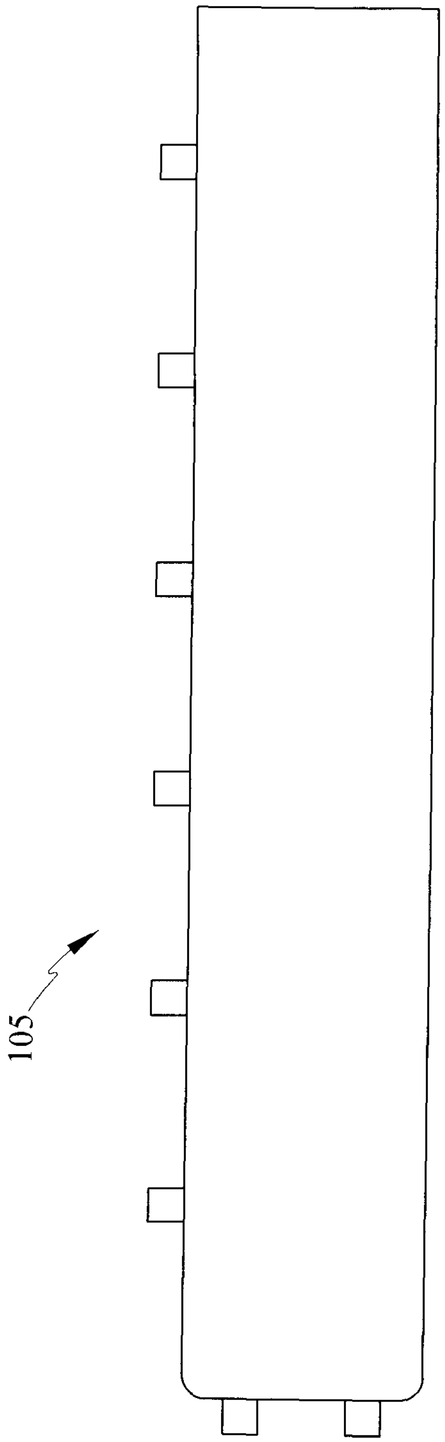
FIG. 23 shows a manifold arrangement of FIG. 21.
Figure 24:
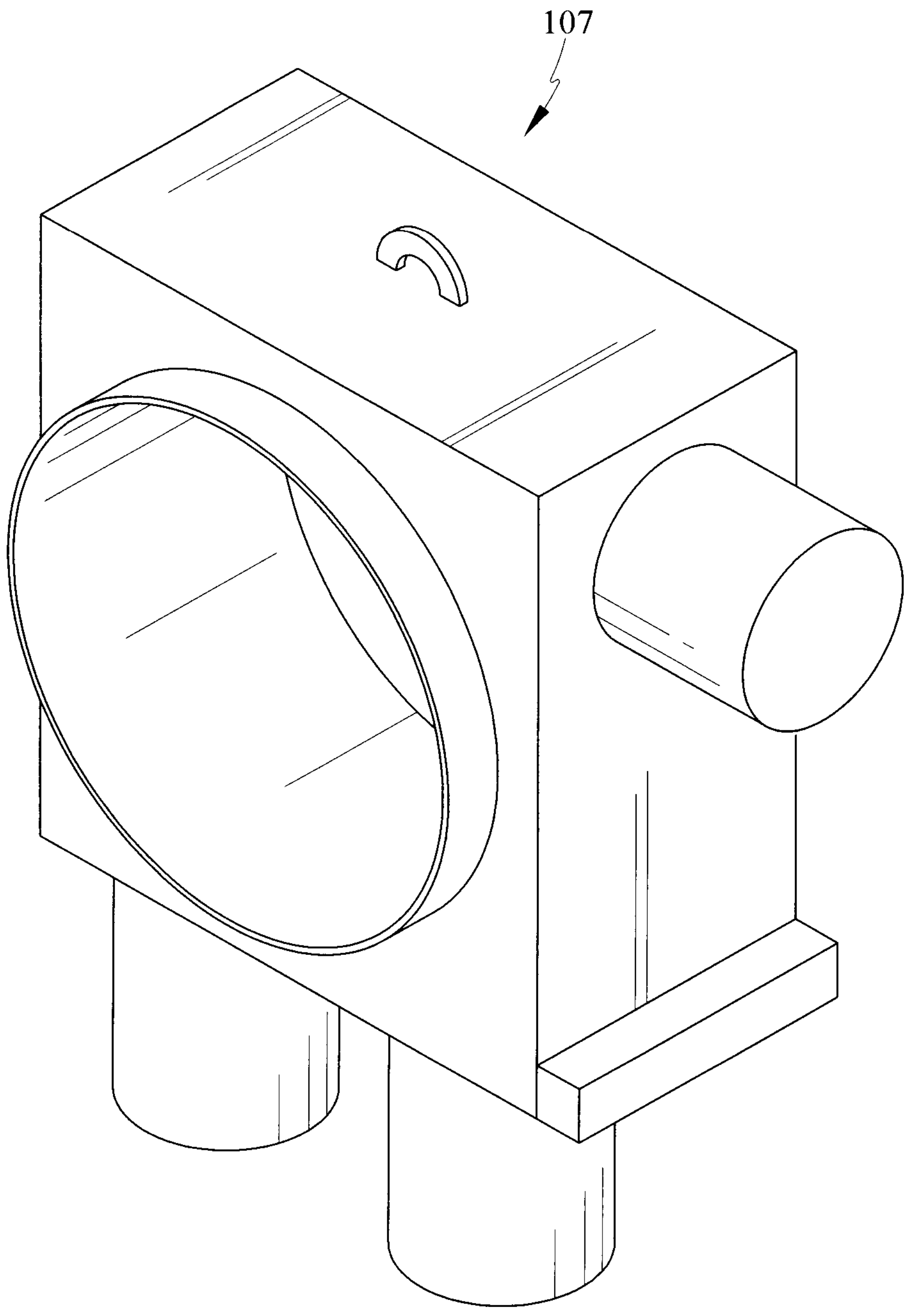
FIG. 24 shows a connector arrangement of FIG. 21.
Figure 25:
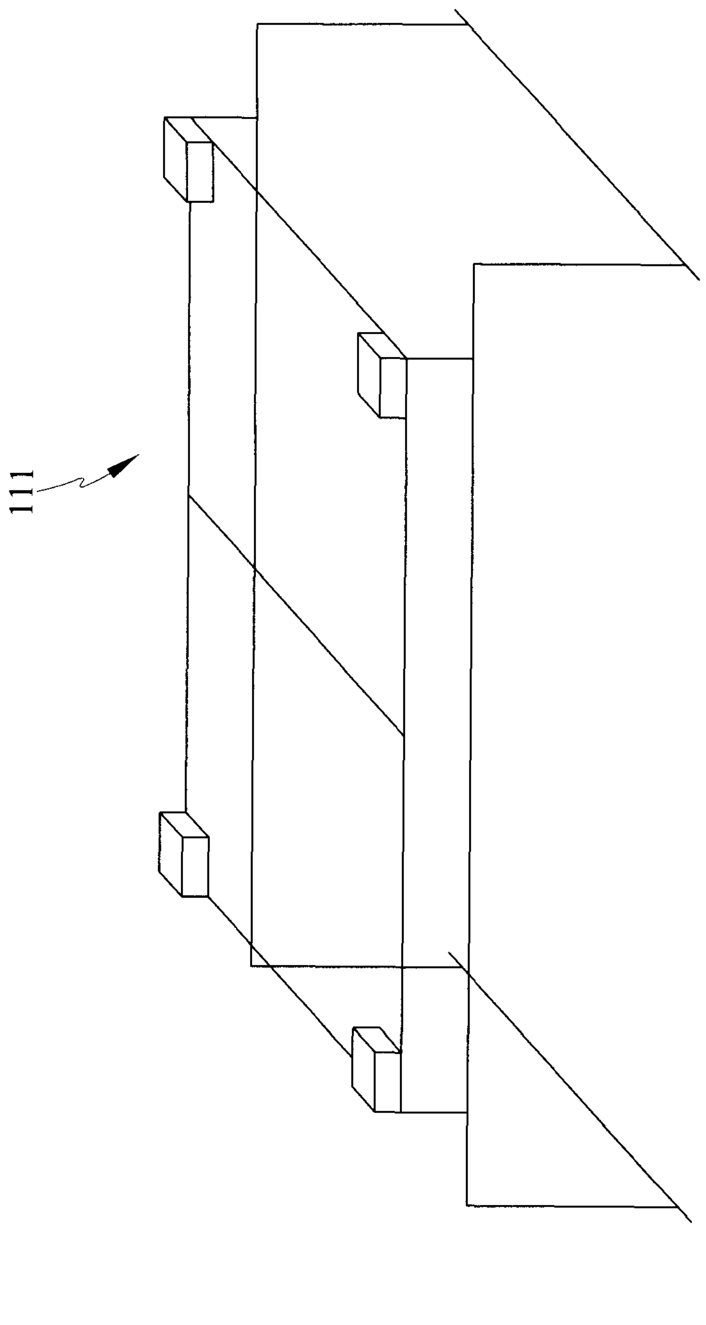
FIG. 25 shows a support arrangement of FIG. 21.

The dust is then carried to manifold arrangements 105 (see FIG. 23). The manifold arrangements 105 are designed to be placed between and suspended from the storage trailers once the storage trailers have been placed on site. The dust is then carried to connector arrangements 107 (FIG. 24). Each connector arrangement 107 is a flexible connector that allows for the variation in the placement of the sand storage trailers. The number of connector arrangements 107 used depends on the number of sand storage trailers being used at a well site. Table arrangements 111 (FIG. 25) suspend the connector arrangements between the sand storage trailers so they can be connected to the manifold arrangements 105 via a flexible hose connector.

Figure 26:
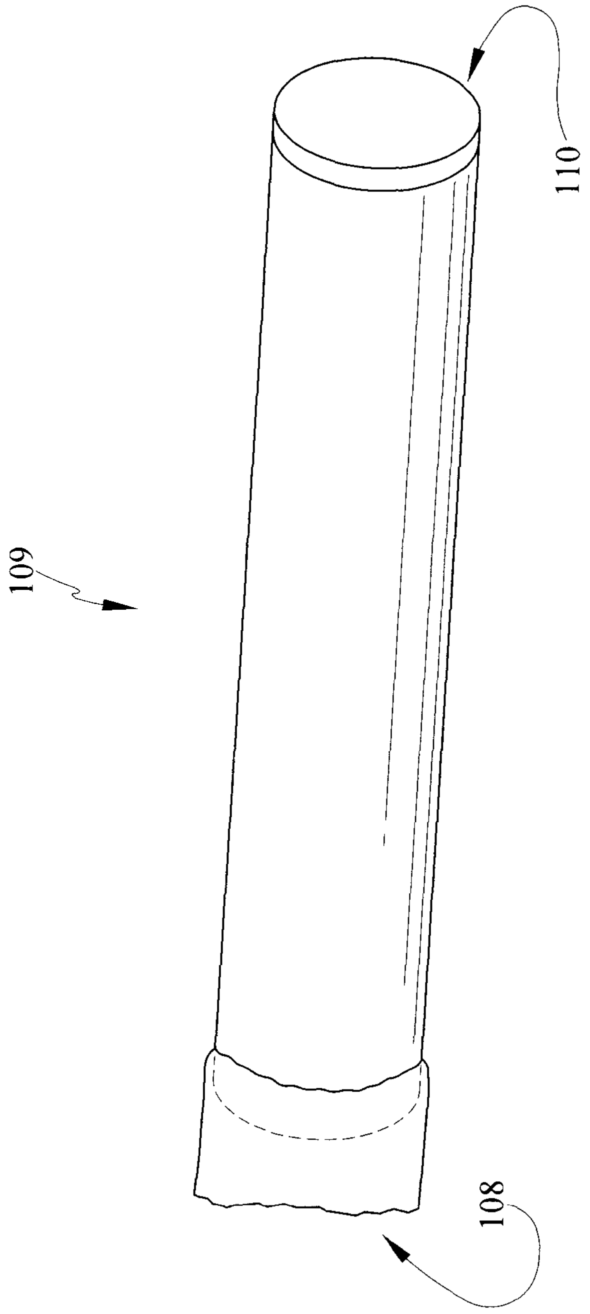
FIG. 26 shows a tube arrangement of FIG. 21.
Figure 27:
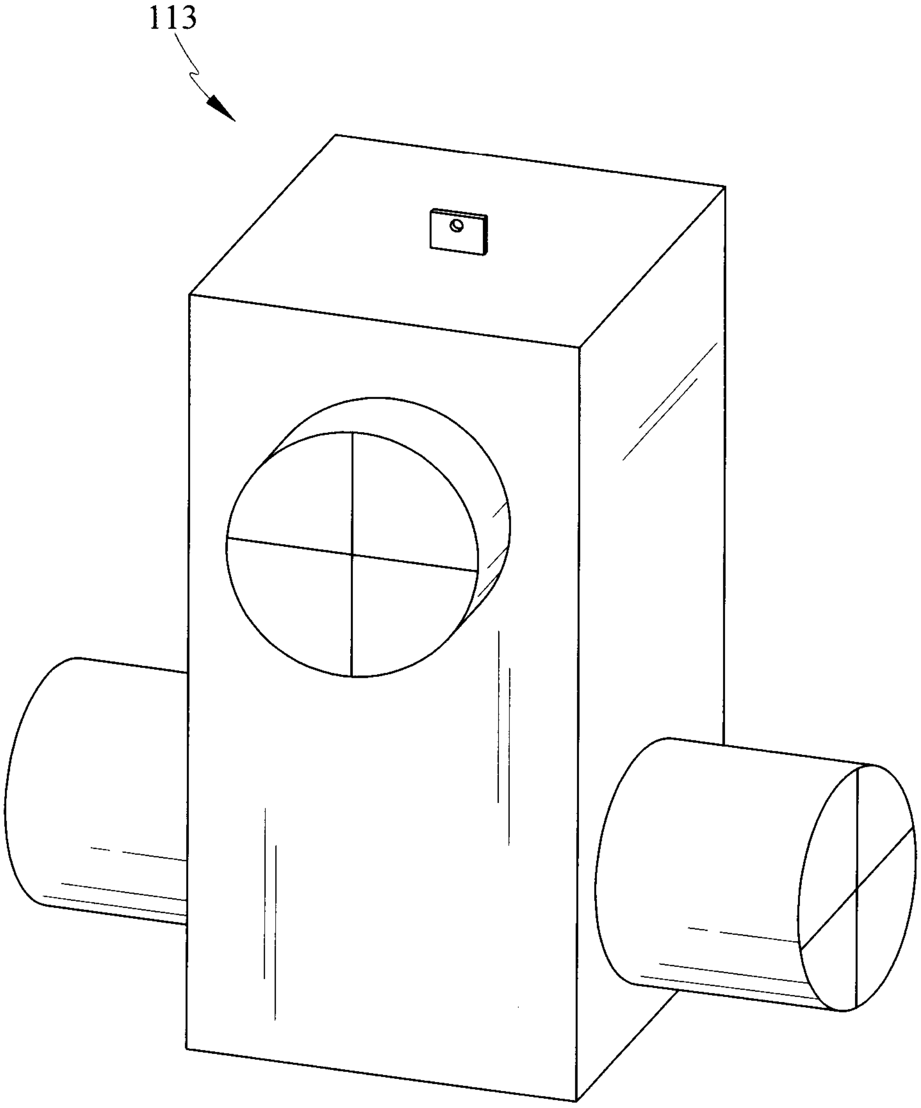
FIG. 27 shows a manifold arrangement of FIG. 21.

The dust is then carried to an adjustable, rigid sand/air handling tube arrangement 109 (FIG. 26). The purpose of the adjustable air handling tube arrangement 109 is to allow for the varying connection distances to the connector arrangements 107. The dust is then carried to the ninety-degree step manifold arrangement 113 (FIG. 27). The ninety-degree step manifold 113 allows for the making of turns with the air handling tubes and for the allowance of a right or left hand orientation.

Figure 28:
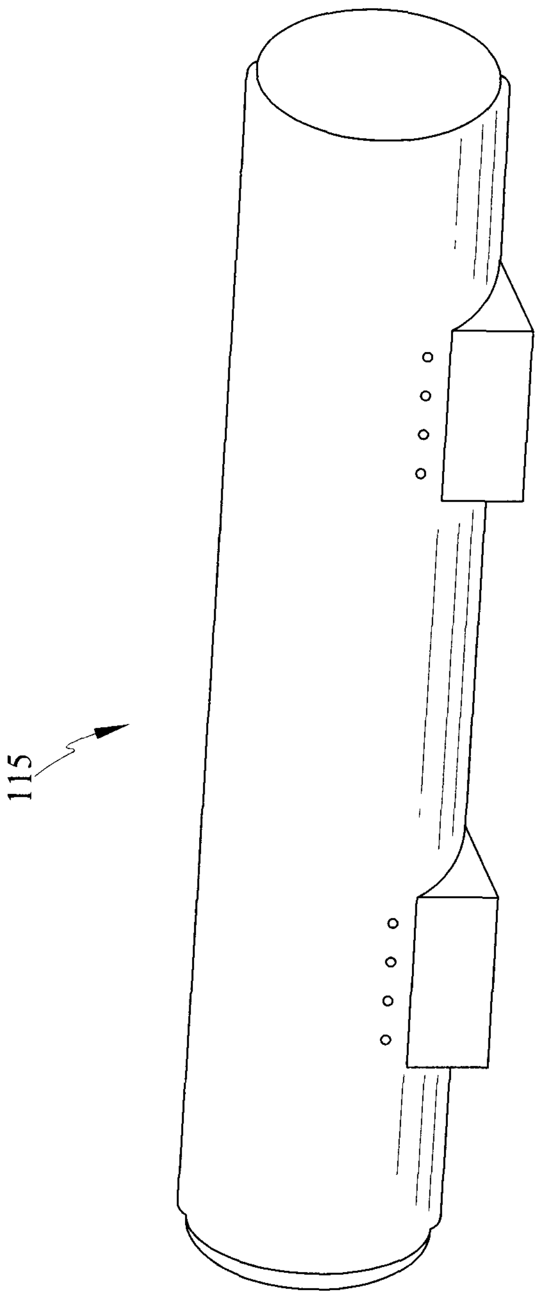
FIG. 28 shows a manifold arrangement of FIG. 21.
Figure 29:
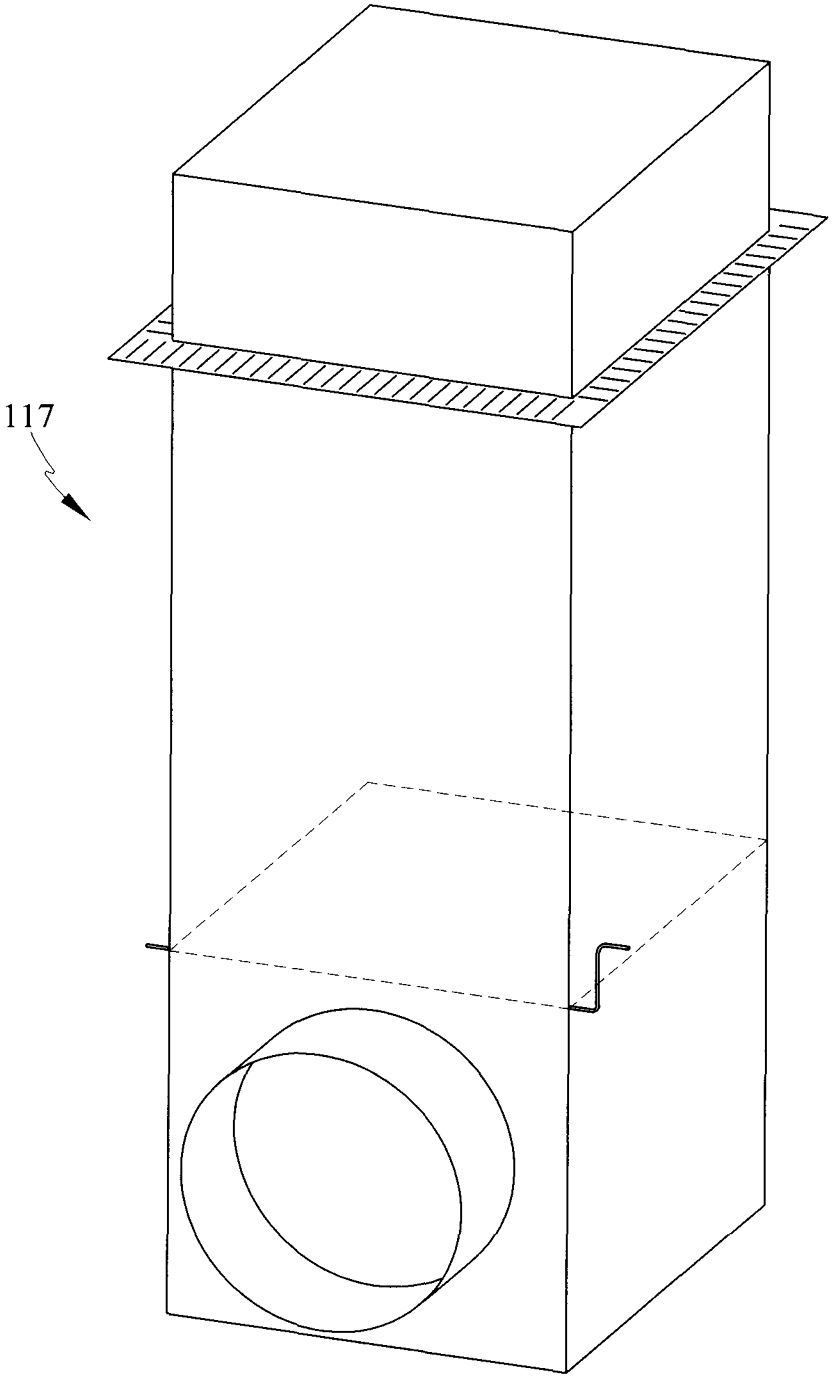
FIG. 29 shows a back view of a riser arrangement of FIG. 21.
Figure 30:
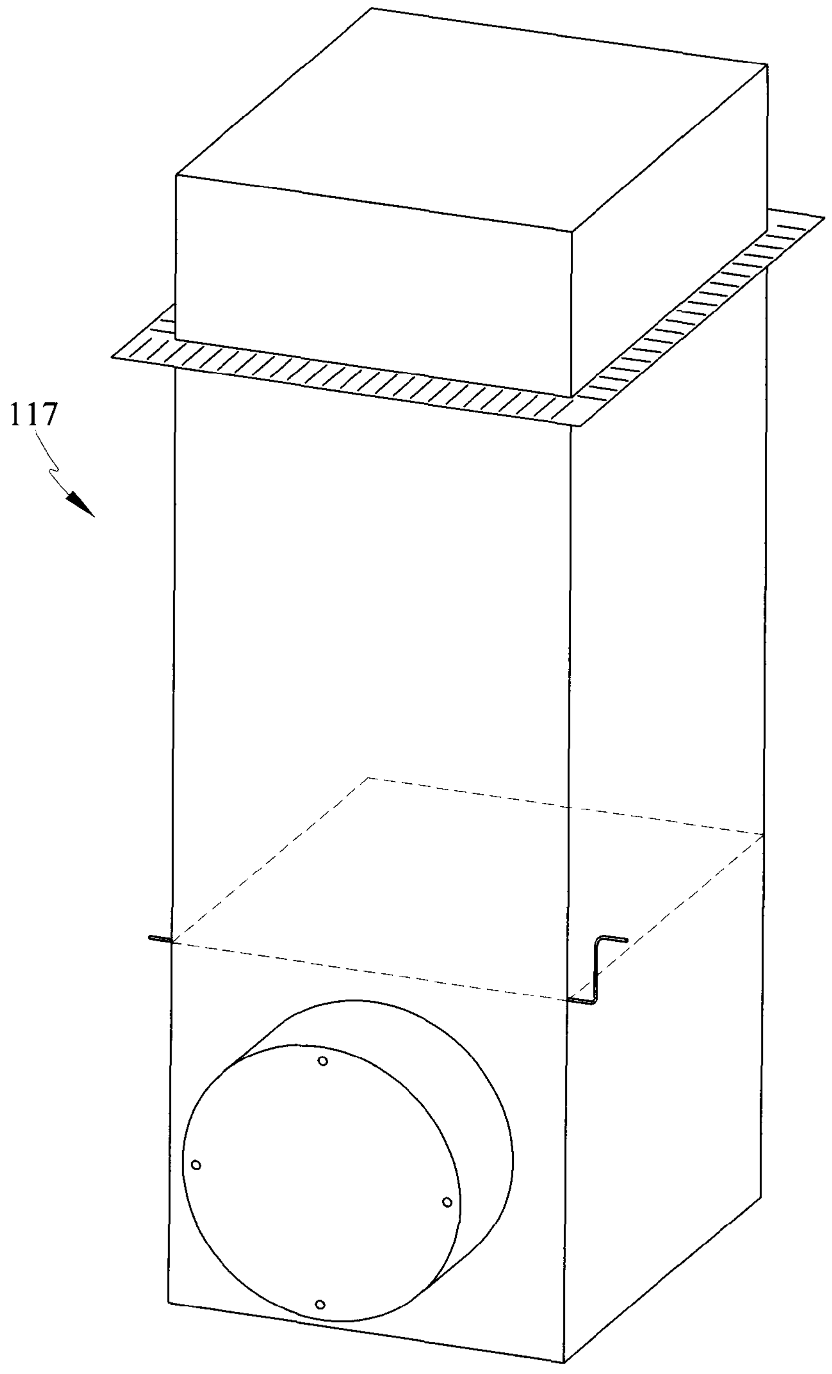
FIG. 30 shows a front view of a riser arrangement of FIG. 21.
Figure 34:
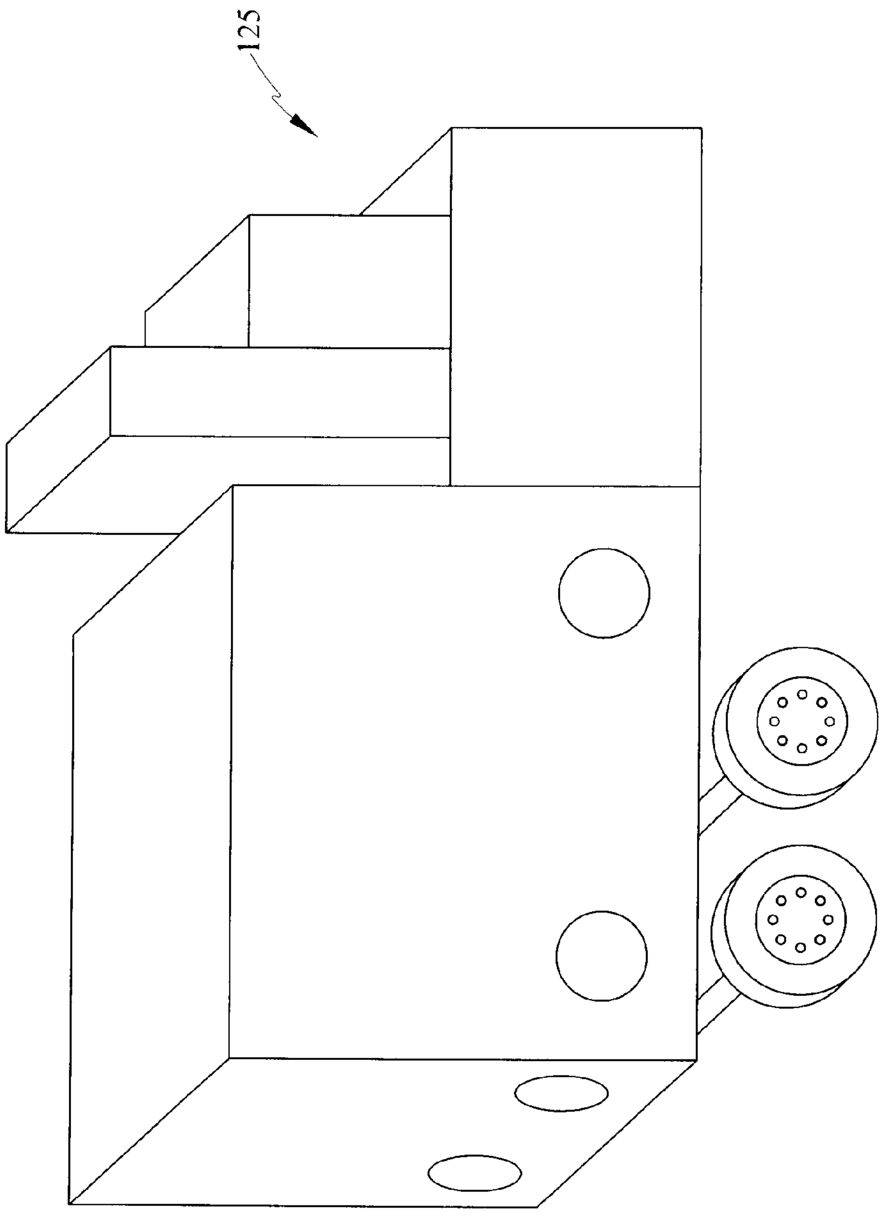
FIG. 34 shows a collector unit of FIG. 21.

The dust is then carried to the dual-riser manifold arrangement 115 (FIG. 28). The dual-riser manifold 115 is a tubing that has rectangular mating flanges that are attached to the tubing for the purpose of mating the round tubing to the two riser arrangements 117 (FIGS. 29 and 30). The dust is then carried to the dual riser arrangements 117, which are designed to take the vacuum from the vacuum source and elevate the air or vacuum to the desired height. The dual riser arrangements 117 also have open/close doors built into them with locking devices for control of airflow. The dust is then finally collected in a dust collector unit 125 (FIG. 34).

Figure 31:
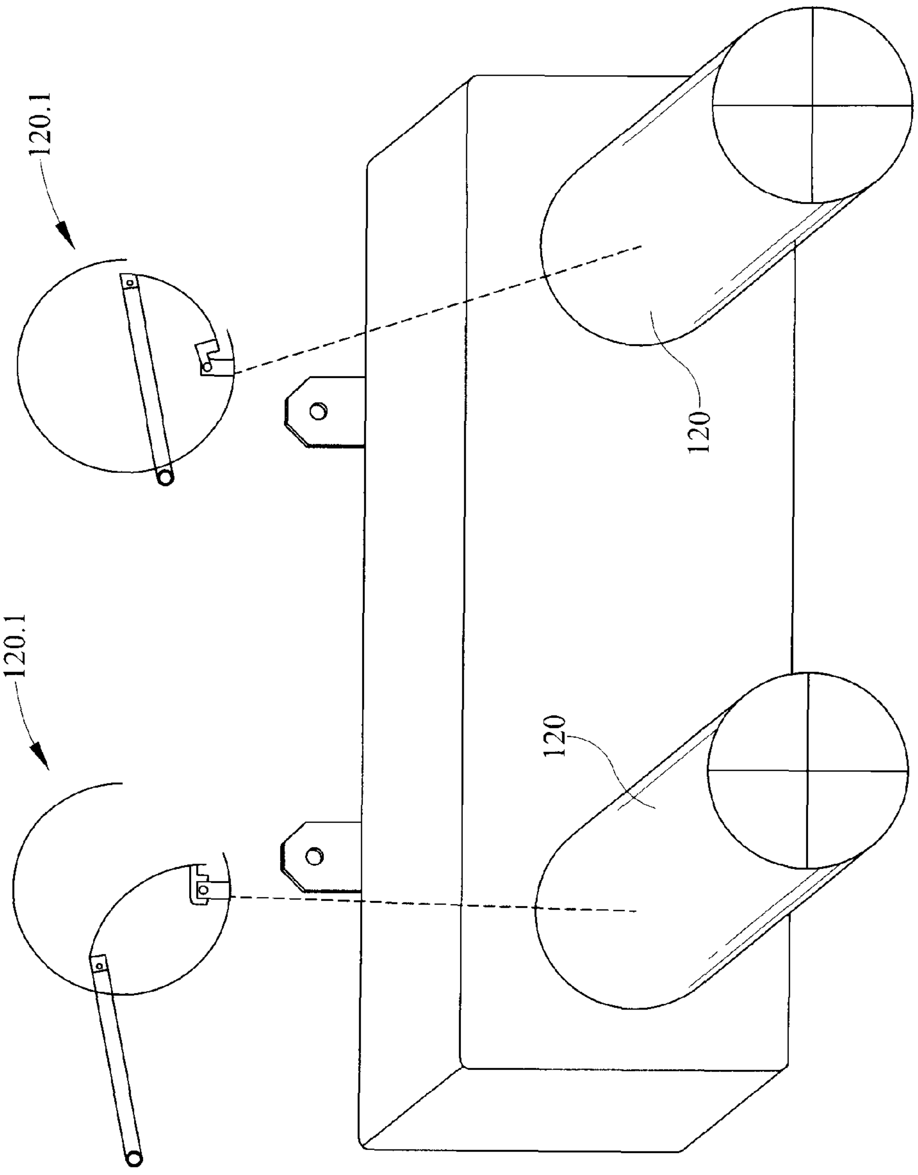
FIG. 31 shows a belt manifold arrangement of FIG. 21.
Figure 32:
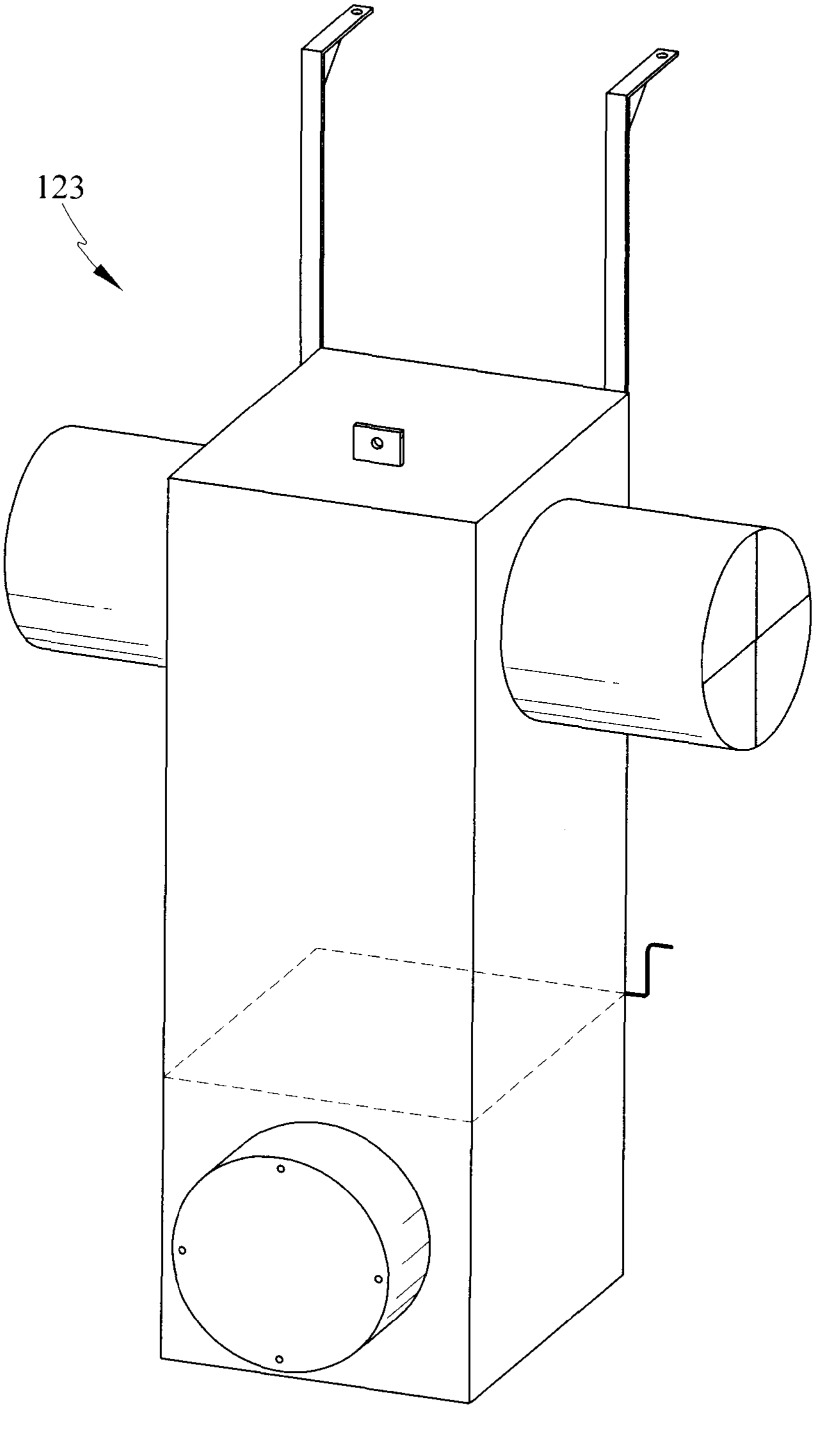
FIG. 32 shows a front view of a riser arrangement of FIG. 21.
Figure 33:
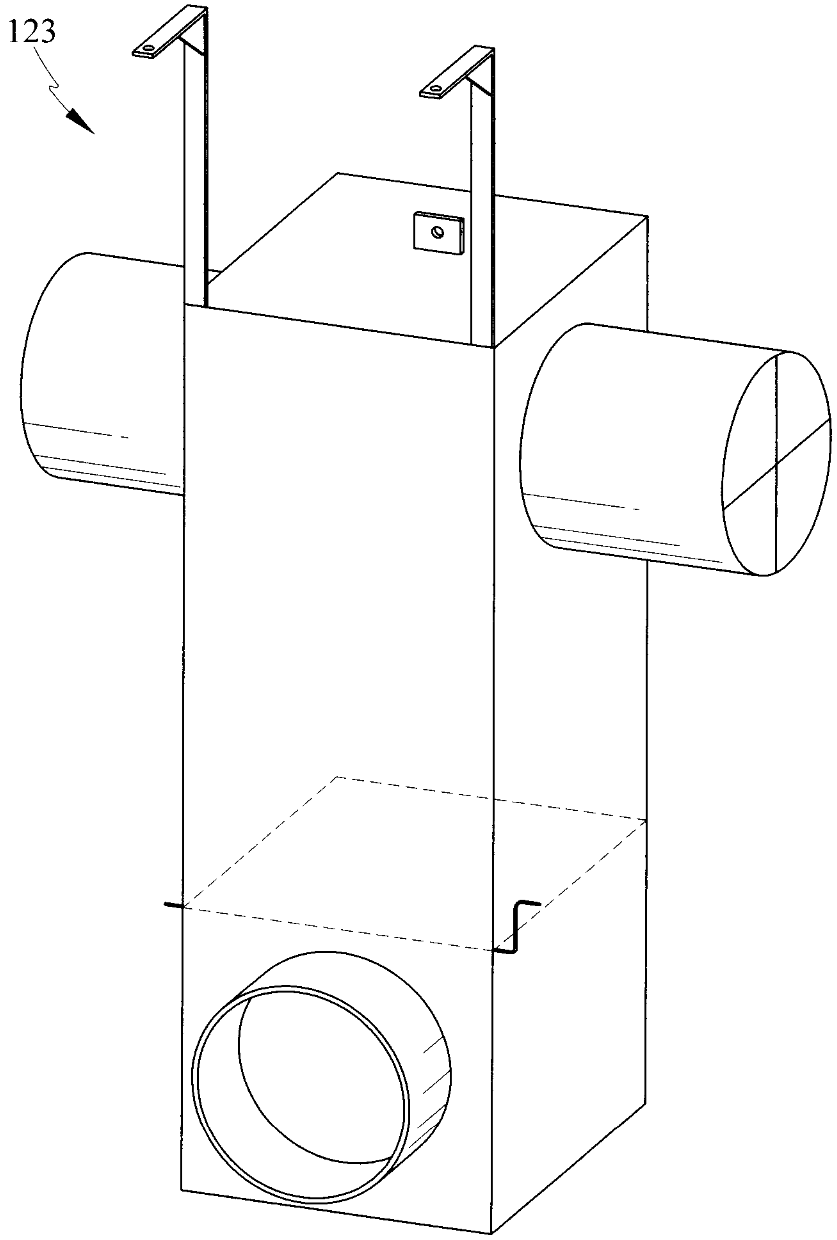
FIG. 33 shows a back view of a riser arrangement of FIG. 21.

Another part of the collecting arrangement is collecting dust at the discharge slides of the sand blender T-belt. This is done by the T-belt manifold arrangement 119 (FIG. 31). The T-belt manifold arrangement 119 pulls the dust at the discharge openings of the T-belt and can be used in a right or left hand orientation. This manifold arrangement 119 is designed to be used on one of two blending units by the manipulation of built-in open/close door assemblies 120.1 located in each of tubes 120. The dust is then taken from the T-belt manifold arrangement 119 by tubing to the blender feed belt riser arrangement 123 (FIGS. 32 and 33), which takes vacuum from the source and elevates the air to the desired elevation. This arrangement is designed to be used in either a left or right hand configuration. The blender feed belt riser arrangement 123 has an open/close door built into it. The dust from the blender area is also finally collected in the collector unit 125.

Figure 35:
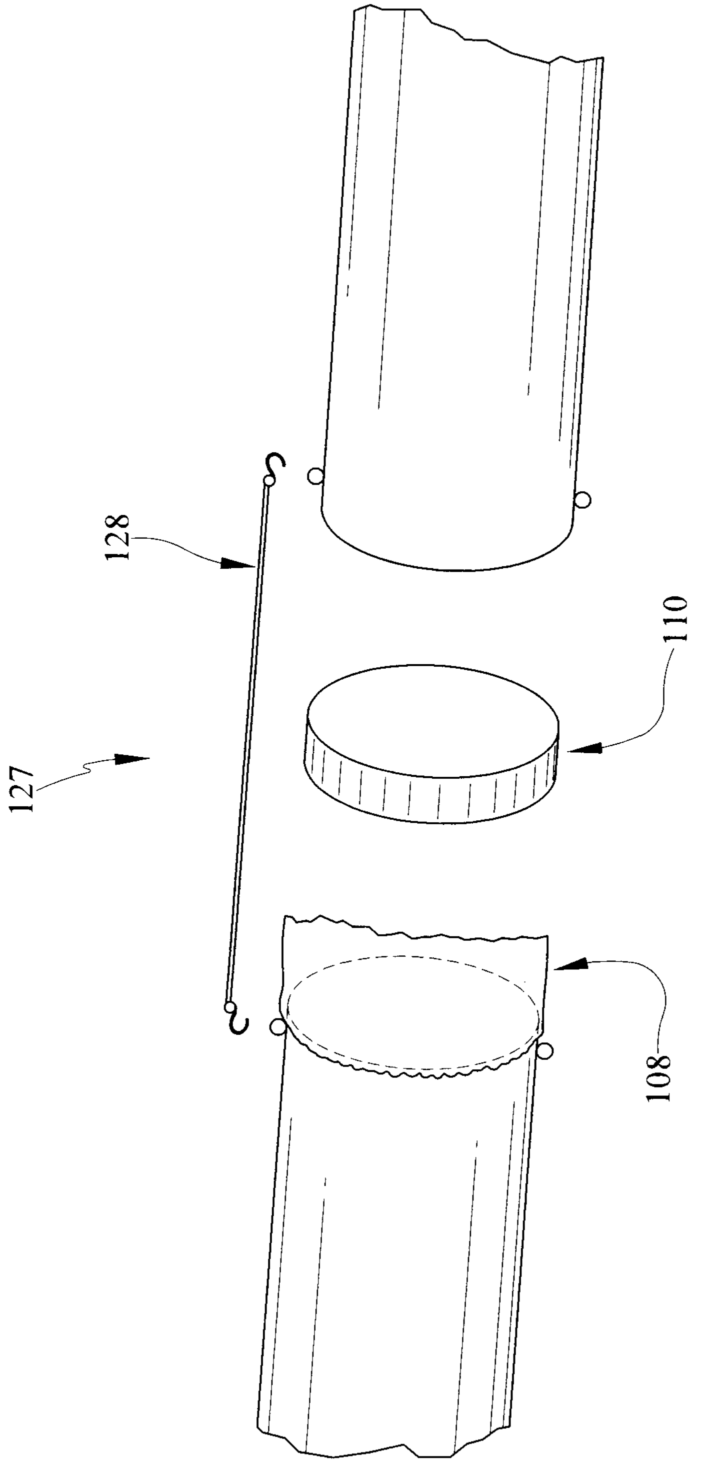
FIG. 35 shows a tube connector according to at least one embodiment of the application.

FIG. 35 shows a tube connector 127 according to at least one embodiment of the application. The tube connector 127 is used for connecting large diameter pipe in vacuum applications. The pipes are connected with a steel, plastic, or aluminum alignment insert 110. The connection is then sealed with an elastic water tight sock 108, and finally pulled together with an elastic strap 128.

Figure 36:
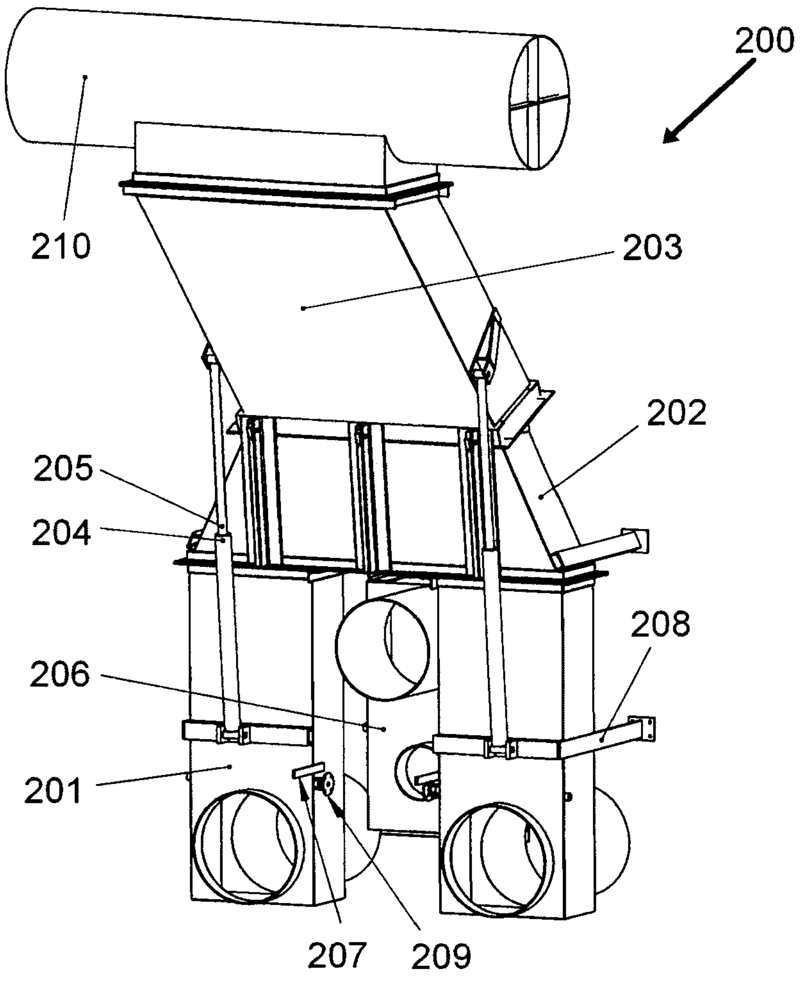
FIG. 36 shows an embodiment of an inlet arrangement for the collection device similar to the embodiment shown in FIG. 20.
Figure 37:
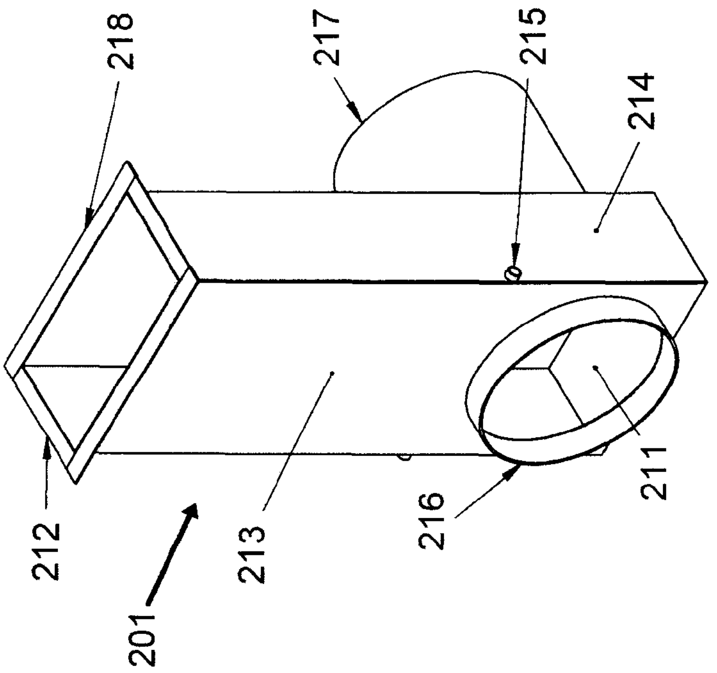
FIG. 37 shows a side inlet box of the inlet arrangement of FIG. 36, and FIGS. 38 and 39 show front and side views thereof.
Figure 39:
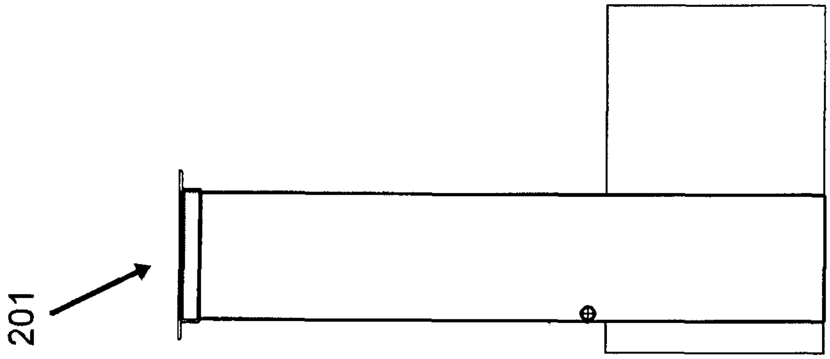
Figure 38:
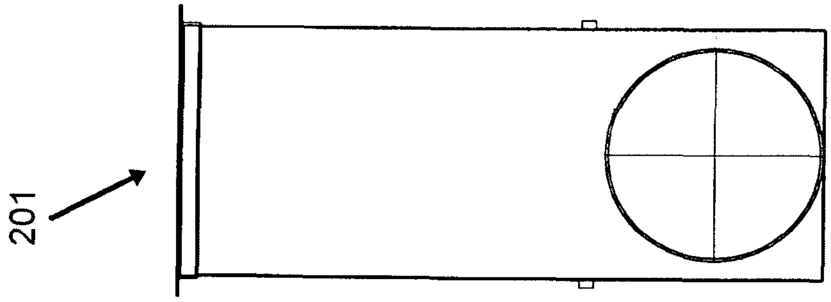
Figure 40:
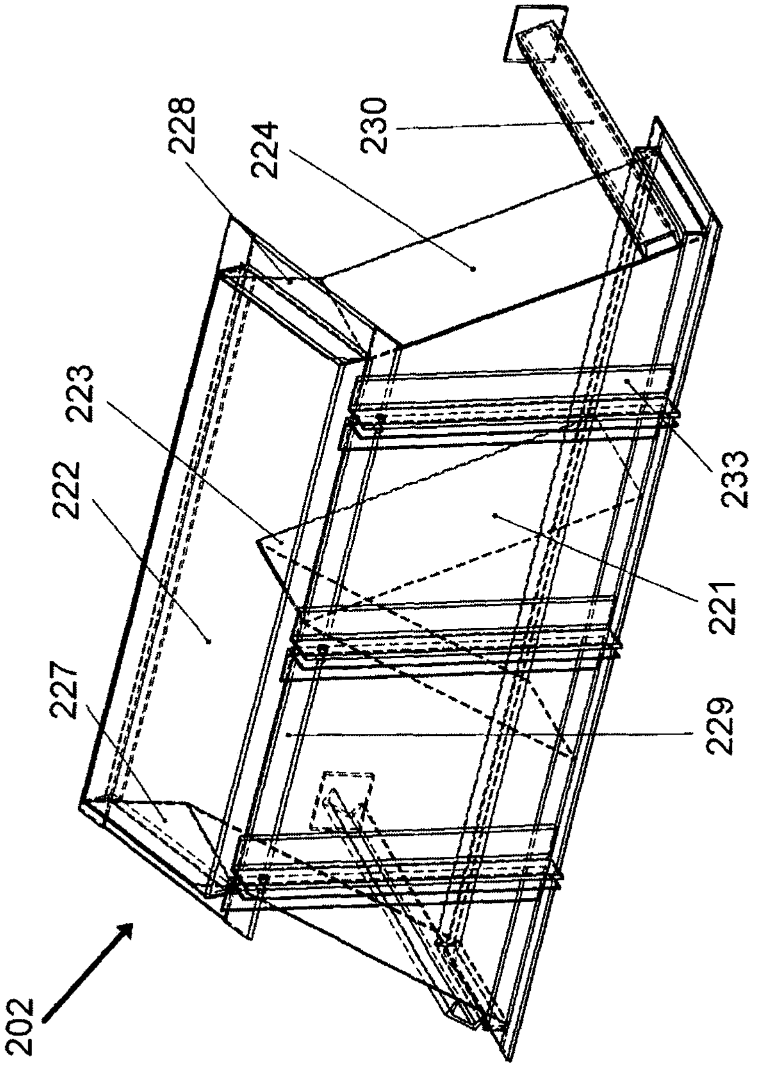
FIG. 40 shows a lower inlet transition of the inlet arrangement of FIG. 36.

FIG. 36 shows an embodiment of an inlet arrangement 200 for the collection device similar to the embodiment shown in FIG. 20. The inlet arrangement 200 is mounted on the dust collector and connects the dust collector to the manifolds of the dust collection system to provide the suction force to the various intakes at the storage devices. The inlet arrangement 200 has a connecting inlet 210 which connects to the connector box 71 or a pipe connected to the connector box 71. The connecting inlet 210 is connected to the upper inlet transition 203, either directly as shown in FIG. 36, or by an extension box 280, shown in FIG. 51. The upper inlet transition 203 is connected to the lower inlet transition 202, which in turn is connected to a pair of side inlet boxes 201. The side inlet boxes 201 have valves or flaps therein which can be opened and closed to unblock or block the flow of air there through and into the dust collector, which valves or flaps can be pivoted or moved via actuators 209. A central inlet box 206 is located between the side inlet boxes 201. The inlet arrangement 200 is partially articulated between the upper inlet transition 203 and the lower inlet transition 202. To move the upper inlet transition 203, a pair of piston rods 205 are used. Each piston rod 205 is held in a piston bore 204, each of which is mounted on a mounting bracket 208. The pistons can be extended and retracted such that the upper inlet transition 203, and the connection inlet 210 connected thereto, can be pivoted upwardly and downwardly with respect to the lower inlet transition 202, such that the upper inlet transition 203 is folded down and in front of the central inlet box 206. Support pieces 207 provide stabilizing support to the upper inlet transition 203 when it is folded down. FIG. 37 shows the side inlet box 201, and FIGS. 38 and 39 show front and side views thereof. The side inlet box 201 has a generally elongated box shape with a front panel 213, side panels 214, and bottom panel 211, which elongated box shape can be approximately 24 inches by 48 inches by 12 inches. The side inlet box 201 has an upper opening surrounded by a connecting flange comprising side sections 218 and end sections 212. The connecting flange can be approximately 28 inches by 16 inches. The side inlet box 201 has around inlet opening 216 and a connecting tube 217, each of which has an inner diameter of approximately 20 inches. The round inlet opening 216 can be three inches long, and the connecting tube 217 can be approximately 18 inches long. Actuator connections or mounting points 215 are also shown. FIG. 40 shows the lower inlet transition 202, which has a generally trapezoidal front panel 221, a generally trapezoidal rear panel 222 with an upper extension, generally trapezoidal upper side panels 227, and generally rectangular lower side panels 224. The upper opening is surrounded by a support flanges 228 and 229, which are designed to contact the upper inlet transition 203. A mounting bar connects the lower inlet transition 202 to the dust collector. Diverter panels 223 split the flow of air to the two inlet boxes 201. Brackets 233 form part of the articulated or pivoting connection between the lower inlet transition 202 and the upper inlet transition 203.

Figure 41:
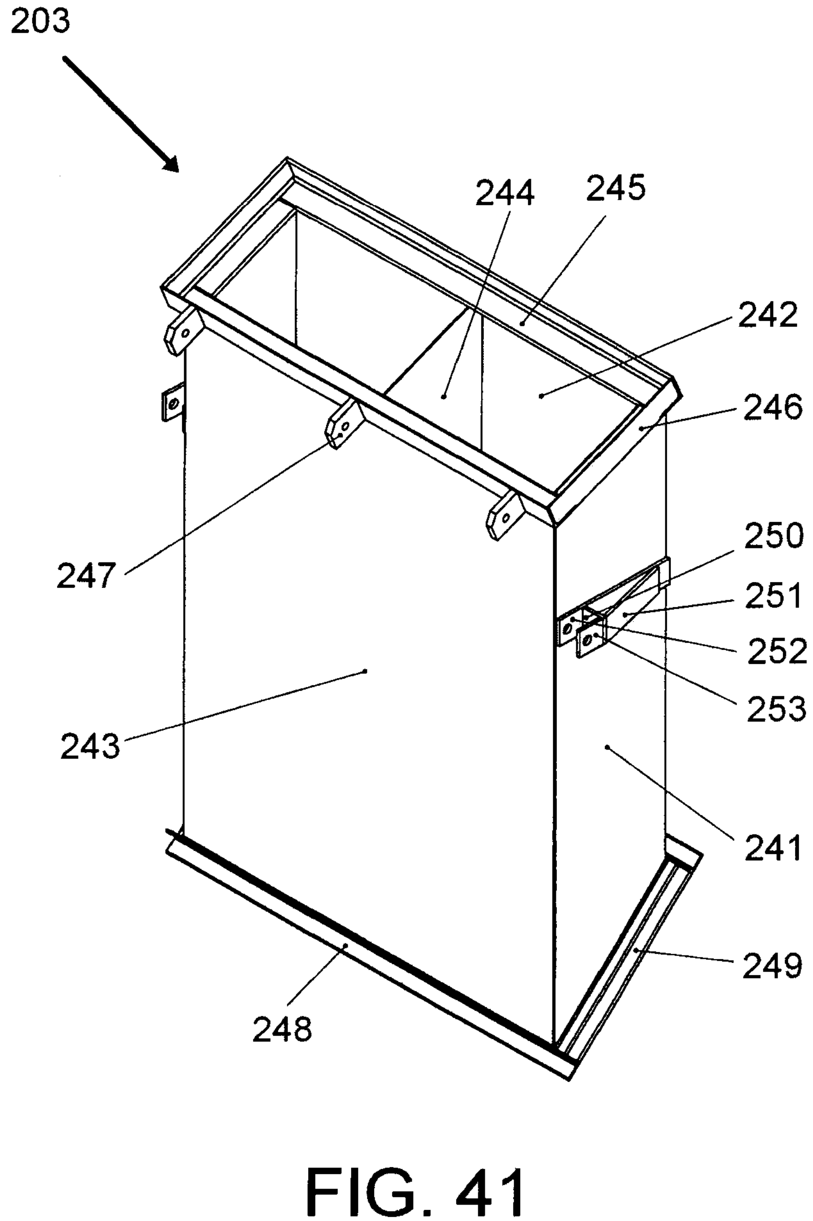
FIG. 41 shows an upper inlet transition of the inlet arrangement of FIG. 36.
Figure 42:
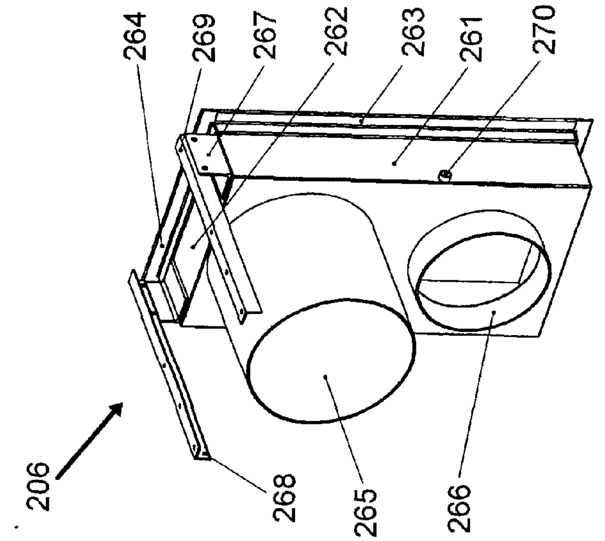
FIG. 42 shows a central inlet box of the inlet arrangement of FIG. 36, and FIGS. 43, 44, and 45 show additional views thereof.
Figure 45:
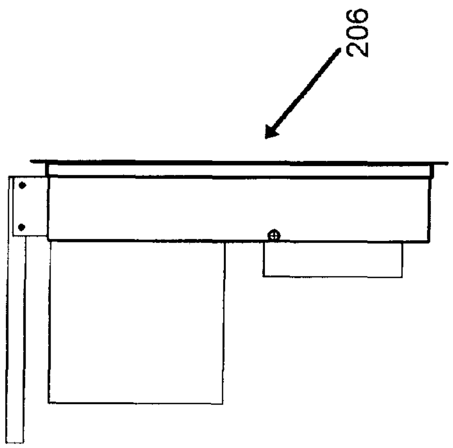
Figure 43:
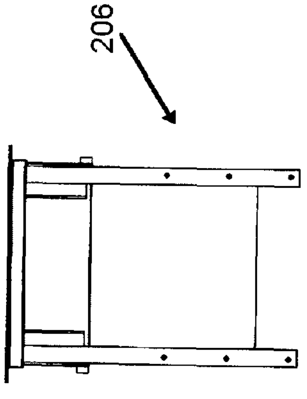
Figure 44:
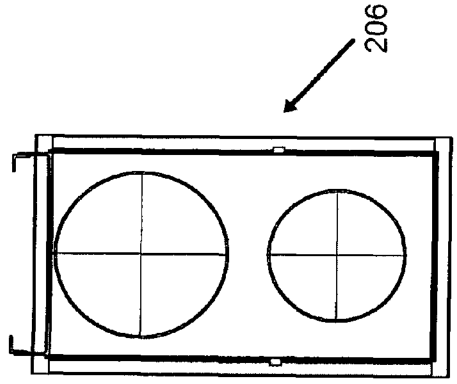
Figure 49:
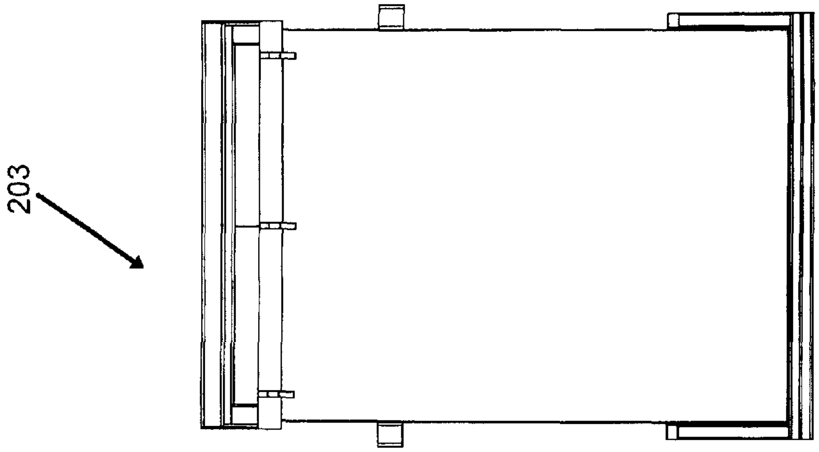
FIGS. 46, 47, 48, and 49 show additional views of the upper inlet transition of FIG. 41.
Figure 48:
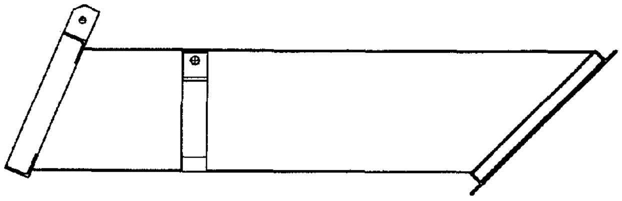
Figure 46:
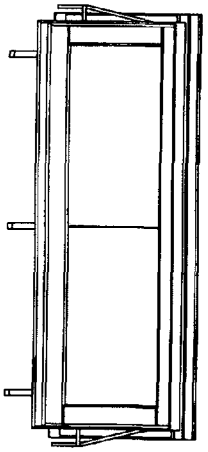
Figure 47:
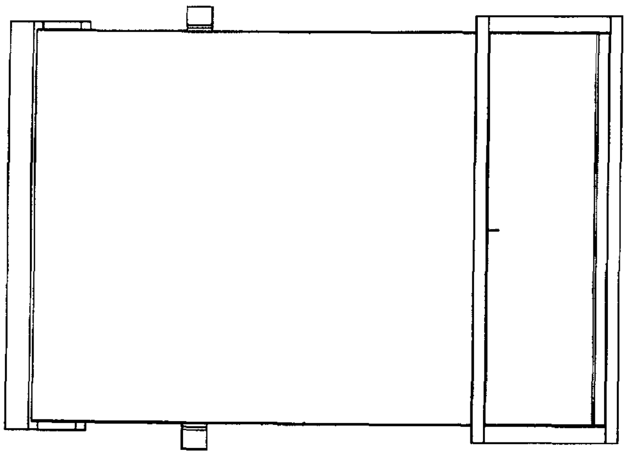
Figure 50:
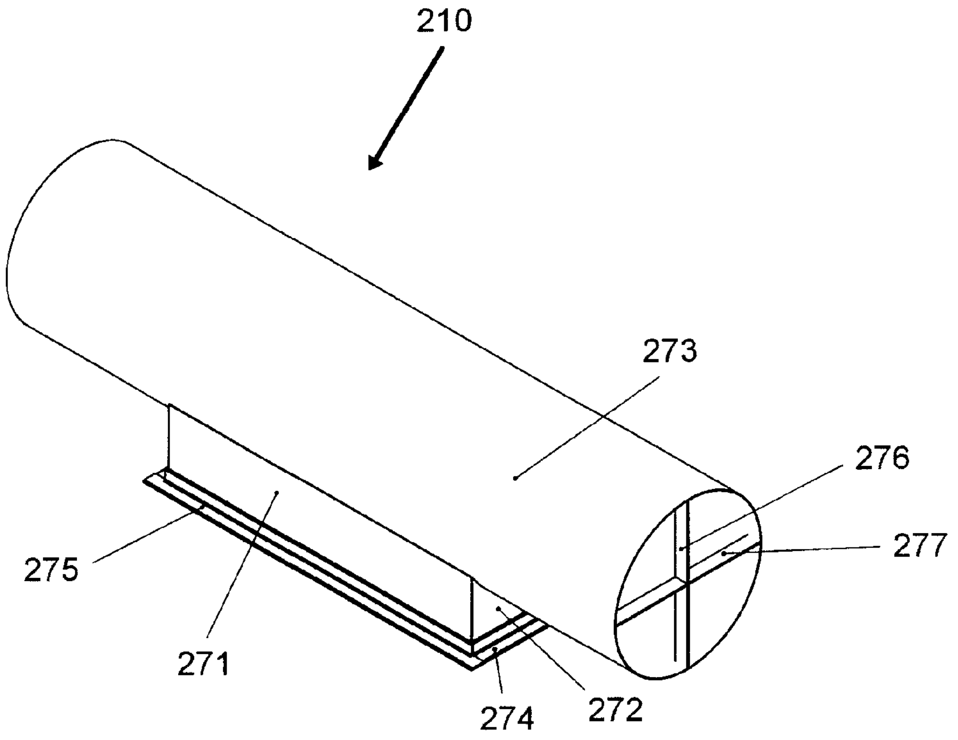
FIG. 50 shows a connecting inlet of the inlet arrangement of FIG. 36.
Figure 51:
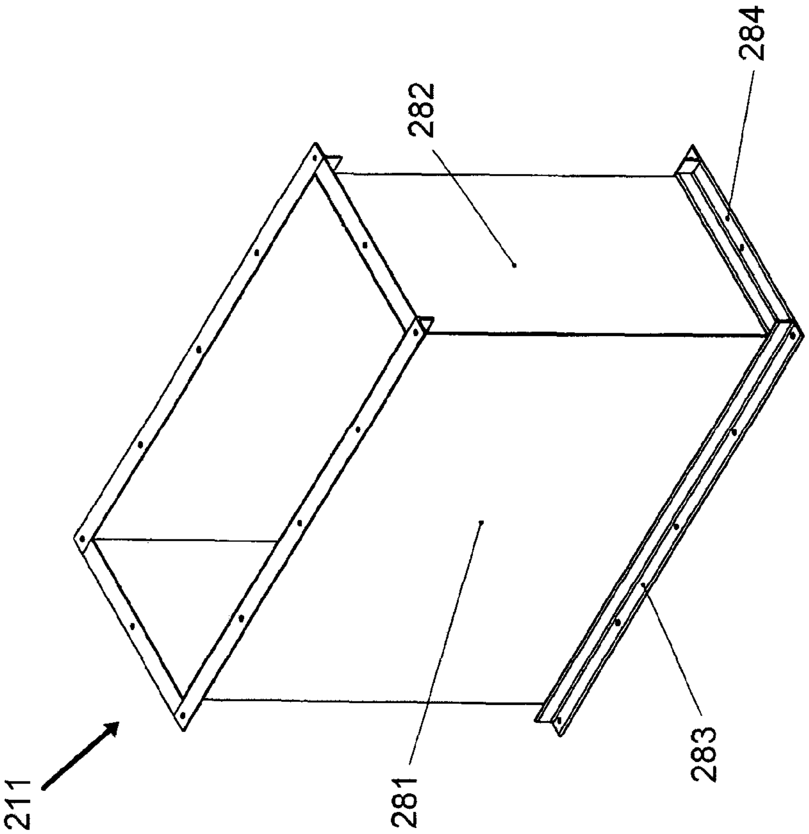
FIG. 51 shows an extension box of the inlet arrangement of FIG. 36.

FIG. 41 shows the upper inlet transition 203, which is generally box shaped with first panel 242, second panel 243, and side panels 241. Flanges 248, 249 surround the opening which contacts the connecting inlet 210 or the extension box 280. A divider 244 forms two air flow ducts or passages. An inner flange 245 and cover flange 246 form part of the connection to the lower inlet transition 202. Attached to the cover flange 246 are hinge pieces 247 which connect to the brackets 233 of the lower inlet transition 202 to form the articulated or pivoting connection which allows the movement of the upper inlet transition 203 with respect to the lower inlet transition 202. Mounting structures are used to connect the upper inlet transition 203 to the pistons 105, which mounting structures comprise a hinge bracket made up of two sides 252, 253 and a base 251, and are reinforced by a support piece 250. FIGS. 46, 47, 48, and 49 show additional views of the upper inlet transition 203. FIG. 42 shows the central inlet box 206, and FIGS. 43, 44, and 45 show additional views thereof. The central inlet box 206 has a generally box shaped frame with side panels 261 and top and bottom panels 262 bordering a front panel that has two openings therein. Inlet 265 is connected to the first opening and short inlet 266 is connected to the second opening. Inlet 265 is to be connected to a pipe, which pipe is to be connected to a suction port adjacent the end of the T belt and blender. Inlet 266 is simply an access port to permit cleaning of the interior of the central inlet box 206. Flanges 263, 264 surround the back edge of the central inlet box 206. Actuator connections or mounting points 270 are also shown. Support brackets 268, 269 are mounted to the top panel 262 by connecting pieces 267. The support brackets 268, 269 support the lower transition inlet 203 thereon. FIG. 50 shows the connecting inlet 210, which has a lower box shaped portion and an upper tubular portion mounted on the box shaped portion. The box shaped portion connects to the upper inlet transition 203, either directly or via extension box 280. The box shaped portion comprises front and back panels 271, side panels 272, and flanges 274, 275. The tubular portion comprises a tube 273 and cross pieces 276, 277. FIG. 51 shows the extension box 280, which comprises front and back panels 281, side panels 282, and flanges 283, 284.

Figure 52:
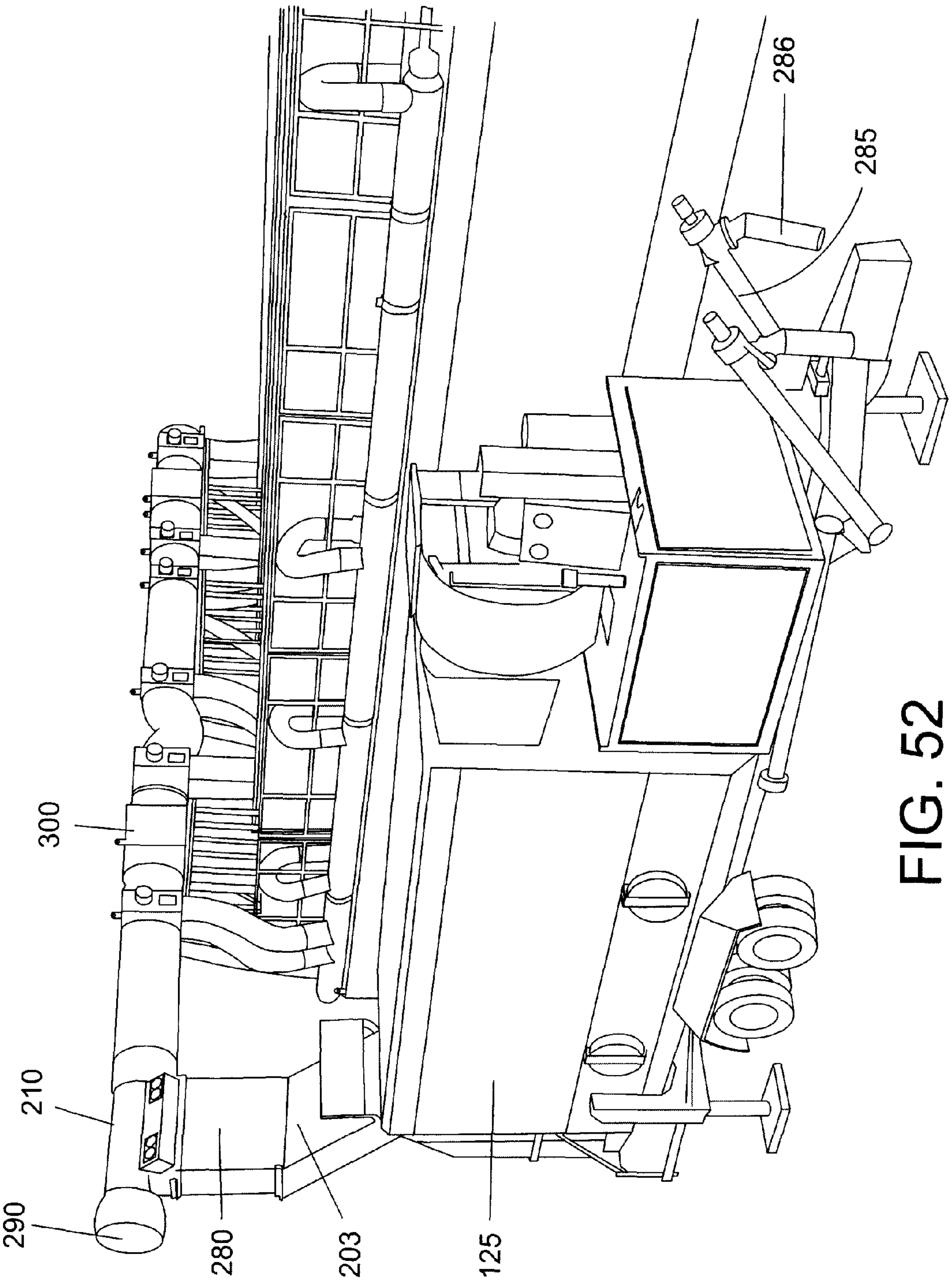
FIG. 52 shows an overall view of the dust collection system according to at least one possible embodiment.

FIG. 52 shows an overall view of the dust collection system according to at least one possible embodiment. As can be seen in FIG. 52, the upper inlet transition 203 connects to the extension box 280, which is in turn connected to the connecting inlet 210. The connecting inlet 210 is covered on one end by an end covering 290, while the other end of the connecting inlet 210 is connected to the rest of the dust collection system. The dust collector 125 is equipped with dispensing augers 285 and dispensing tubes 286. FIG. 52 shows the end of the dust collector 125, specifically the dispensing augers 285 and dispensing tubes 286. In operation, the augers 285 conduct dust out of the dust collector 125, and then drop the dust out through the dispensing tubes 286 into a collection device or container, such as bags.

Figure 53:
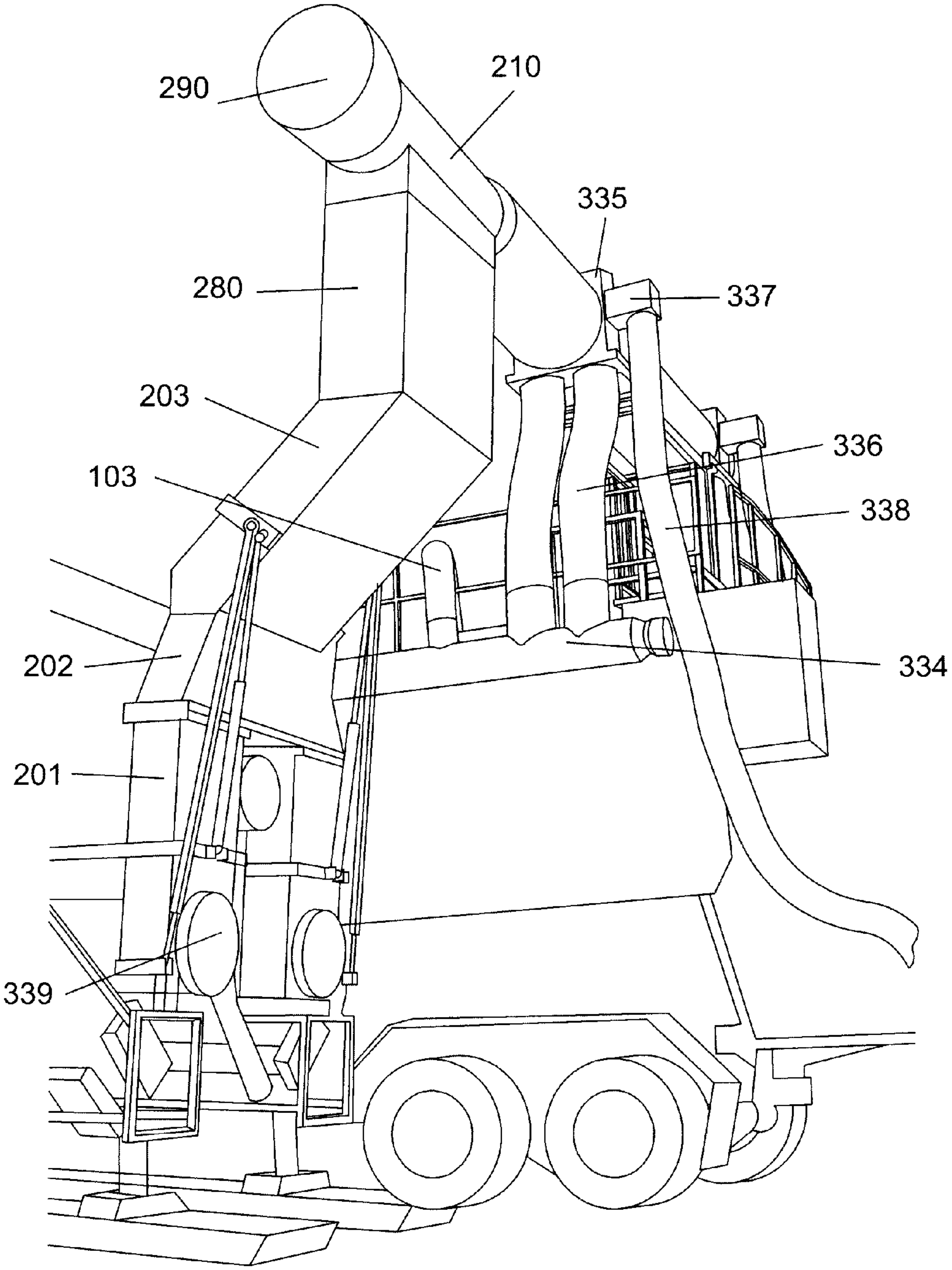
FIG. 53 shows an overall view of the dust collection system according to at least one possible embodiment.

FIG. 53 shows an overall view of the dust collection system according to at least one possible embodiment. As can be seen in FIG. 53, the proppant storage trailers are elevated off of the ground. The extension box 280 is therefore useful in extending the height at which the connecting inlet 210 can be positioned. The connecting inlet 210 is connected by a pipe to a connector box 335. The connector box 335 is connected by connector box hoses 336, which can be 12 inch hoses, to a generally pipe-shaped manifold 334. In operation, dust travels through the jumper hoses 103 and into the manifold 334, then through the connector box hoses 336, then through the connector box 335, and then through the inlet arrangement 200 to the dust collector 125. The connector box 335, in the embodiment shown, has an extension box 337 to which dragon's tail hoses 338 can be connected. The dragon's tail hoses 338 can be connected to any suction port adjacent the dragon's tail, which will be discussed herein below. In the embodiment shown, the openings in the side inlet boxes 201 are closed by cover hatches 339.

Figure 54:
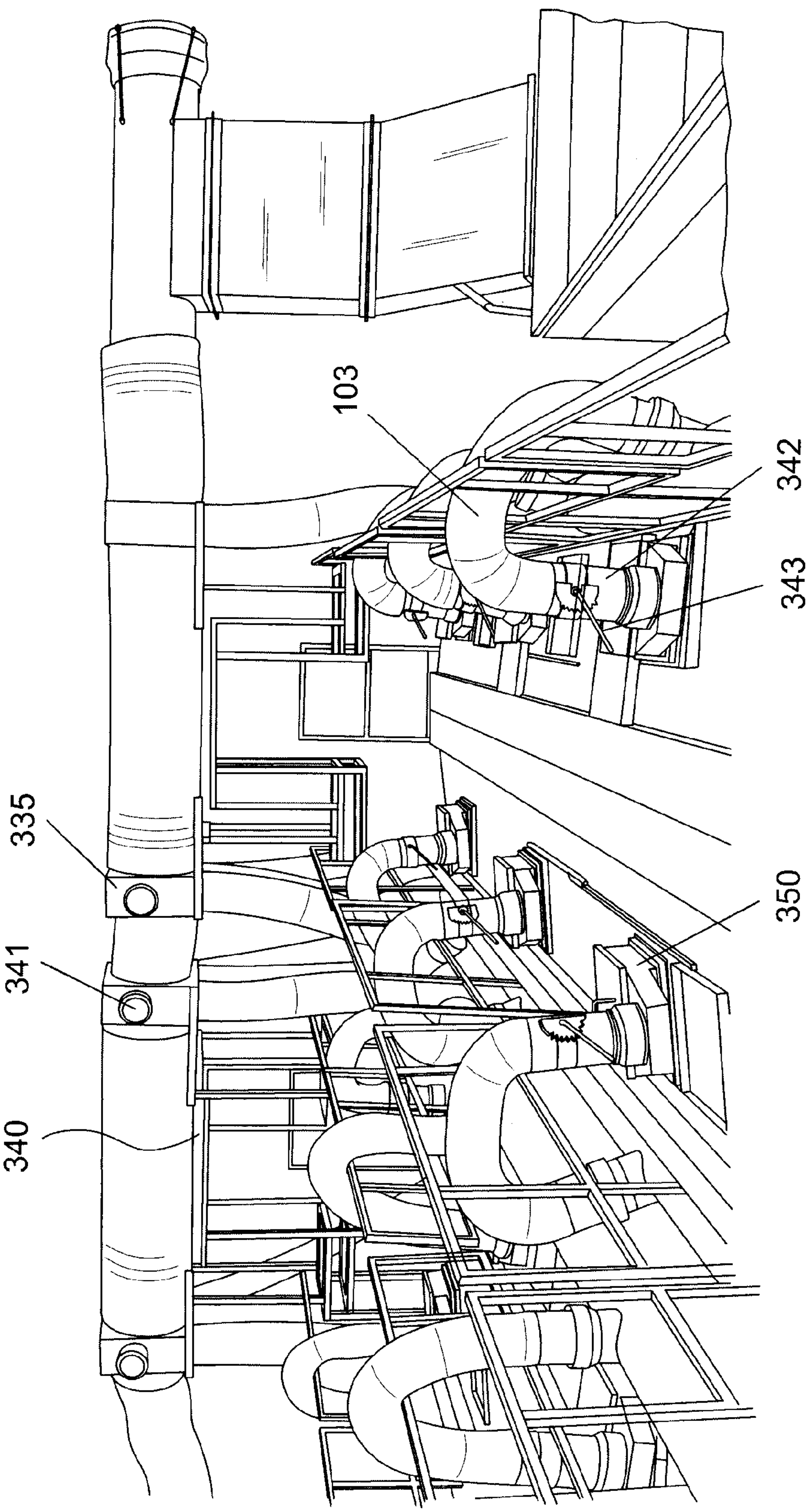
FIG. 54 shows an additional view of the dust collection system of FIG. 53.

FIG. 54 shows an additional view of the dust collection system of FIG. 53. The table arrangement 340 can be clearly seen, on which two of the connector boxes 335 are supported or mounted. Each of the connector boxes 335 has a jumper hose connector 341 which permits a jumper hose 103 to be directly connected to the connector box 335. In the embodiment shown, the jumper hose connector 341 is covered with a cap or other covering since it is not in use. The jumper hoses 103 are each connected to a valve arrangement 342. Each of the valve arrangements 342 is openable and closable via a valve handle 343 to control flow of air therethrough. The valve arrangements 342 connect the jumper hoses 103 and door assemblies 350. The valve arrangements 342 can either be integral with the jumper hoses 103, or can be integral with the door assemblies 350. Alternatively, the valve arrangements 342 could simply be separate pieces that could be connected to the jumper hoses 103 and the door assemblies 350 during set up and installation of the dust collection system.

Figure 55:
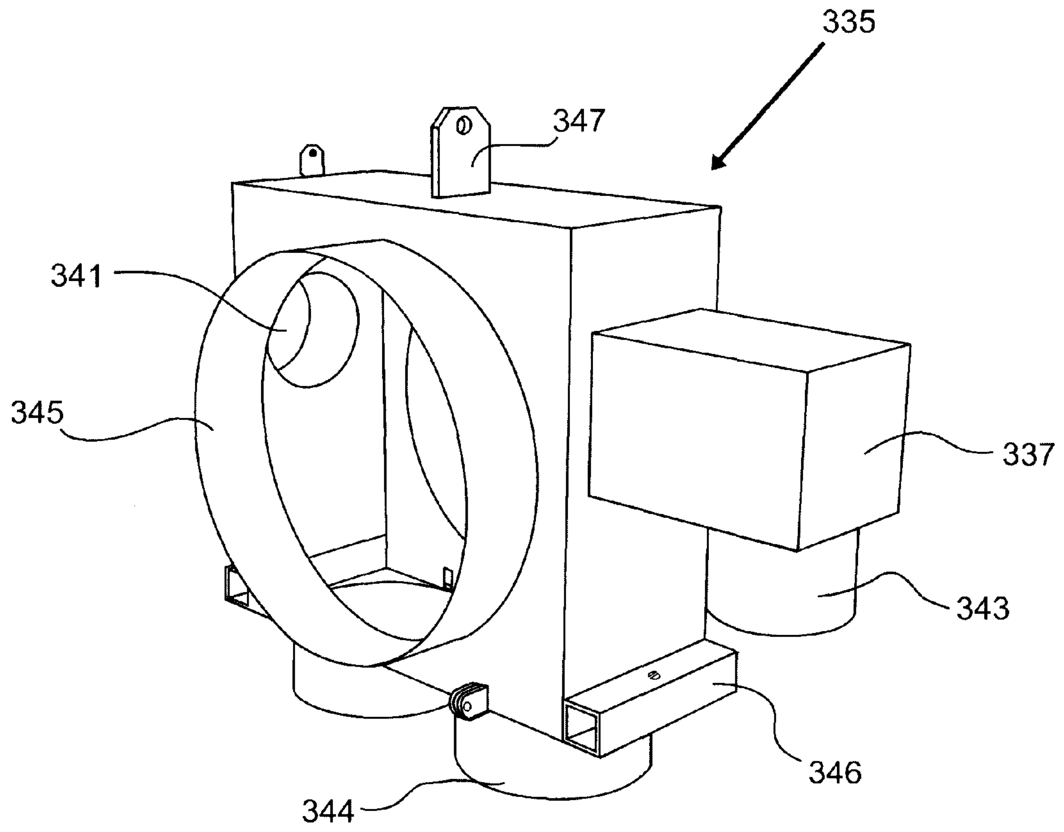
FIG. 55 shows an embodiment of a connector box.

FIG. 55 shows an embodiment of the connector box 335. As discussed previously, the connector box 335 has an extension box 337 that comprises an extension box pipe 343, which serves as a connection to the dragon's tail hoses 338. The connector box 335 similarly has connector box pipes 344 for connecting to the connector box hoses 336. The connector box 335 further has a connecting ring 345 which serves as the connection to the large pipes, which can be 24-inch pipes. A pair of mounting sleeves 346 are used to connect or mount the connector box 335 onto the table arrangement 340. A lifting eye or tab 347 is located on top of the connector box 335, to which a crane hook can be connected for lifting the connector box 335. In at least one possible embodiment, the connector box 335 can be approximately 28"×28"×12". The extension box 337 can be approximately 13 inches long by 8.75" wide. The connecting ring 345 can be approximately 23.75" in diameter, the connector box pipes 344 can be approximately 11.75" in diameter, and the extension box pipe 343 can be approximately $7\frac{37}{64}$ inches in diameter. Each of the ring and/or pipe diameters can be selected or adjusted as necessary depending on the size of the pipes to be connected to the connector box.

Figure 56:
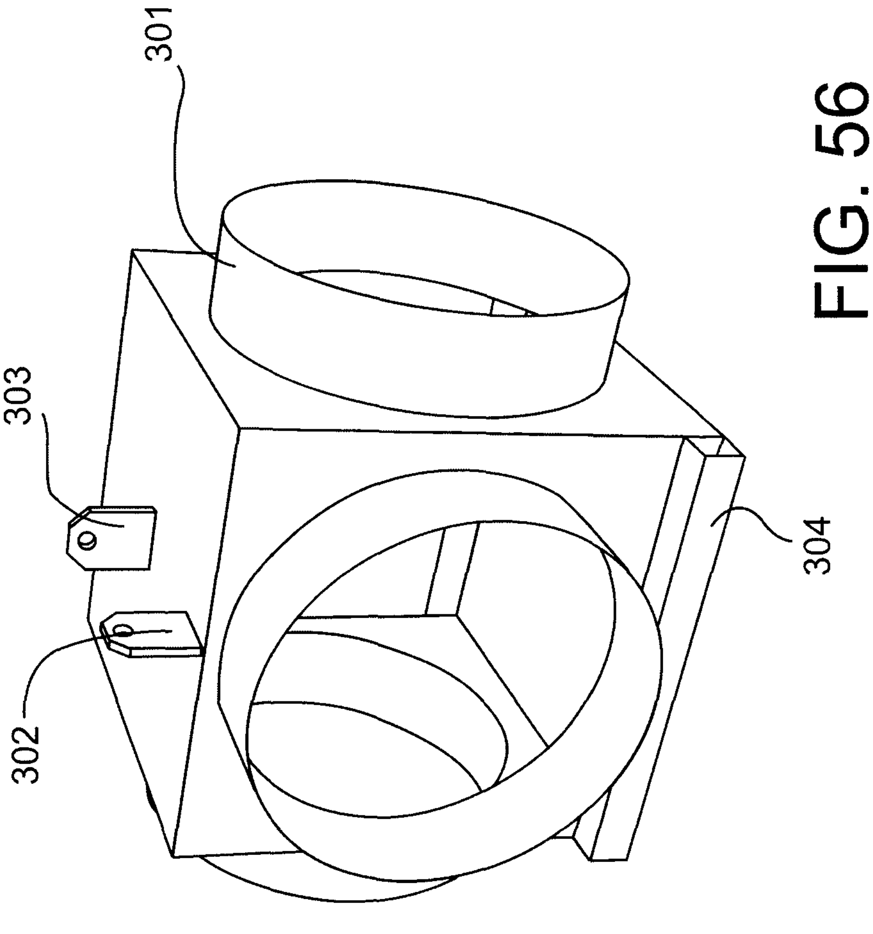
FIG. 56 shows an embodiment of a T-box.

FIG. 56 shows an embodiment of the T-box 300. The T-box 300 has three connecting rings 301 to connect to rigid or flexible pipes. The T-box 300 also has a support tab 302, to which a guide or support structure, such as a wire, can be connected in order to support a flexible pipe suspended between two proppant storage trailers. The T-box 300 also has a lifting eye 303. A pair of mounting sleeves 304 are used to mount or connect the T-box 300 to the table arrangement 340. In at least one possible embodiment, the three connecting rings 301 can be approximately 23.5" in diameter, and the T-box 300 itself can measure 28"×28"×28".

Figure 57:
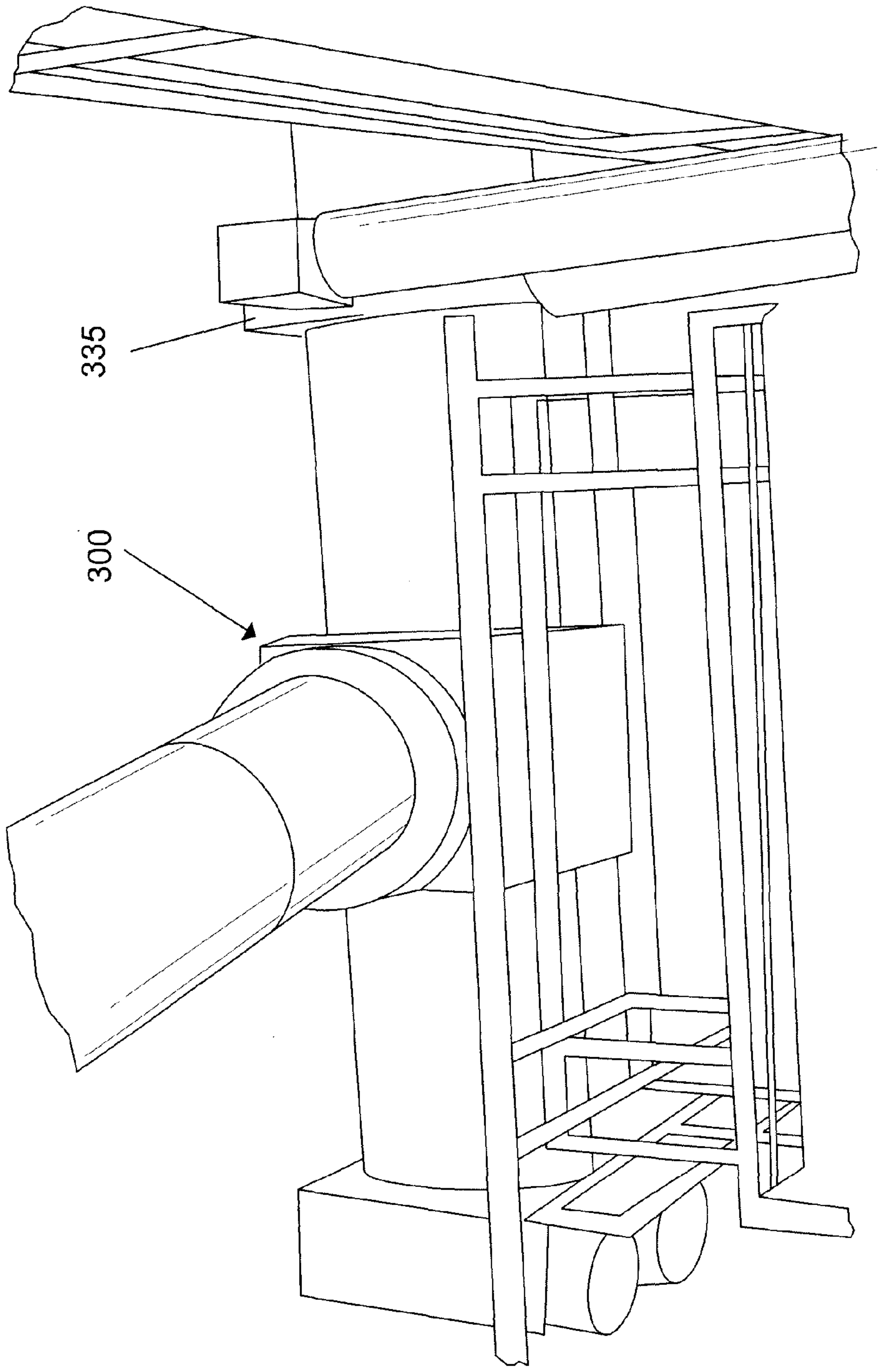
FIG. 57 shows a view of a portion of the dust collection system including the T-box.

FIG. 57 shows a view of a portion of the dust collection system including the T-box 300. The T-box 300 and the connector boxes 335 are mounted on the table arrangement 340 by their respective mounting sleeves 304, 346. An elongated rod or bar is slid through the mounting sleeves 304, 346, and then pins or other affixing structures are used to connect the T-box 300 and the connector boxes 335 to the rod or bar. A flexible pipe or hose is connected to the T-box 300, which pipe is extended over to another T-box 300 on another proppant storage trailer. Such an arrangement is useful when proppant storage trailers are disposed apart from one another on opposite sides of a T-belt.

Figure 58:
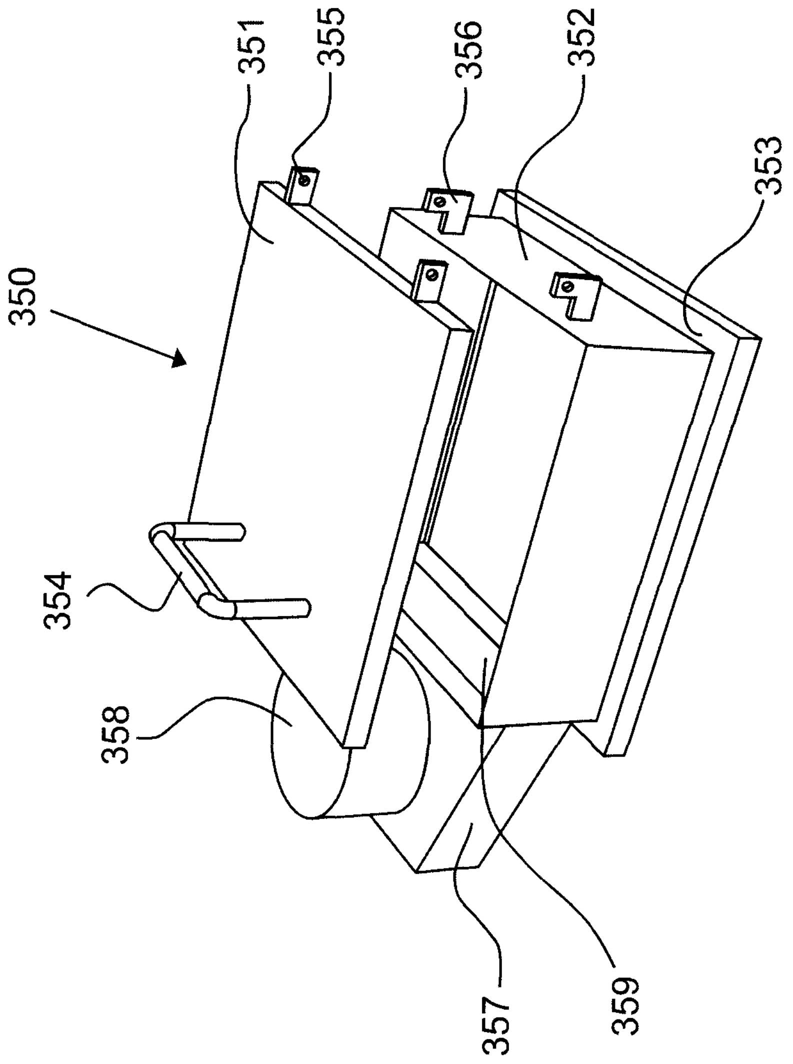
FIG. 58 shows a partially-exploded view of a door assembly according to at least one possible embodiment.
Figure 59:
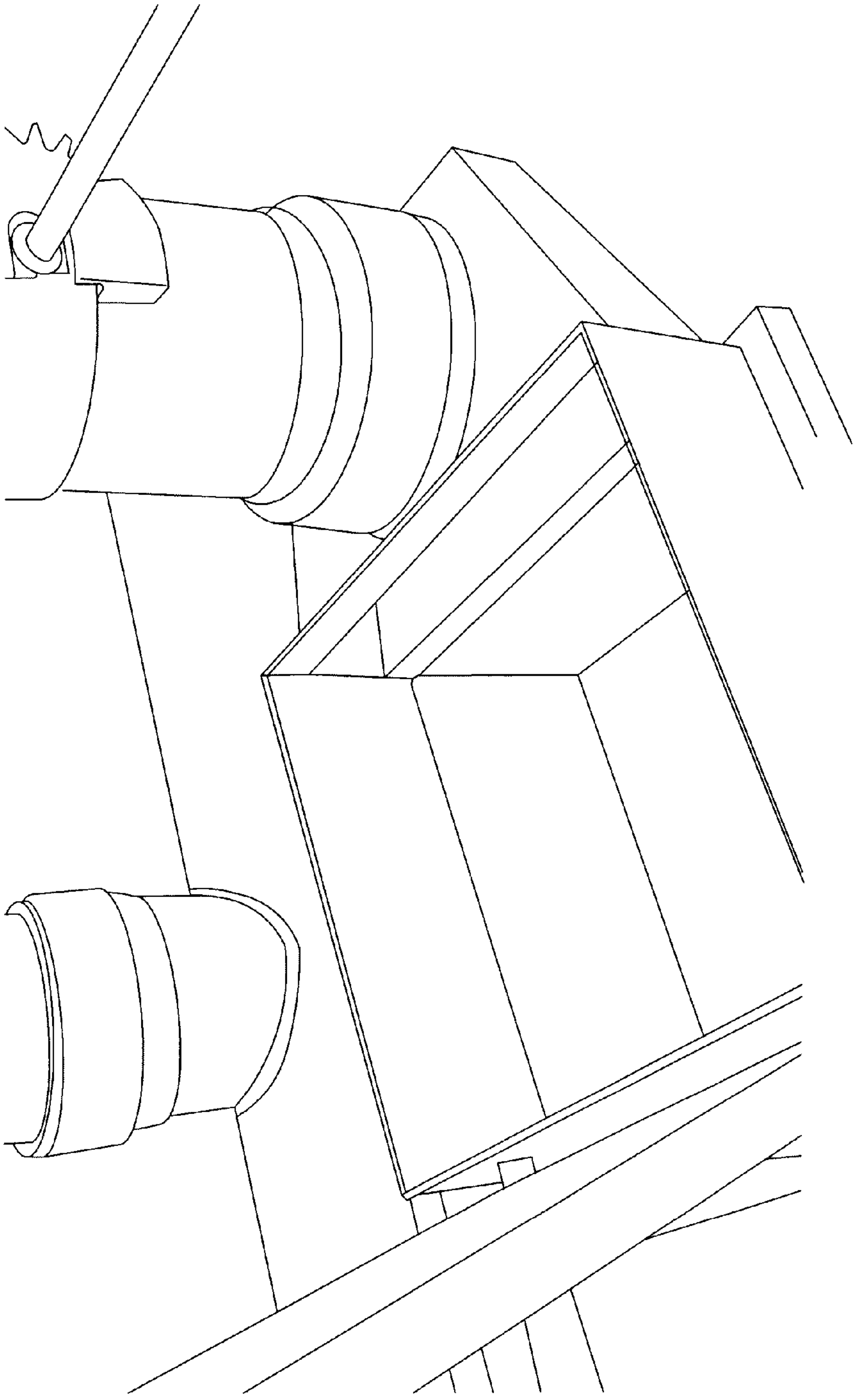
FIG. 59 shows another view of the installed door assembly.

FIG. 58 shows a partially-exploded view of a door assembly 350 according to at least one possible embodiment. The door assembly 350 is placed over existing doors or hatches on a proppant storage trailer. To do so, the hatches are opened and then the door assembly 350 is placed over the opening. The door assembly 350 comprises a lid or door 351, which is joined to a box-shaped frame 352 by hinge pieces 335, 336. The frame 352 has a base cover portion 353 which ensures that the door assembly 350 covers the opening in the proppant storage trailer. A handle 354 is connected to the door 351 to permit opening and closing thereof. A substantially trapezoidal vacuum box 357 is connected to the box frame 352. An inlet 359 is formed in the box frame 352 to permit flow of air into the vacuum box 357. A connecting pipe 358 extends from the vacuum box 357 and serves as a connection to the valve arrangement 342. In at least one possible embodiment, the door 351 can be approximately 18"×18", the box frame 352 can be approximately 17.25"×17.25", the base cover 353 can be approximately 19.5"×19.5", the shorter side of the vacuum box 357 can be approximately 10.75", and the diameter of the connecting pipe 358 can be approximately seven and ⅝ inches. FIG. 59 shows a view of the installed door assembly. As can be seen in this figure, the door assembly 350 is open and the interior of the hatch or opening in the proppant storage trailer can be seen. During filling of the proppant storage trailer with proppant, and during emptying of the proppant storage trailer of proppant, proppant dust becomes airborne and is propelled out of the proppant storage trailer via the hatches or openings. In operation of the dust collection system, the proppant dust is sucked through the inlet 359 and into the dust collection system. In this manner, a substantial portion or essentially all of the dust being propelled through the openings is collected and prevented from entering the atmosphere.

In at least one possible embodiment, the negative pressure generated at the inlet 359 can be approximately 2 inches of mercury (in Hg), which is approximately 1 pound per square inch (PSI). The negative pressure can be varied depending on the positive pressure inside the proppant storage trailer, in addition to other factors. For example, a pneumatic tanker for filling a proppant storage trailer operates at approximately 1000 cubic feet per minute (CFM). The negative pressure generated at the inlet 359 must be sufficient to overcome the positive pressure generated inside the proppant storage trailer. If only one tanker is filling a proppant storage trailer, the dust collector 125 can be run at substantially an idle speed to generate sufficient negative pressure to produce a vacuum or section force at the inlet 359. If multiple tankers, such as five or six, are filling multiple proppant storage trailers simultaneously, as can often be the case, the dust collector 125 can be run at substantially three quarters throttle to generate sufficient negative pressure at multiple inlets 359. In addition, the proppant storage trailers can be filled at the same time as a hydraulic fracturing operation or a stage, during which proppant is transported along the belts to the blender and dust is generated at different points. Therefore, the suction force must be generated at various locations in addition to the inlets 359. In such a situation, the dust collector 125 can be run at full throttle in order to provide sufficient negative pressure to collect a maximum amount of dust, that is, to reduce the amount of airborne dust to a desired and/or minimized level. According to at least one possible embodiment, the dust collector 125 should at least have a filtering capacity of 40,000 cubic feet per minute (cfm) in order to produce the desired or sufficient negative pressure at all suction points. Dust collectors 125 which have a lesser filtering capacity may not supply negative pressure at all suction points sufficient to capture a desired percentage of dust, that is, sufficient to reduce the amount of airborne dust to a desired and/or minimized level. Such dust collectors 125 with a lesser filtering capacity may provide sufficient negative pressure at some of the suction points, but not all of the suction points if most or all of the proppant storage trailers are being filled during the running of a hydraulic fracturing operation or stage.

Figure 60:
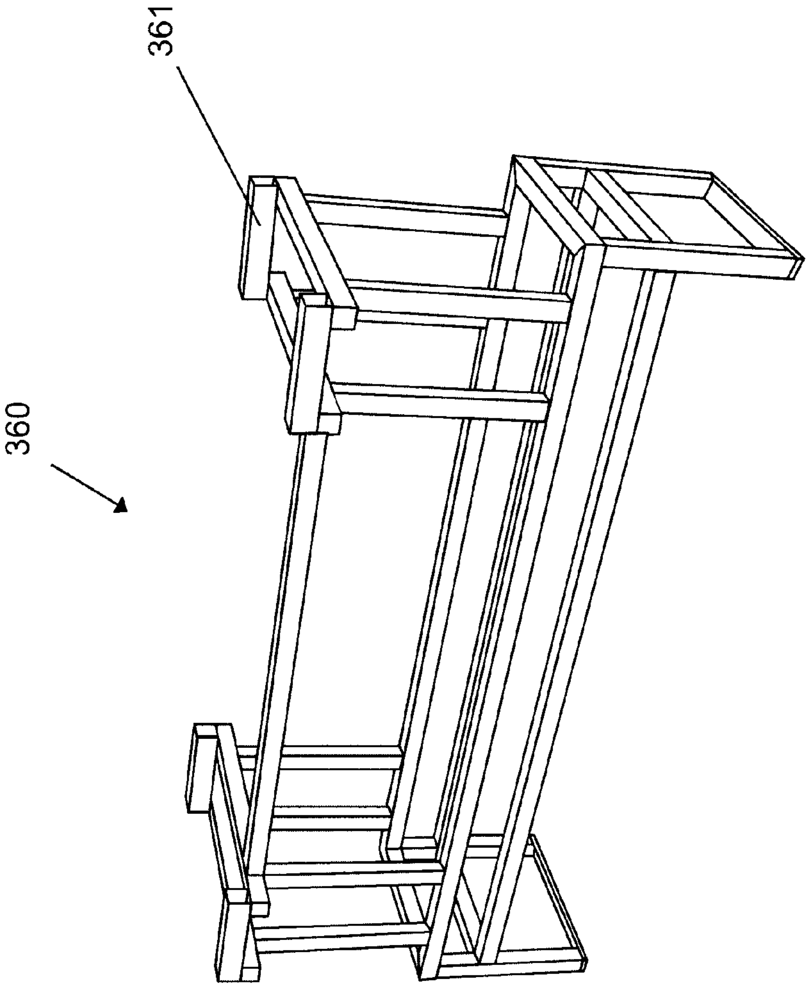
FIG. 60 shows a short support table.
Figure 61:
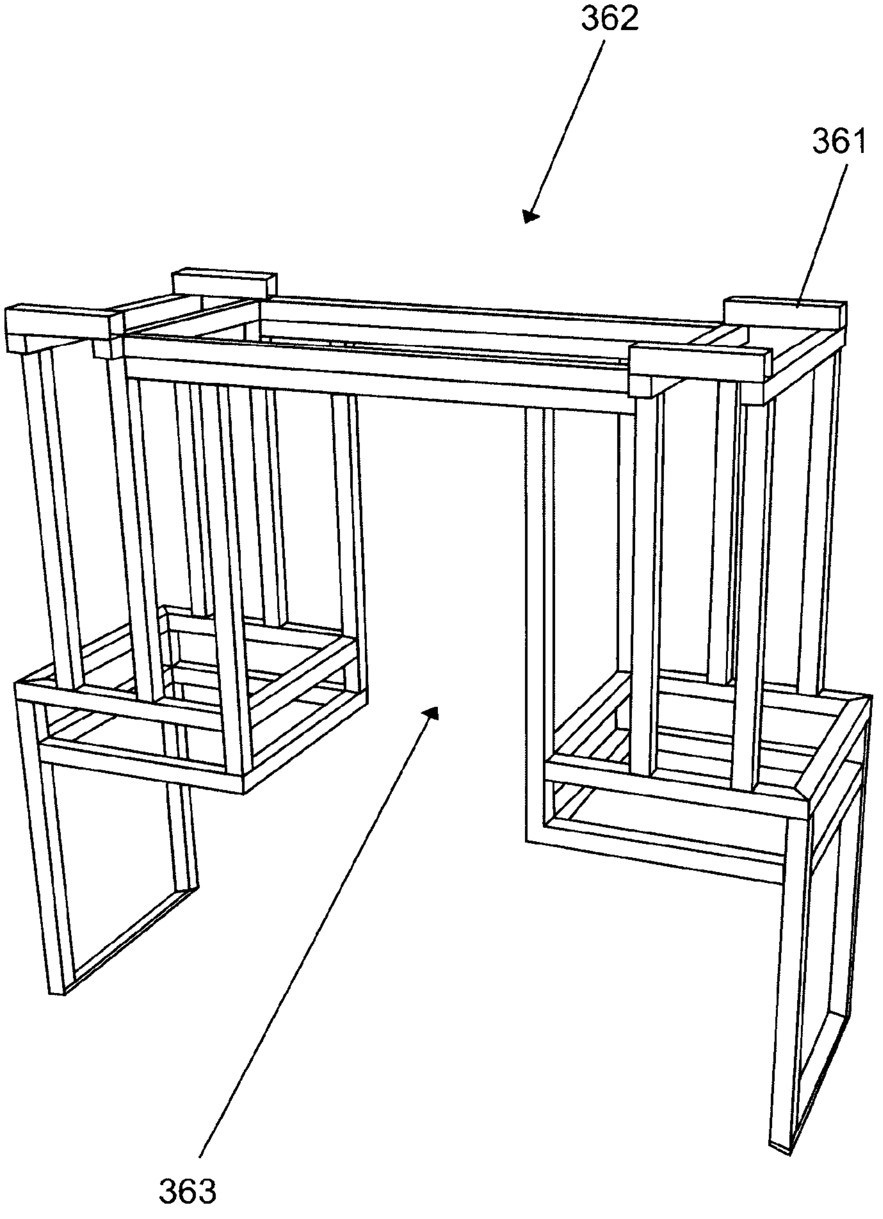
FIG. 61 shows a high support table.

FIG. 60 shows a short support table 360, which comprises four mounting sleeves 361. In at least one embodiment, the short support table 360 has overall dimensions of approximately 92"×33"×42", although these can obviously be adjusted as needed depending on the installation. FIG. 61 shows a high support table 362, which is constructed similarly to the short support table 360, including mounting sleeves 361. The key difference between the high support table 362 and the short support table 360, aside from the height difference, is the passage 363 defined by the high support table 362. This passage 363 allows workers to easily walk underneath the high support table 362. Since the support tables 360, 362 are located on the end of the proppant storage trailer, the short support table 360 effectively blocks off the end of the proppant storage trailer, i.e. no workers walking on the top of the proppant storage trailer may walk past the short support table 360. However, some designs of proppant storage trailers include components located at the end of the proppant storage trailer which must be accessed by the workers on a regular basis. Accordingly, the short support table 360 would not be compatible with such a proppant storage trailer, and thus the high support table 362 would be used instead so that the workers could walk underneath the high support table 362 and thereby access the components at the and of the proppant storage trailer. In at least one possible embodiment, the high support table 362 may have an overall length of approximately 88 inches, and the passage 363 could be approximately 32 inches across. Obviously, these dimensions could be adjusted as necessary depending on installation.

The connector boxes 335 can be mounted on the tables using a short connecting bar that has a plurality of holes therein. One end of the short connecting bar is to be inserted into a corresponding mounting sleeve 361 of a support table 360, 362, and a hole in the mounting sleeve 361 can be aligned with one of the holes in the short connecting bar, depending how far the user wishes for the short connecting bar to extend out from the mounting sleeve 361. A connecting pin or similar structure can then be inserted through the aligned holes to lock the short connecting bar in the desired position in the mounting sleeve 361. Once all four short connecting bars are installed, the connector boxes 335 can then be mounted. Specifically, the mounting sleeves 346 of each connector box 335 can be slid over the projecting or extending ends of a pair of adjacent short connecting bars. A hole in each of the mounting sleeves 346 can be aligned with a hole in the short connecting bar, depending on the desired positioning of the connector box 335 on the short connecting bar. The connecting pins 366 can then be inserted into the aligned holes to lock the connector boxes 335 in the desired position. Since the short connecting bar is relatively short in length, it can only be utilized to support the connector boxes 335, and thus is only useful in situations where only connector boxes 335 are mounted on the support table 360, 362 without a T-box 300.

When both connector boxes 335 and the T-box 300 are installed on a table, two long connecting bars are utilized that are approximately as long as or longer than the support table. Each long connecting bar is to be inserted through a pair of aligned mounting sleeves 361 of the support table. Such a long connecting bar extends beyond the mounting sleeves 361 on either end of the support table, and also extends over the space between the pair of aligned mounting sleeves 361. During assembly or installation, the long connecting bar is first inserted into a mounting sleeve 361 at one end of the support table, then is slid through a mounting sleeve 304 of the T-box 300, and then is slid through another, aligned mounting sleeve 361 at the other end of the support table. This process is then repeated with the other long connecting bar such that the T-box 300 is supported on the pair of long connecting bars. The ends of the long connecting bars which extend beyond the mounting sleeves 361 are utilized to support the connector boxes 335. The mounting sleeves 304 of the T-box 300 can be connected to the long connecting bar with or without the use of a connecting pin 365.

Many proppant storage trailers include a so-called "dragon's tail" which extends from the end of the proppant storage trailer. The dragon's tail 370 (see FIG. 65) is essentially an extension off of the back of a proppant storage trailer which resembles a tail. During operation of a proppant storage trailer, proppant is dispensed out of a plurality of dispensers located in the underside of the body of the proppant storage trailer. A conveyor belt is located beneath these dispensers to receive dispensed proppant thereon. The conveyor belt extends over the length of the body of the proppant storage trailer and beyond into the dragon's tail 370. The conveyor belt therefore conveys proppant to the dragon's tail 370, at which point the conveyor belt executes a return movement, and thereby releases the proppant onto the T-belt located below a spout or outlet of the dragon's tail 370.

Some proppant storage trailers also include a crow's nest, which is an optional structure that is located on some types of proppant storage trailers at the end thereof adjacent the dragon's tail 370. During operation of the proppant storage trailer, a worker will stand in the crow's nest to both monitor and control the feed of proppant. For proppant storage trailers which include a crow's nest, the high support table 362 is necessary so that the workers can walk through the passage 363 in the high support table 362 to get to the crow's nest. In contrast, the short support table 360 would effectively block access to the crow's nest. When the dragon's tail 370 is not in use or when the proppant storage trailer is being moved from one location to another, such as on the highway, the dragon's tail 370 can be retracted to an essentially vertical orientation.

Figure 62:
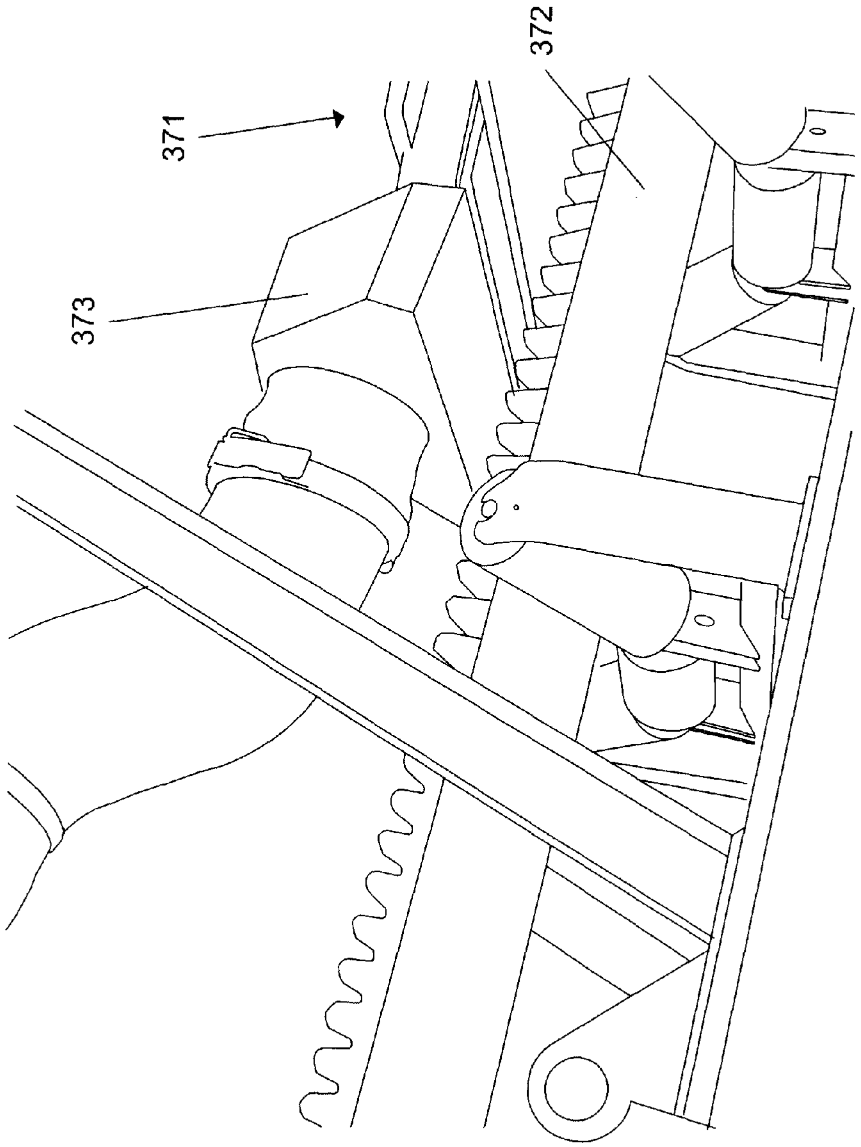
FIG. 62 shows a side view of the beginning of the dragon's tail and a trailer outlet suction unit associated therewith.

FIG. 62 shows a side view of the beginning of the dragon's tail 370 and a trailer outlet suction unit 373 associated therewith. The conveyor belt 372 which conveys the proppant dispensed thereon is also shown. As this conveyor belt 372 moves out from under the body of the proppant storage trailer, proppant dust is caused to flow out the rear 371 of the proppant storage trailer. The trailer outlet suction unit 373 is therefore located at the rear 371 of the proppant storage trailer in order to suck up the proppant dust at this point. The trailer outlet suction unit 373 is connected by a hose to the rest of the dust collection system. A bracket is used to hook or hang the trailer outlet suction unit 373 onto the end 371 of the proppant storage trailer. The trailer outlet suction unit 373 has a generally trapezoidal housing and a connection port which connects the housing to a hose of the dust collection system. A lifting handle may be included. The outlet suction unit has a vacuum inlet, which may be made of expanded metal. When the trailer outlet suction unit 373 is installed on a proppant storage trailer, the vacuum inlet is oriented to face the upper side of the conveyor belt 372.

Figure 63:
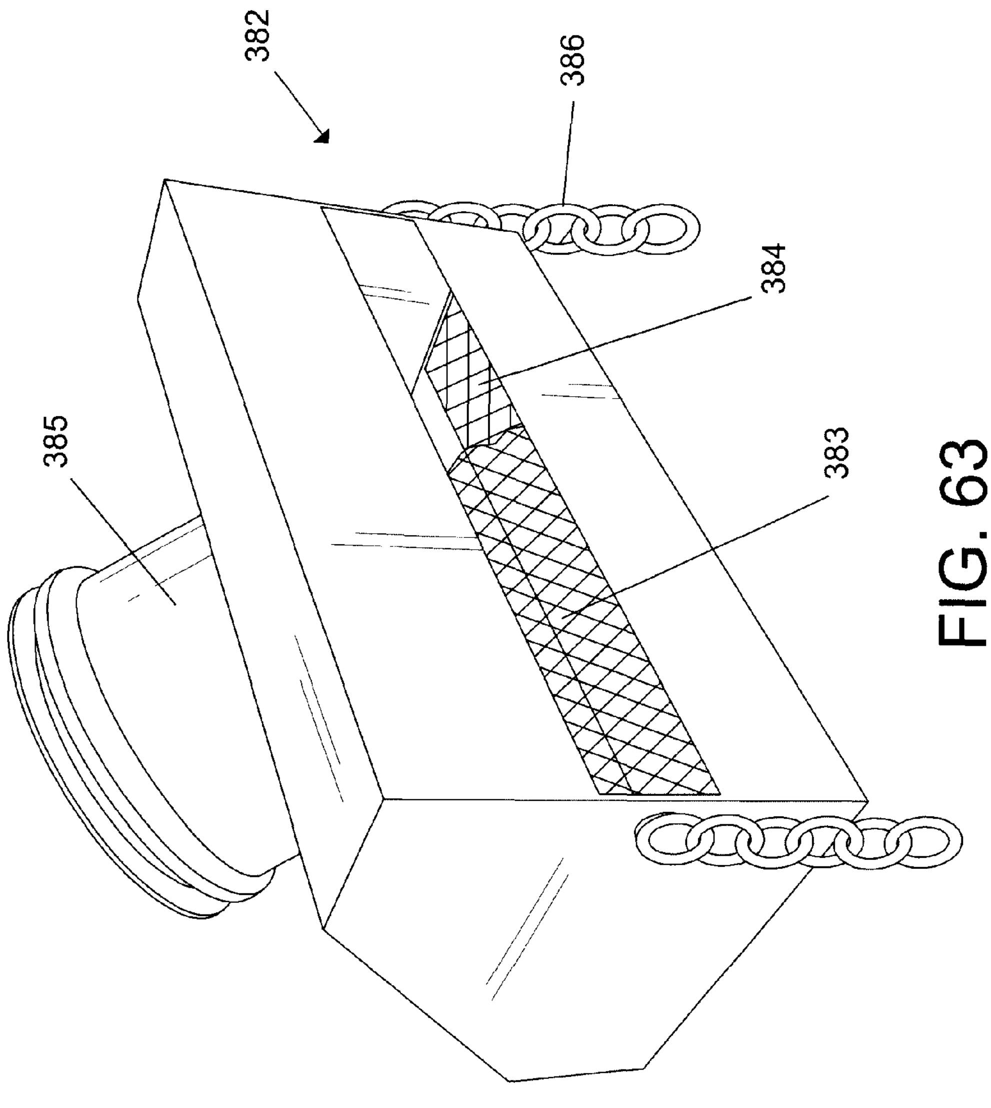
FIG. 63 shows an embodiment of a dragon's tail spout suction unit.

The dragon's tail includes a dragon's tail spout 379, which often has a spout ramp located below the spout 379. In at least one possible embodiment, a dragon's tail spout suction unit 382 (shown in FIG. 63) may be hung adjacent the spout 379 and above the spout ramp using support chains 386. The dragon's tail spout suction unit 382 is oriented such that the side vacuum inlet 383 faces the end of the spout 379, and the bottom vacuum inlet 384 faces toward the spout ramp and/or the T-belt. Each of these vacuum inlets 383, 384 may be made of expanded metal. A connection port 385 is used to connect the dragon's tail spout suction unit 382 the rest of the dust collection system. In at least one possible embodiment, the frame of the dragon's tail spout suction unit 382 can be approximately 20"×20"×6", and the connection port can be approximately 8 inches.

Figure 64:
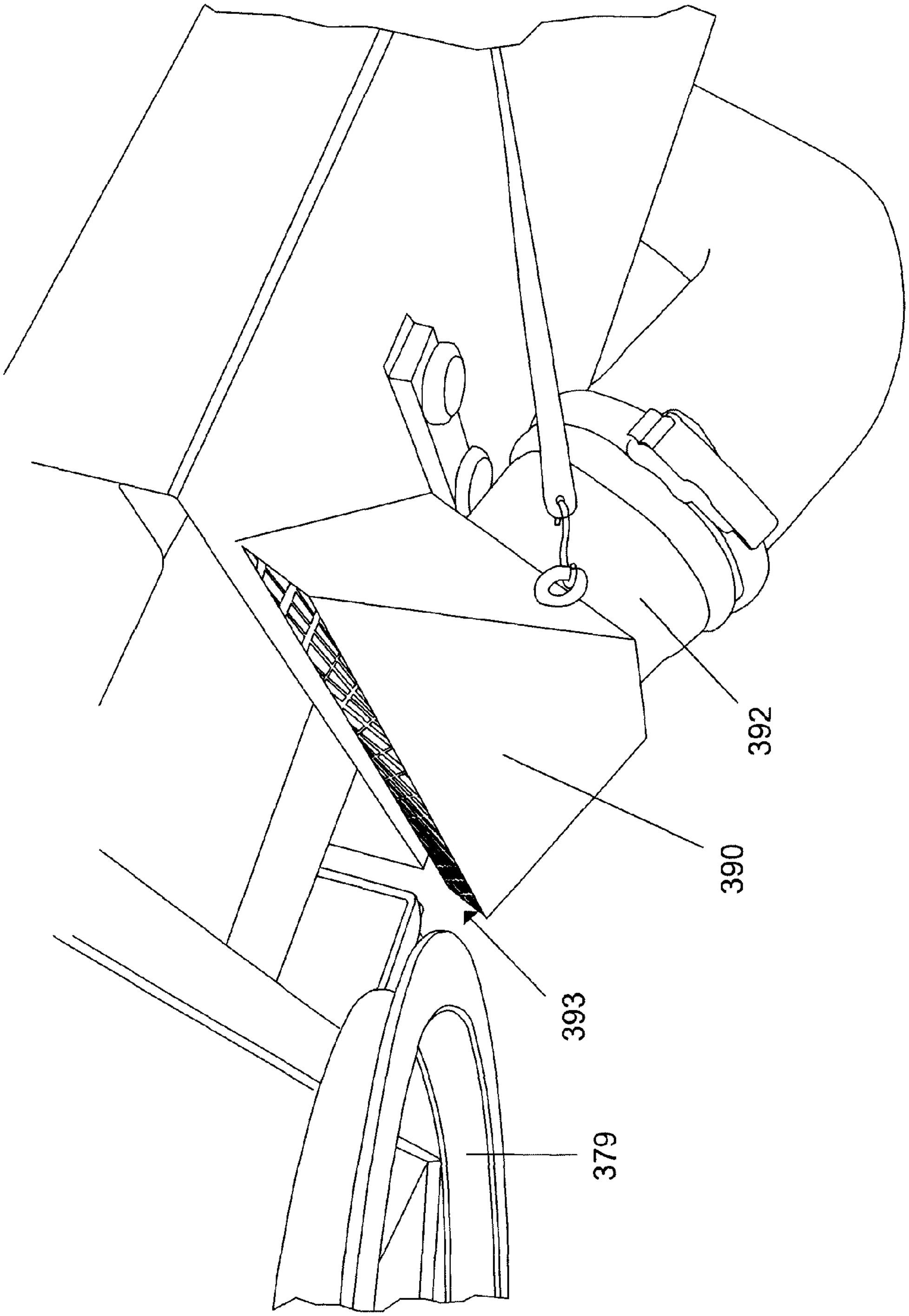
FIG. 64 shows a dragon's tail return suction unit.

FIG. 64 shows a dragon's tail return suction unit 390. In operation, the conveyor belt 372 executes a return movement at or inside the dragon's tail 370, at which time proppant on the conveyor belt 372 is dumped off of the conveyor belt 372 and out of the dragon's tail spout 379. However, proppant particles and dust still remain on the returning conveyor belt 372, which proppant particles and dust can again become airborne by falling off of the returning conveyor belt 372. The dragon's tail return suction unit 390 sucks up this dust coming off of the returning conveyor belt 372. The dragon's tail return suction unit 390 is hung by a bracket from the dragon's tail 370 adjacent the spout 379 and directly below the returning conveyor belt 372. The dragon's tail return suction unit 390 includes a vacuum inlet 393 that can be formed of expanded metal, and a connection port 392 which is used to connect the dragon's tail return suction unit 390 to the rest of the dust collection system. In at least one possible embodiment, the vacuum inlet 393 can be approximately 30"×4", and the frame of the dragon's tail return suction 393 can taper in width from approximately 30 inches to approximately 8.5 inches, and can expand in thickness from approximately 4 inches to approximately 8.5 inches.

A plastic sheet or skirt can be connected to a lower portion of a proppant storage trailer. The plastic sheet or skirt substantially encloses the lower portion of a proppant storage trailer where proppant is dispensed onto the conveyor belt 372, to thereby minimize or essentially prevent the escape of proppant dust out the sides of the proppant storage trailer. In at least one possible embodiment, the plastic sheet or skirt is used in conjunction with the trailer outlet suction unit 373. To further explain, the plastic sheet or skirt traps the proppant dust in the space underneath the proppant storage trailer. The movement of the conveyor belt 372 causes this airborne proppant dust to move or be urged toward the rear 371 of the proppant storage trailer, at which point the trailer outlet suction unit 373 can suck up the proppant dust. In other words, the plastic sheet or skirt can assist in guiding the proppant dust toward the trailer outlet suction unit 373 to further minimize the escape of proppant dust into the surrounding environment.

Figure 65:
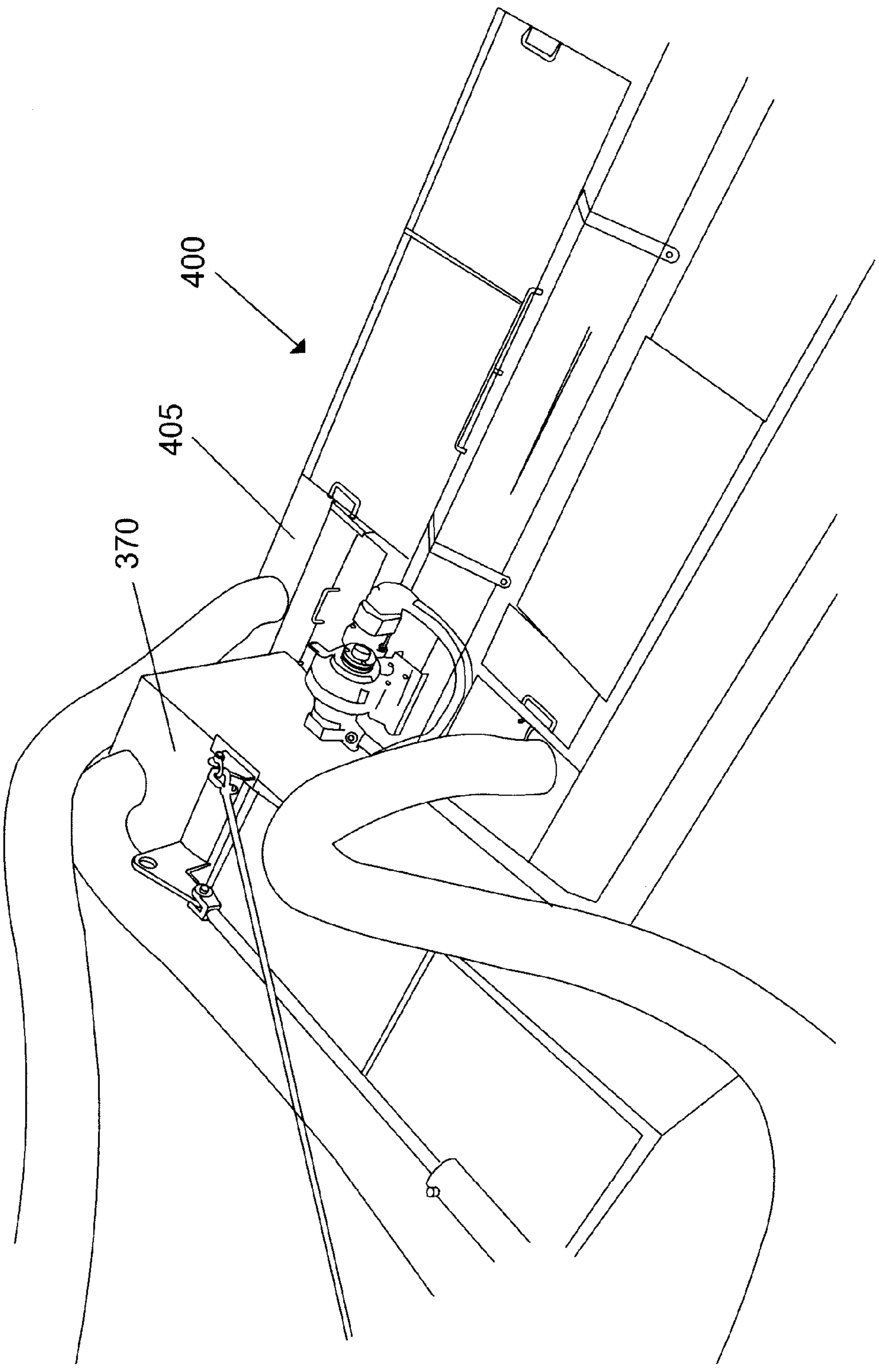
FIG. 65 shows a top view of a T-belt assembly with installed T-belt suction units.

Many T-belt assemblies include a splitter or divider which splits the dispensed proppant onto two separate belts, as well as gratings that filter the proppant, which gratings can be located above or below the splitter. FIG. 65 shows a top view of a T-belt assembly 400 with installed T-belt suction units 405. In general, the T-belt suction unit 405 is used to collect proppant dust generated by the impact of the proppant on the T-belt 130 and/or the splitter and/or the grating. The T-belt suction units 405 are generally rectangular shaped units that are positioned above and/or on the grating. In the embodiment shown in FIG. 97, the T-belt suction units 405 are positioned on either side of the splitter 401. As the proppant slides down the sides of the splitter 401 and drops onto the T-belt 130 below, the proppant slides or flows past a vacuum inlet 408, which can be formed by a sheet of expanded metal bent at a 90° angle. The dust generated by the movement of the proppant is sucked up through the vacuum inlet 408. Inner walls or baffles serve to reduce the interior space inside the T-belt suction unit 405 to concentrate the vacuum force over a smaller area, and thereby increase the suction power. The inner walls or baffles guide or funnel the collected dust toward the connection port 409, which can be an 8 inch connection port. Dragon's tail hoses 338 are connected to the connection ports 409 to thereby connect the T-belt suction units 405 to the rest of the dust collection system. Four handles 407 are included for carrying or lifting the T-belt suction unit 405.

Figure 66:
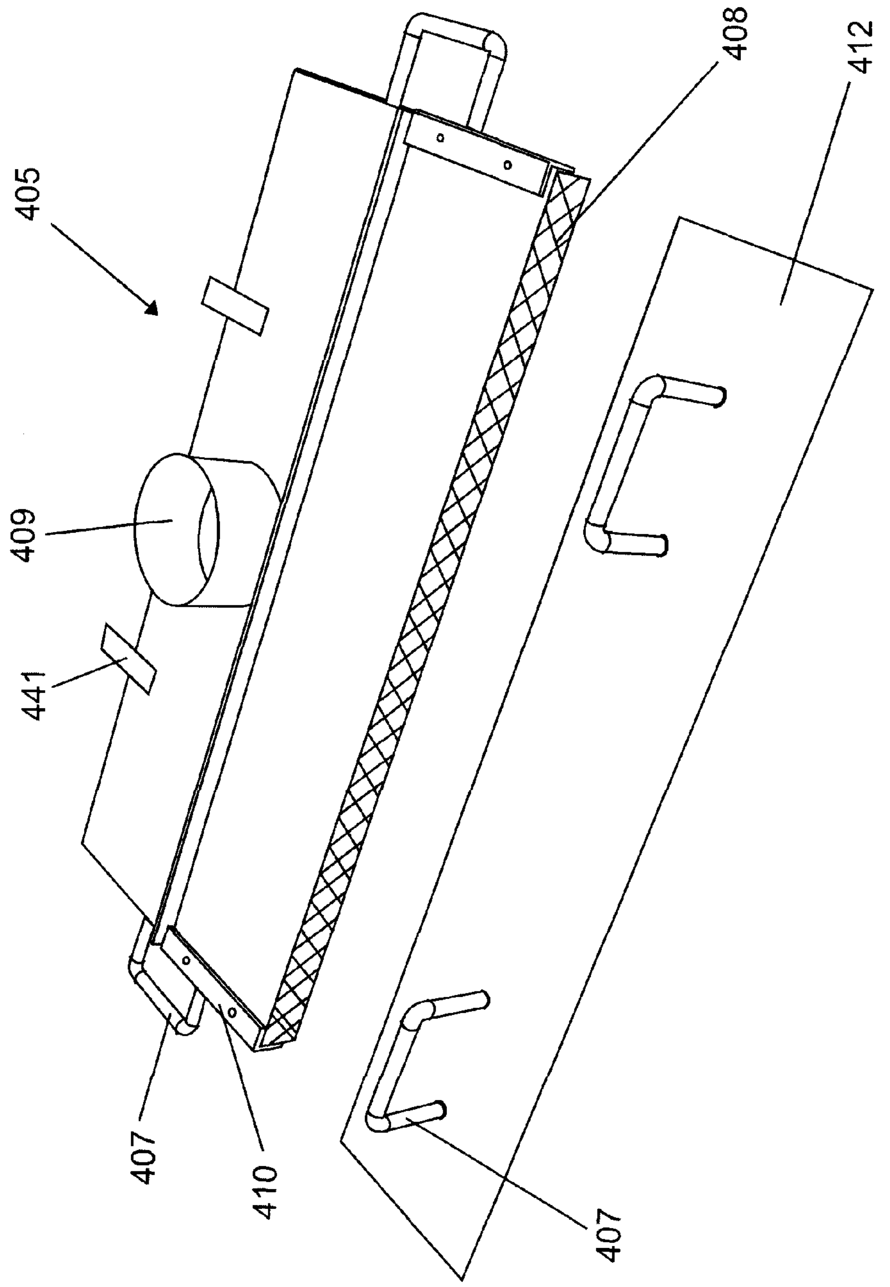
FIG. 66 shows an embodiment of a T-belt suction unit.

FIG. 66 shows an embodiment of the T-belt suction unit 405. In this embodiment, two of the four handles 407 on top of the T-belt suction unit 405 used for carrying have been moved to the sides. Also included are two support pieces 411, which are used to support the T-belt suction unit 405 on the edge of the T-belt assembly 400, when installed as shown in FIG. 97. In addition, the T-belt suction unit 405 includes a cover extension 412, which is slidably retained in retaining brackets 410. In the embodiment shown in FIG. 97, the cover extension 412 can be extended towards the splitter in order to reduce the space between the edge of the cover extension 412 and the surface of the splitter. By reducing this space the suction force generated by the T-belt suction unit 405 is increased. In at least one possible embodiment, the connection port 409 is shifted from a central location to a corner of the T-belt suction unit 413. Accordingly, the inner walls or baffles would be adjusted accordingly in this embodiment.

Figure 67:
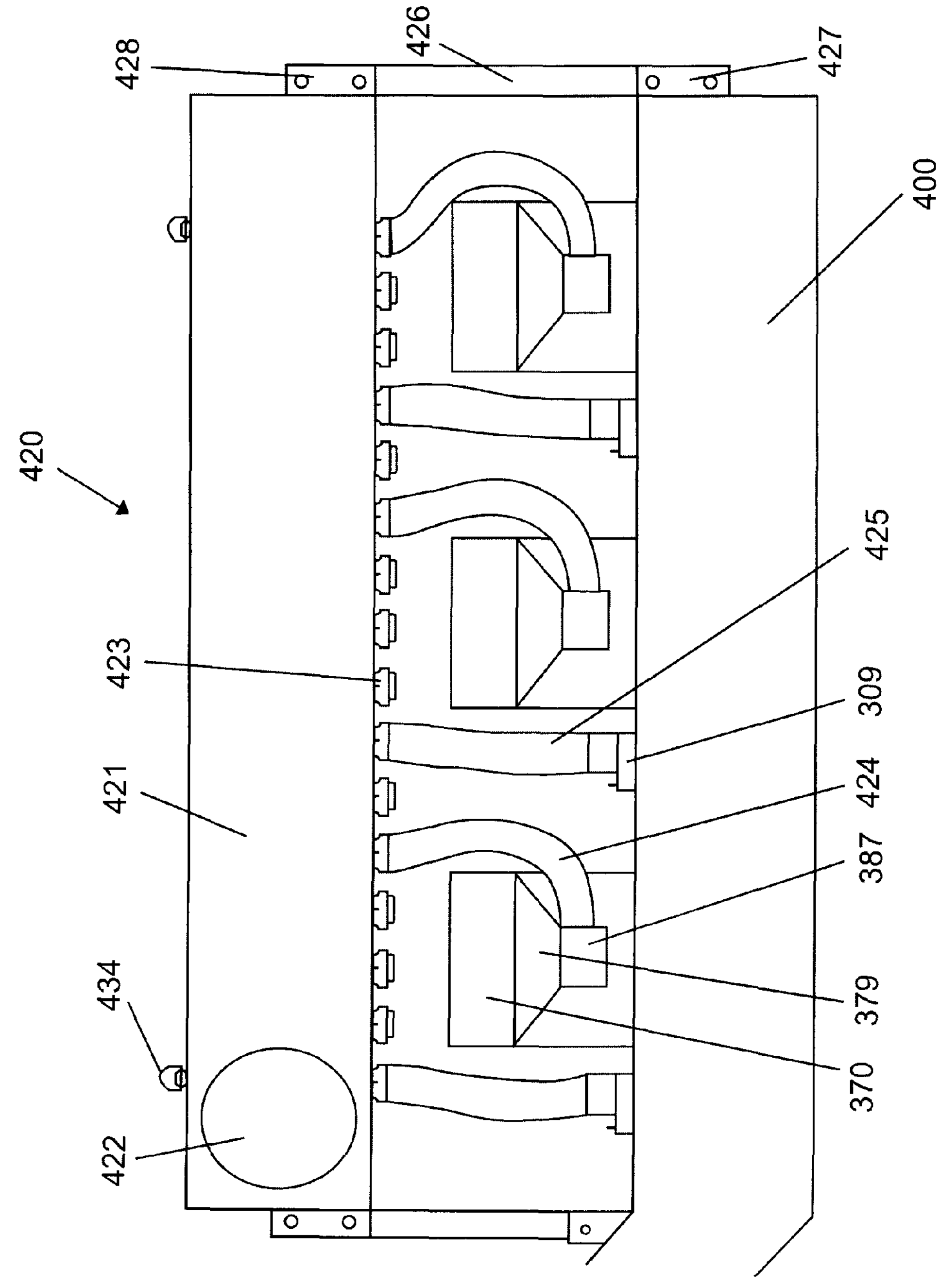
FIG. 67 shows a side view of an elevated dragon's tail and T-belt suction arrangement.

As shown in previous figures, the T-belt suction unit 405 and the dragon's tail spout suction unit 387 are connected by hoses to the rest of the dust collection system in order to supply a suction force. Since these units 387, 405 are located a substantial distance from the rest of the dust collection system, such as the connector boxes 335 mounted on the support tables on top of the proppant storage trailer, dragon's tail hoses 338 must be utilized to connect these units 387, 405. A dragon's tail and T-belt suction arrangement 420 can be used as an alternative way of connecting the units 387, 405 to the rest of the dust collection system. FIG. 67 shows a side view of an elevated dragon's tail and T-belt suction arrangement 420, which primarily comprises a T-belt manifold 421, which has a large connection port 422 to connect directly to the dust collector 125, and a plurality of connection ports 423. The T-belt manifold 421 has a pair of lifting eyes 434 to permit lifting of the T-belt manifold 421 by a crane. In the embodiment shown, a pair of support legs 426 support the T-belt manifold 421 in a position higher than and/or above the dragon's tails 370. The support legs 426 are mounted in a support bracket 427 located on the T-belt assembly 400, and the T-belt manifold 421 is connected to the support legs 426 by a high mount bracket 428. The dragon's tail spout suction units 387 are connected by hoses 424 to corresponding connection ports 423. The T-belt suction units 405 are connected by hoses 425 to corresponding connection ports 423. By using this embodiment of the dragon's tail and T-belt suction arrangement 420, lengthy dragon's tail hoses 338 can be eliminated, thereby eliminating a possible trip hazard and reducing the time required for installation of the dust collection system.

Figure 68:
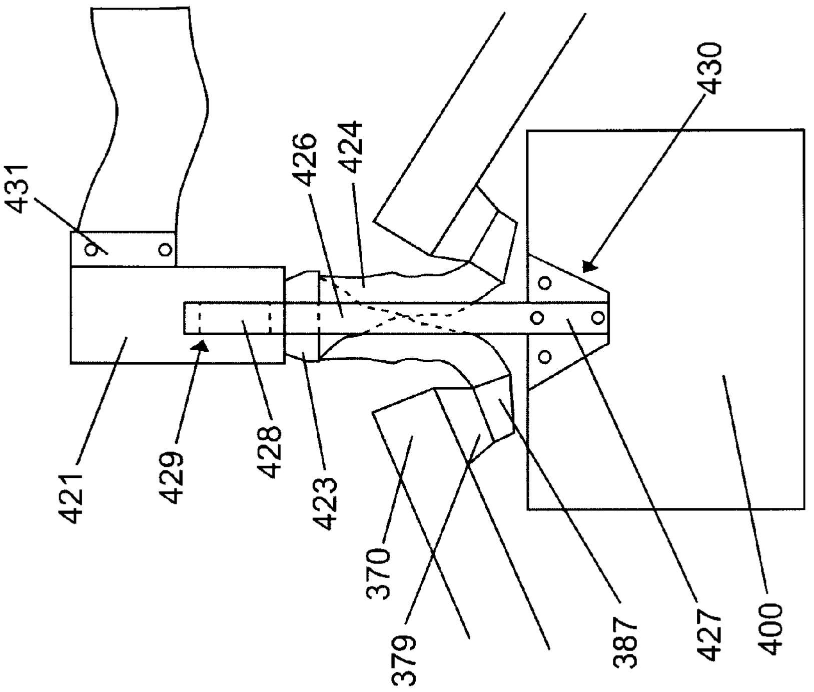
FIG. 68 shows an end view of the elevated dragon's tail and T-belt suction arrangement.
Figure 70:
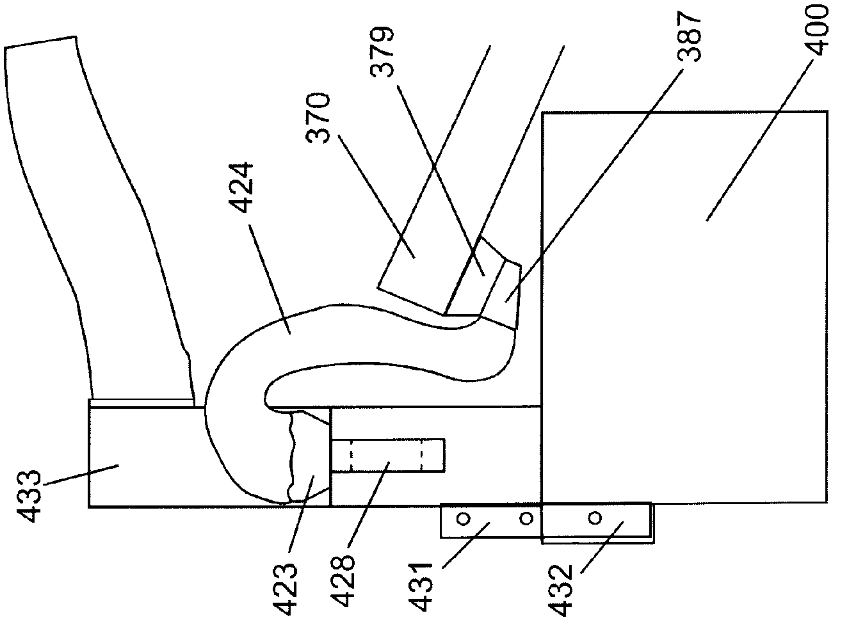
FIG. 70 shows an end view of the lowered dragon's tail and T-belt suction arrangement.
Figure 69:
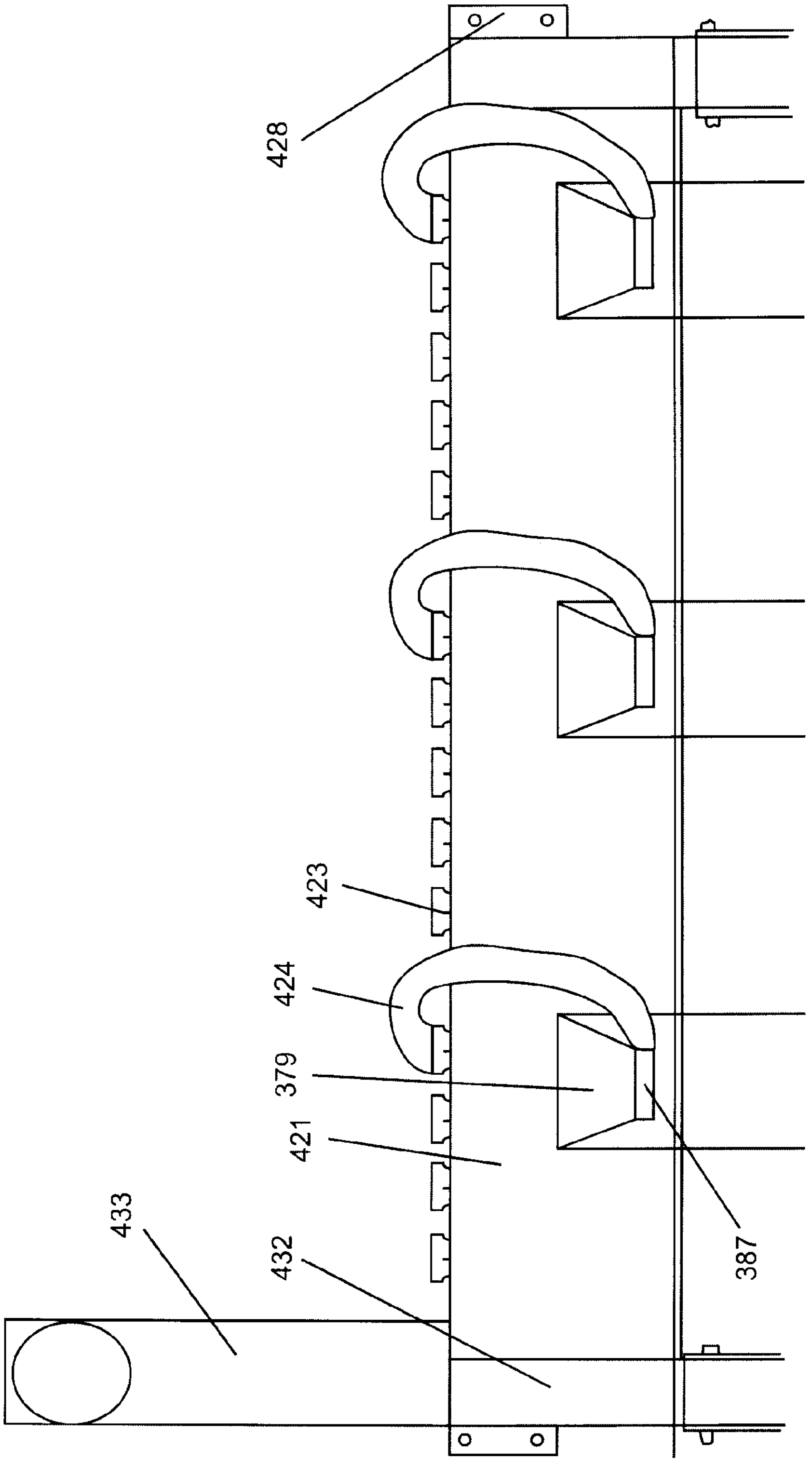
FIG. 69 shows a side view of a lowered dragon's tail and T-belt suction arrangement.

FIG. 68 shows an end view of the elevated dragon's tail and T-belt suction arrangement 420. A pivot mount 430 is shown at the end of the T-belt assembly 400. The pivot mount 430 allows for the support leg 426 to be tilted at an angle and locked into an angled position as desired in the event that an object or structure is preventing installation of the T-belt manifold 421 in the vertical position shown in the figures. Pinholes 429 are also shown, in which locking pins may be inserted to lock the T-belt manifold 421 in place on the support legs 426. A low mount bracket 431 is also shown, which bracket 431 is utilized in the lowered dragon's tail and T-belt section arranged in shown in FIGS. 69 and 70. FIG. 69 shows a side view of the lowered dragon's tail and T-belt suction arrangement 420. In this installation, the dragon's tail and T-belt suction arrangement 420 is flipped over or inverted from the elevated position such that the connection ports 423 are facing away from the T-belt assembly 400. The top surface of the T-belt manifold 421 is positioned immediately adjacent or resting on the T-belt assembly 400. The low mount bracket 431 is connected to a bolt flange 432 to thereby connect or mount the T-belt manifold 421 on one side of the T-belt assembly 400, as can be seen in FIG. 70. The low mount bracket 431 also includes pinholes 431 for locking pins. An extension connection 433 within an opening or connection port therein is utilized to connect to the dust collector 125. Any connection ports 423 that are not in use are either capped or plugged. In at least one possible embodiment, instead of connecting directly to the dust collector 125, the T-belt manifold 421 could be connected to a T-box on one of the proppant storage trailers.

Figure 71:
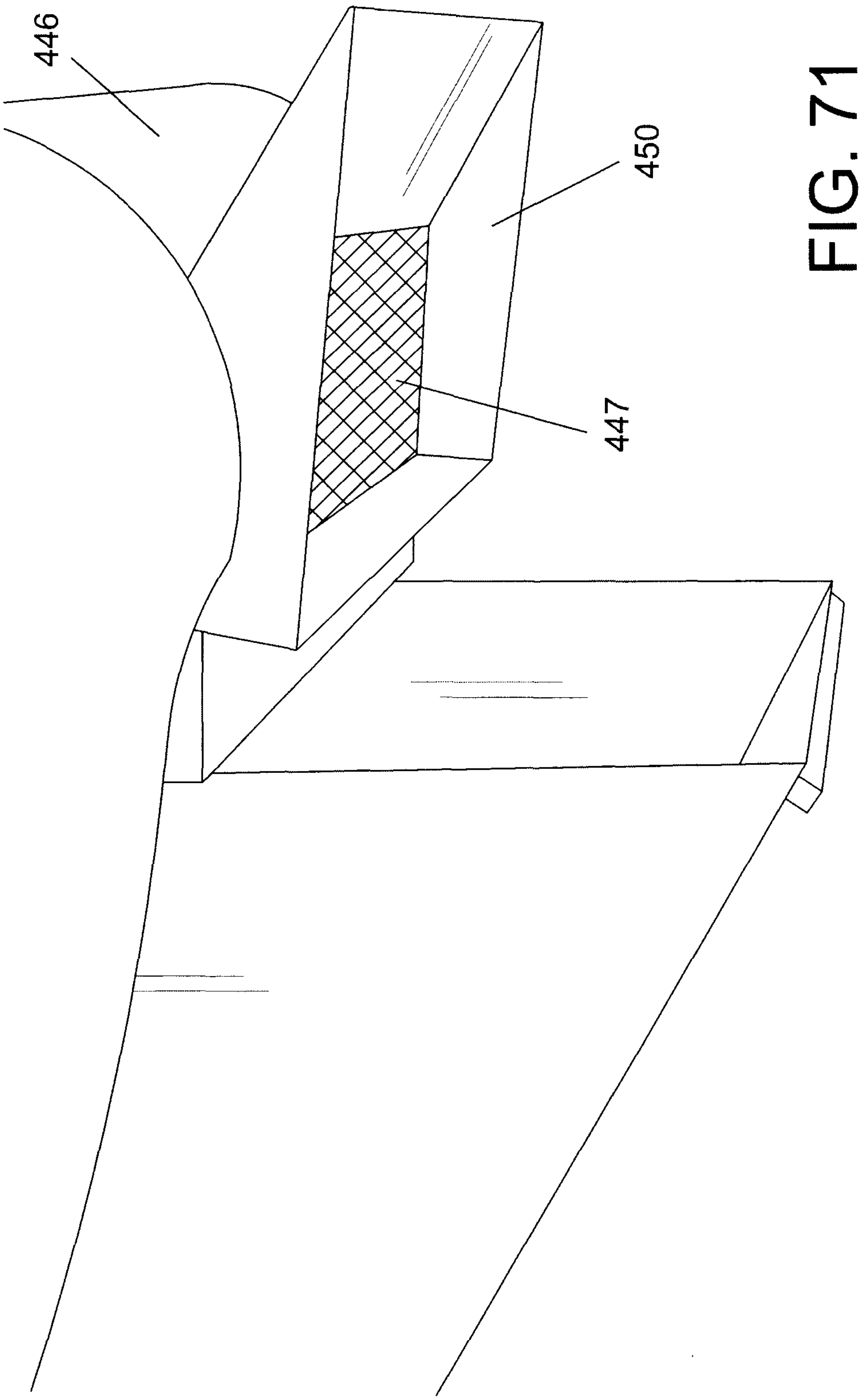
FIG. 71 shows an embodiment of the blender suction unit.
Figure 72:
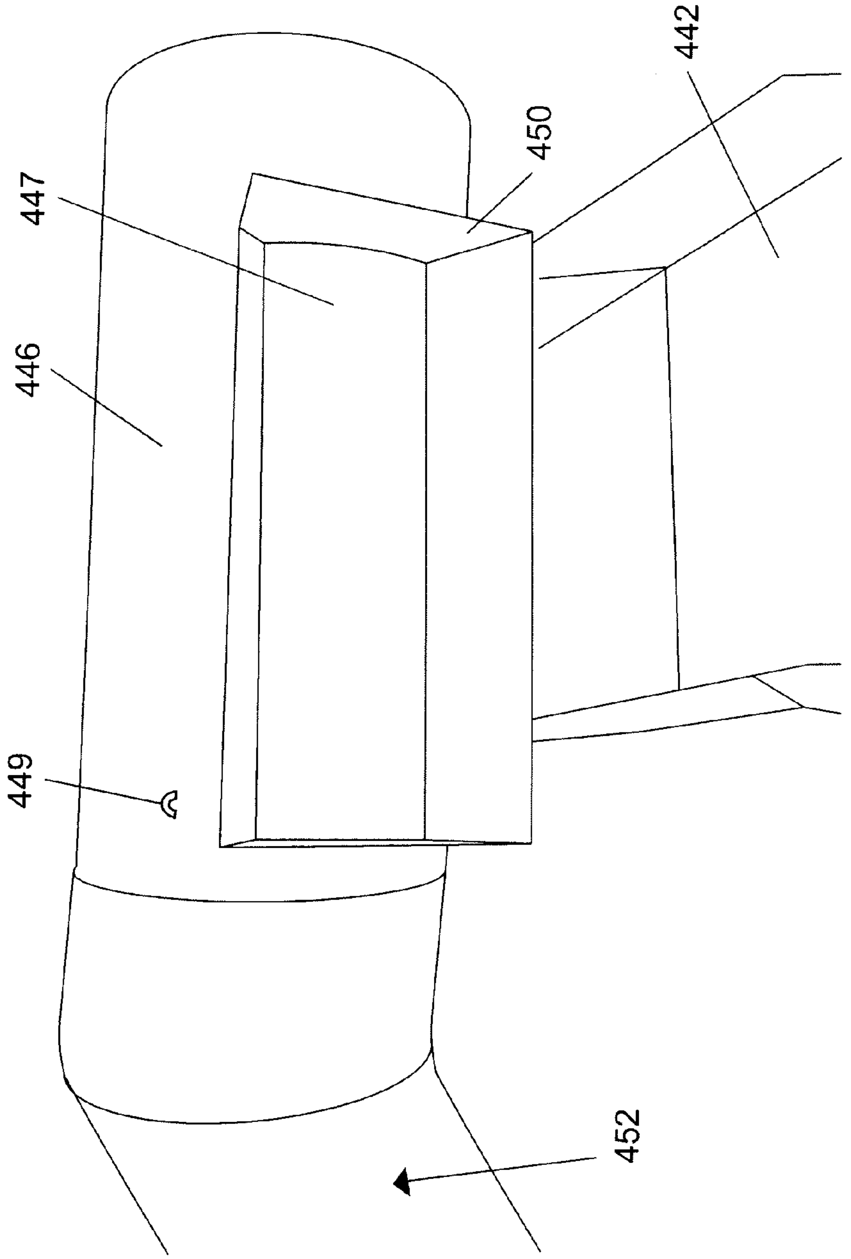
FIG. 72 shows another embodiment of the blender suction unit.
Figure 73:
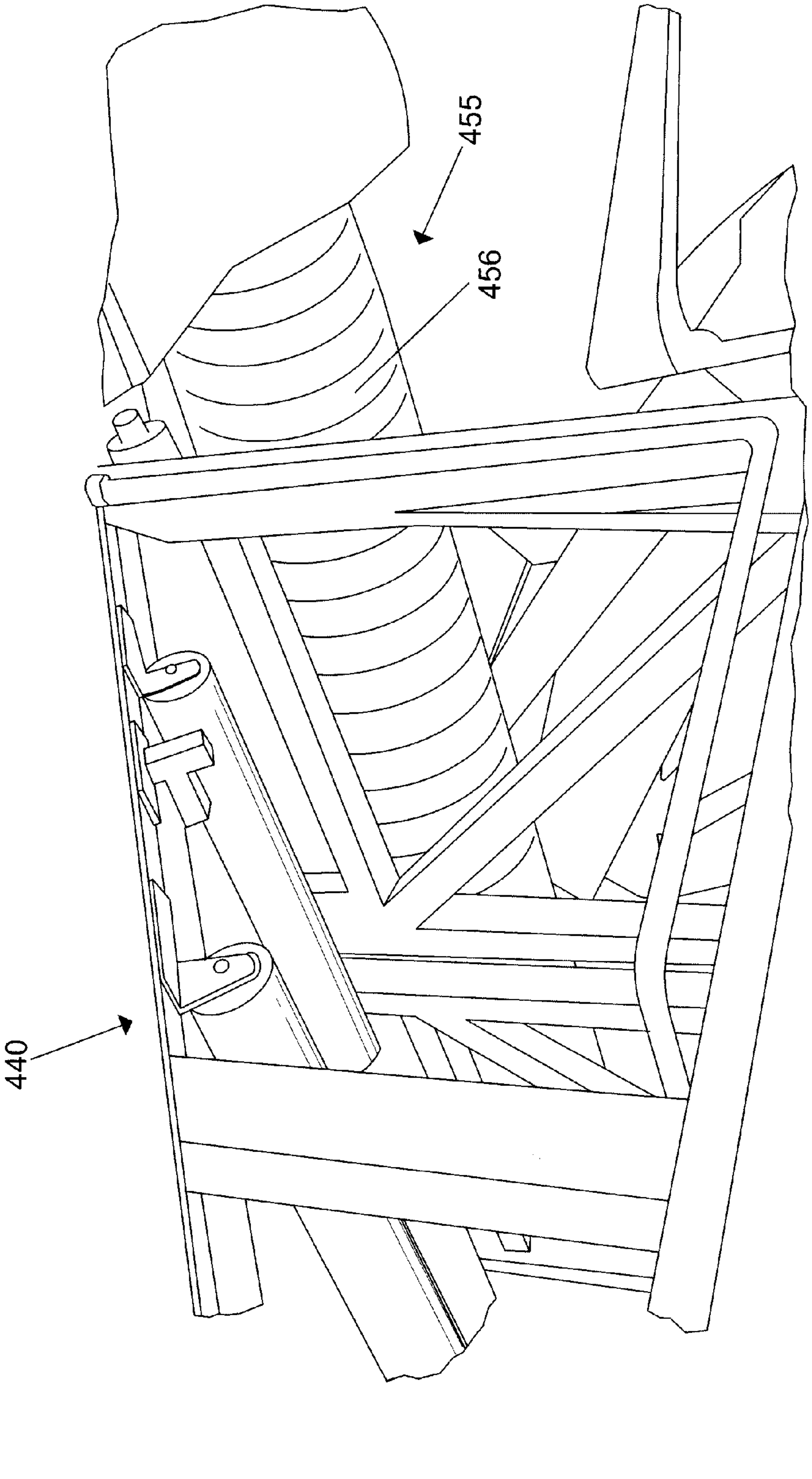
FIG. 73 shows a view of a T-belt return suction unit.

At the end of the T-belt, proppant is carried by a single conveyor or by dual conveyors upwardly at an angle by a blender feed 440 (FIG. 73). At the end of the blender feed 440, the conveyor(s) executes a return movement, and thereby dumps the proppant through a blender feed chute 442 (FIG. 72) into a blender hopper, in which the proppant is mixed with liquids. A substantial amount of proppant dust is propelled into the air at the blender feed chute 442, and thus a blender suction unit 445 is mounted at the blender feed chute 442. The blender suction unit 445 has an essentially tubular body 446 with a vacuum inlet 447 formed therein. A support piece, which can be essentially hook-shaped, can be utilized to hang or suspend the blender suction unit 445 from a chute bar on the blender feed chute 442. D-rings 449 allow for straps or chains to further support the blender suction unit 445 on the blender feed chute 442. FIG. 71 shows an embodiment of the blender suction unit 445, which includes a hood 450 extending from and surrounding the vacuum inlet 447, which can be formed using expanded metal. A plastic hood or sheet can be draped over the vacuum inlet 447 and the blender hopper in order to increase the suction force and trap proppant dust. FIG. 72 shows another embodiment of the blender suction unit 445, with a blender suction unit hose 452 which connects the blender suction unit 445 to the dust collector 125.

It should be noted that the blender suction unit 445 performs the same function as the T-belt manifold 119, but is designed to be used with different blender feeds. To further explain, some manufacturers design a blender feed which is divided into two separate feed chutes which feed into two separate blender hoppers. Generally, proppant is dispensed from a first feed chute, into one blender hopper, but can alternatively be dispensed from a second feed chute into a second blender hopper, especially if there is an interruption or problem with the operation of the first feed chute and/or first blender hopper, or if the first blender hopper already has a sufficient amount of proppant therein. Accordingly, a dust collection device must be located at each of the feed chutes. The T-belt manifold 119 includes two vacuum devices which are connected by a connecting piece in a generally U-shaped configuration, and thus one vacuum device is located above each of the two feed chutes. Alternatively, some manufacturers design a blender feed with a single, movable feed chute. When the operator wishes to switch the feed of proppant from one blender hopper to another, the feed chute can be swung or moved from a position above a first hopper to a position above a second hopper. Since the blender suction unit 445 is mounted on the feed chute, the blender suction unit 445 moves with the feed chute when the feed chute is pivoted between positions above the two hoppers, thereby maintaining suction of proppant dust at the feed chute regardless of position.

Figure 74:
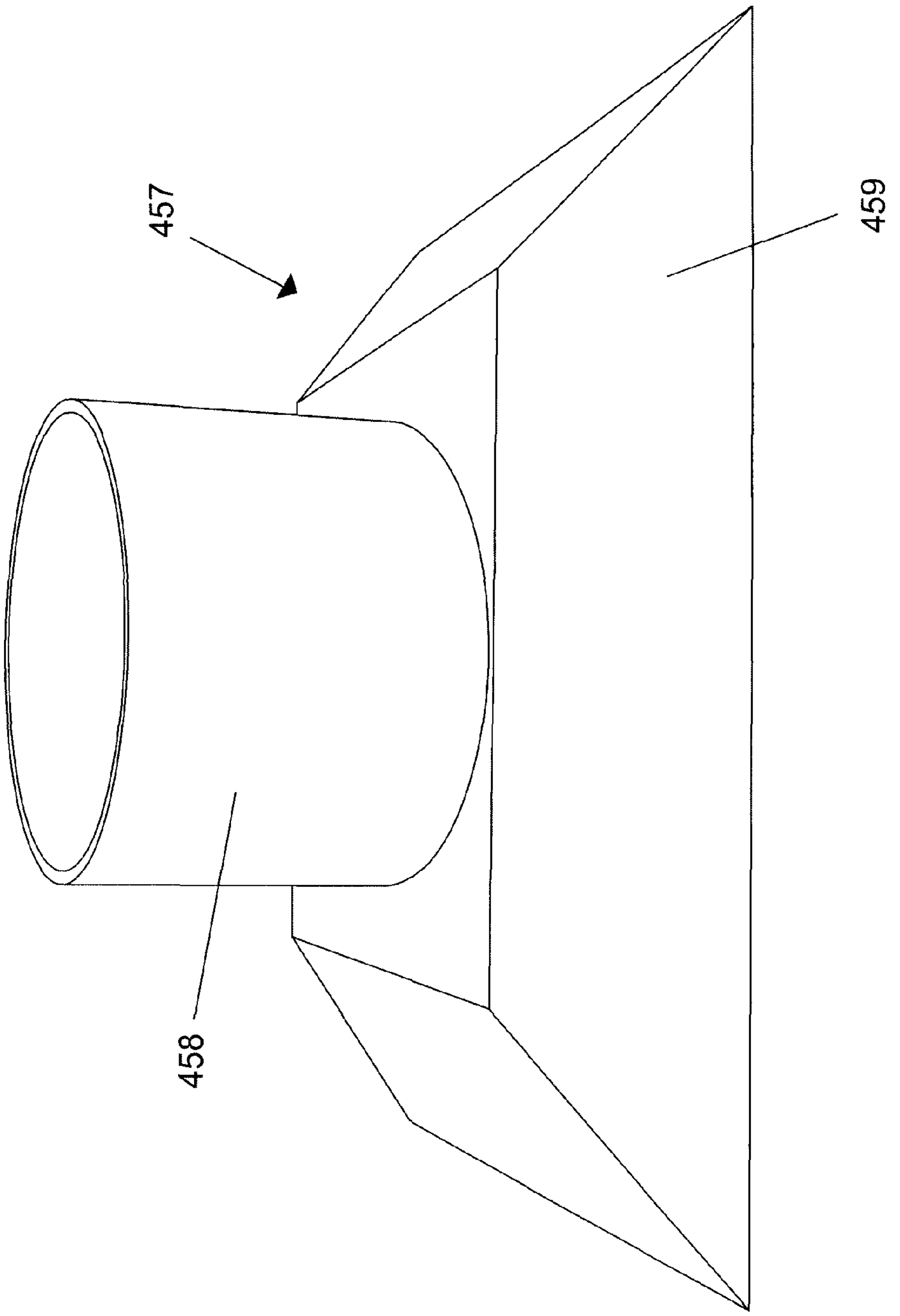
FIG. 74 shows a vacuum inlet for the T-belt return suction unit.

Similarly to the conveyor belt 372 in the dragon's tail 370, the T-belt 130 executes a return movement inside the blender feed 440, at which time proppant on the T-belt 130 is dumped off of the T-belt 130 and out through the blender feed chute 442. However, proppant particles and dust still remain on the returning T-belt 130, which proppant particles and dust can again become airborne by falling off of the returning T-belt 130. The T-belt return suction unit 455, shown in FIG. 73, sucks up this dust coming off of the returning T-belt 130. Like the blender suction unit 445, the T-belt return suction unit 455 is essentially a tubular pipe 456 with an opening cut therein to form a vacuum inlet. The T-belt return suction unit 455 is connected by a T-belt return hose to the dust collector 125. FIG. 74 shows a possible embodiment of a T-belt return suction unit 457. The T-belt return suction unit 457 comprises a vacuum inlet 459 and a connection port 458 for connecting the vacuum inlet 459 to a hose. As discussed herein above, regardless of how the proppant is delivered to the T-belt or similar conveyor, either by a proppant storage trailer or by a proppant storage device placed on the T-belt or similar conveyor, dust is always generated at the dump off into the blender hopper(s) and by the mixing or blending of the proppant, so the vacuum dust collection devices relating to the end of the T-belt and the blender area are necessary to control dust generated there.

Figure 75:
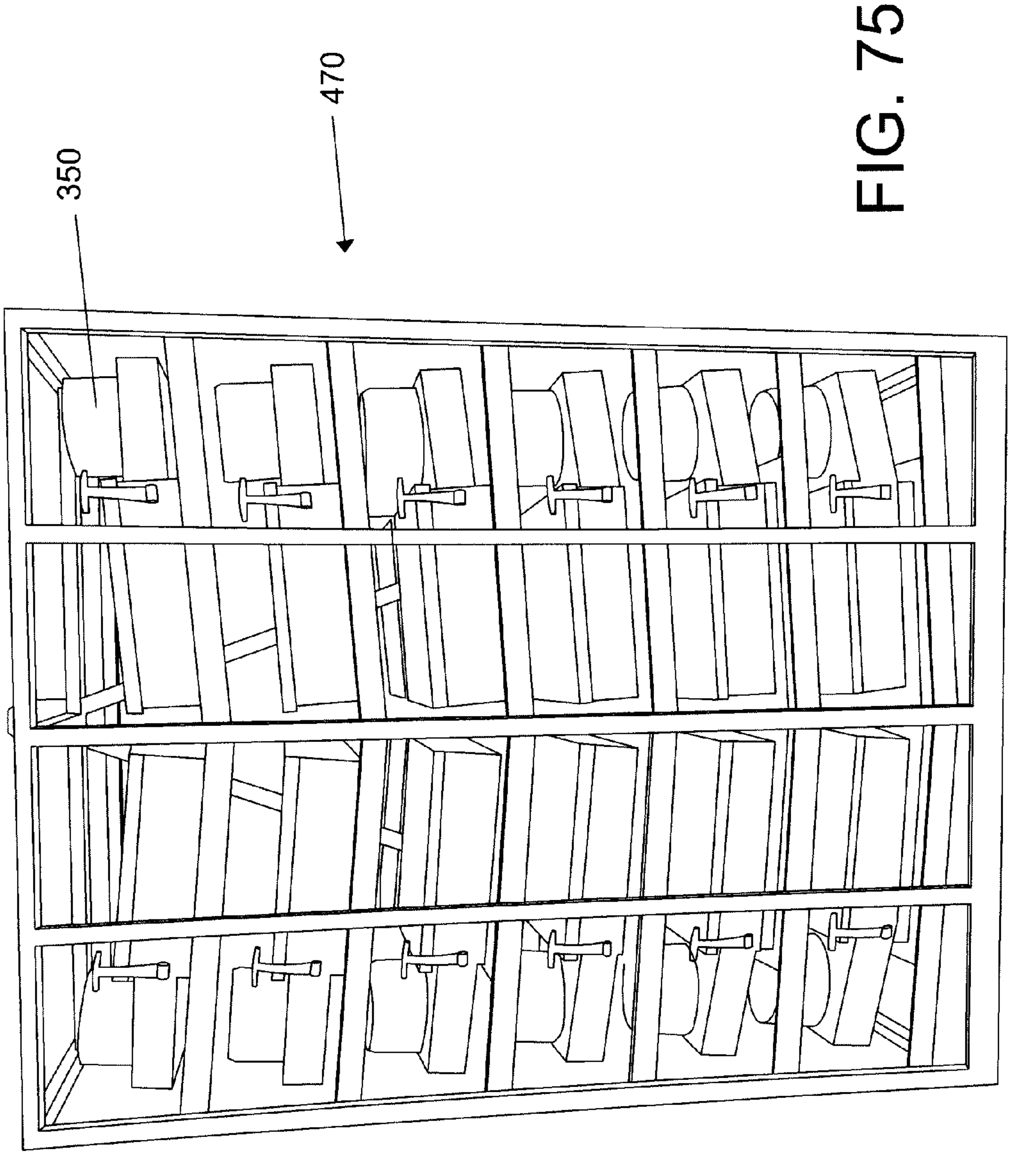
FIG. 75 shows an embodiment of the door storage.

FIG. 75 shows a door storage 470 used for storing and transporting door assemblies 350. In the embodiment shown, 24 separate door assemblies 350 can be stored in the door storage 470. There are a total of 24 pairs of side guide brackets. Each pair is configured to support a door assembly 350 thereon. The door assemblies 350 are inserted through an open side and slid on the side guide brackets until the door assemblies 350 come to rest against rear guide brackets. The side guide brackets are angled slightly so as to urge the door assembly 350 slide inwardly, and to minimize the sliding of the door assemblies 350 out of the door storage 470 during transport or handling of the door storage 470. In at least one possible embodiment, the dimensions of the frame of the door storage 470 can be approximately 80"×60"×60". However, it is to be understood that the dimensions of the door storage 470 can be varied depending on the size of the door assemblies 350 and the number of door assemblies 350 to be transported.

Figure 76:
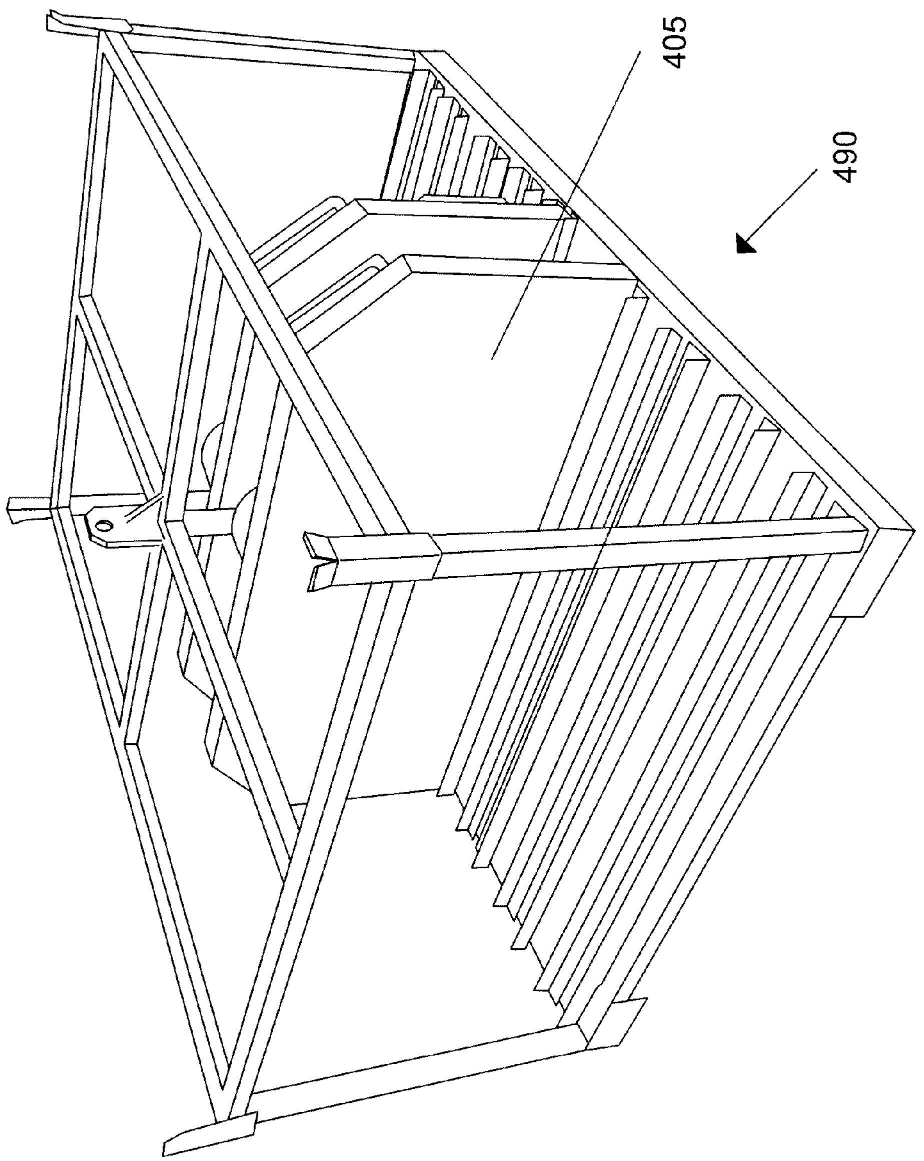
FIG. 76 shows an embodiment of the T-belt suction unit storage.

FIG. 76 shows a T-belt suction unit storage 490 used for storing and transporting the T-belt suction units 405. The T-belt suction unit storage 490 includes a plurality of guide brackets arranged in pairs, between which the T-belt suction units 405 are slid until they contact a rear guide bracket. In at least one possible embodiment, the dimensions of the frame of the T-belt suction unit storage 490 can be approximately 64"×48"×29". However, it is to be understood that the dimensions of the T-belt suction unit storage 490 can be varied depending on the size of the T-belt suction units 405 and the number of T-belt suction units 405 to be transported. In addition, the embodiment shown in FIG. 76 includes corner guide brackets. These corner guide brackets are used to center and stabilize an embodiment of the door storage 470 when it is positioned upon the T-belt suction unit storage 490.

Figure 77:
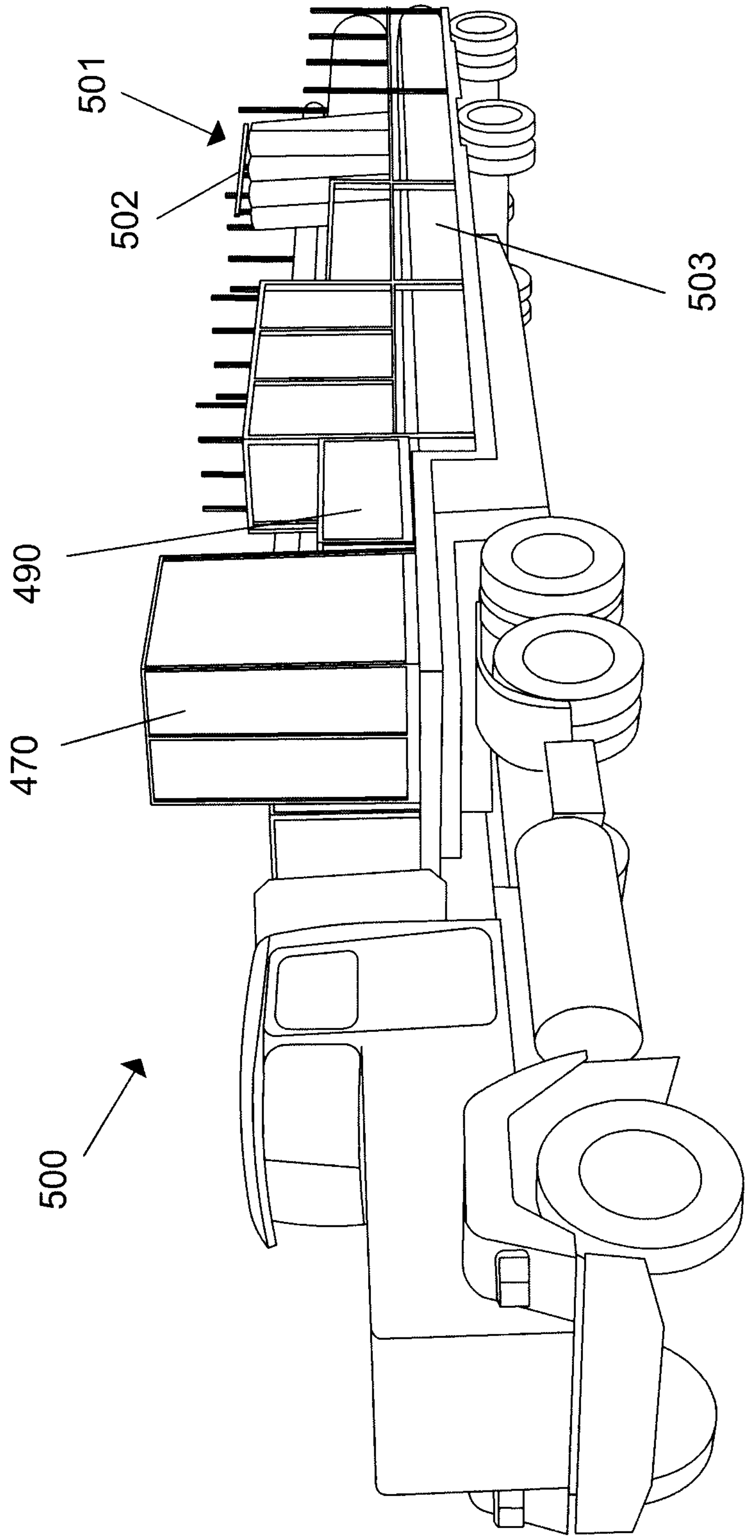
FIGS. 77 and 78 show views of a loaded transport trailer.
Figure 78:
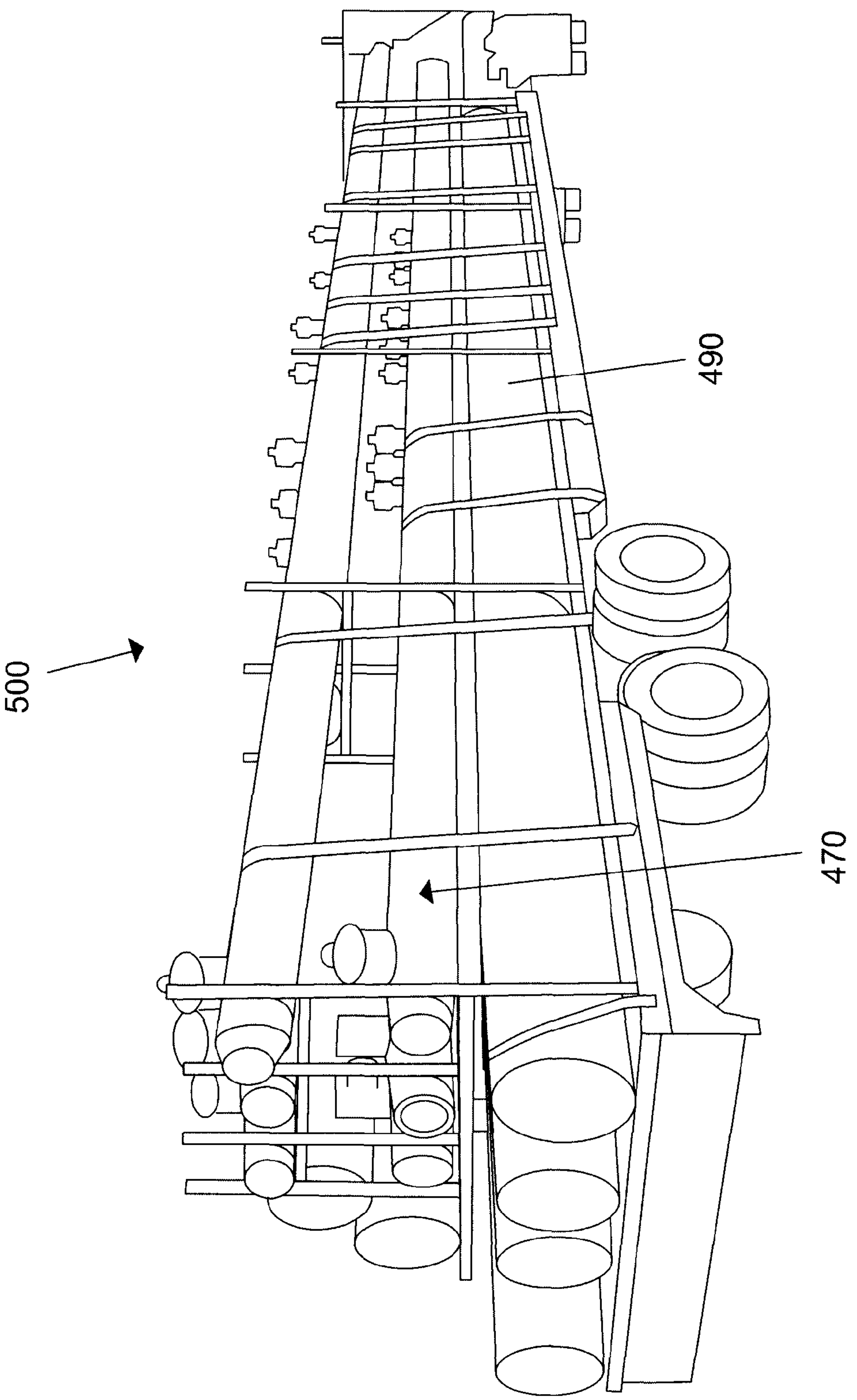

FIGS. 77 and 78 show views of a loaded transport trailer 500. The door storage 470 and the T-belt suction unit storage 490 have been loaded thereon. The transport trailer 500 includes a compressible hose holder 501. Compressible or flexible hoses or pipes are placed over or between guide structures, such as guideposts, and then compressed. The compressed hoses or pipes are held in place by a crossbar 502. In at least one possible embodiment, the compressible hose holder 501 is pivotably mounted on the transport trailer 500, such that it can be tipped away from the body of the transport trailer 500 so that the compressed hoses or pipes can be easily removed for installation into the dust collection system. Much of the framework of the transport trailer 500 is elevated so as to create a storage space 503 for storage of long rigid pipes. In FIG. 78, long pipe storage space 503 is visible, as well as the storage framework 504 for the manifolds 334. A walkway is located between the two side sections of the storage framework.

Figure 79:
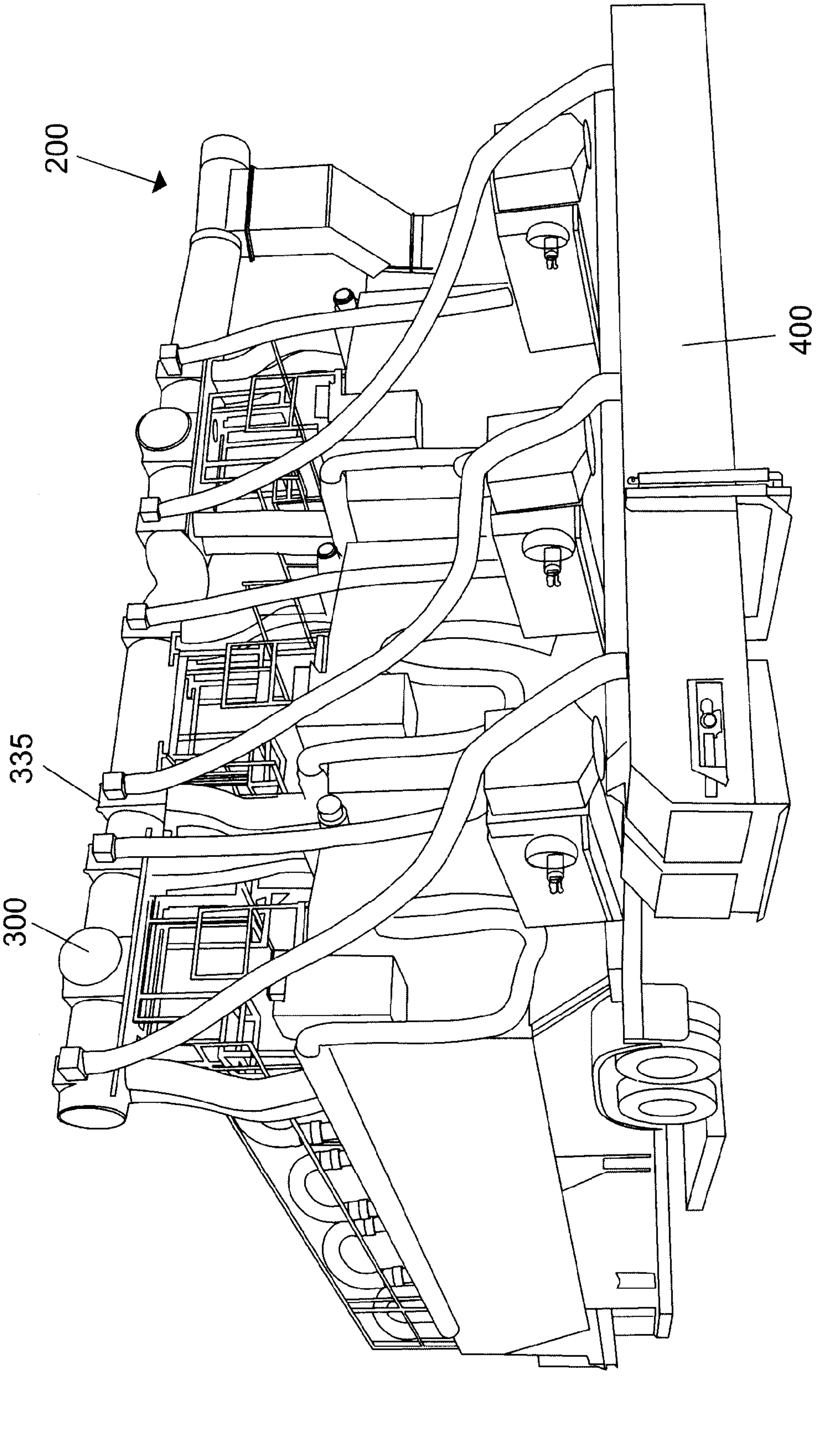
FIG. 79 shows an additional overall view of an embodiment of the installed dust collection system.

FIG. 79 shows an additional overall view of an embodiment of the installed dust collection system.

According to at least one possible embodiment, the operation of the dust collection system could involve the following steps for a worker installing, operating, and/or maintaining the dust collection system. The first part of the method is the startup procedure. The operator first performs a complete walk around inspection of the dust collection system, checking that the system is installed properly, and that all pins, keepers, and safety devices are installed properly. Next, all fluid levels on the dust collector and air compressor unit are checked. These fluids include fuel levels, engine oil levels, coolant levels, and hydraulic fluid levels (hydraulic level is on the dust collector only). If any of these levels are not in operating range, damage could occur. When these checks are complete, the engine on the dust collector can be started. The operator should make sure that the orange and red lights go out on the display. The dust collector should be allowed to warm up for approximately five minutes. The clutch on the suction fan is then engaged, which should be done slowly otherwise damage could occur to the fan clutch. One way to promote safe startup is to use the one finger method, which involves the operator placing his or her index finger on the clutch handle using slight pressure. Once suction fan speed matches engine RPM, the clutch is forced into the locked position. Finally, both airline connection valves are opened and then the air compressor is started (this will relieve air pressure on the pump and allow the air compressor to start easier). Once the engine starts, the valves are closed and the compressor is allowed to warm up for 5 minutes (operator should refer to the air compressor manufacturer's recommended startup procedures).

Once startup is complete, the system is ready to commence dust collection. To do so, the operator opens the valve on the air compressor that supplies air to the dust collector. The regulator on the dust collector should read 90 psi. The air dryer is turned on and all three drain valves on the water filters are opened slightly. Next, the purge system is activated by a switch located under the magnehelic gauge. The gauge will illuminate green and the dust collector should begin to purge. A final walk around inspection is performed to check for suction leaks, making sure that caps at the end of aluminum manifolds are installed along with caps on unused ports on connector boxes. The operator should check that the right, center and left suction doors are open. If the suction doors are closed, the operator should first check that the engine is at an idle before opening the suction doors. To open or close doors there are toggles on the left rear of machine that operate air actuated valves. During fracking or sand trailer loading, the dust collector is operated between 1300 and 1900 RPM's, which are determined by the amount of suction needed to perform a specific task. During sand trailer or proppant storage trailer filling operations, the operator should open only valves needed for dust collection, and make sure that valves that are not needed are in the off position (the handle is pointing down). During fracking operations, the operator should check periodically that dust collection boxes on the T-belt do not interfere with sand falling from the dragon's tail. When the frack stage is complete and sand trailer loading is finished, the dust collector's filters can be allowed to purge. This operation should be done at low idle for more effective filter cleaning. If the magnehelic gauge reads above 6 during high RPM use, the filtration system needs to be purged.

The dust collector can be emptied only when there is no need for dust collection. To do so, first turn the purge control off. The green illuminated light should go out. The suction fan is still engaged and the dust collector is operated at low idle. At this time the side access doors may be opened to determine whether unloading is necessary. The operator can inspect the material without removing safety screens. If the collection bin needs to be emptied, the suction fan is disengaged and the air compressor is shut down as discussed herein below. The valves on front of the discharge augers are opened. The handles should be perpendicular to the valve body. If the handle is parallel to the valve body, the valve is closed. A bag is placed under the unloading auger and then tied to the discharge chute. The operator then walks to the rear of the dust collector and engages the unloading auger. The handle should remain in a detent position for unloading. It is only possible to unload one auger at a time. All augers should then be turning. If one or more of the augers are not turning, there is likely a blockage that needs to be addressed before unloading resumes. Augers should be activated unsupervised. While unloading it is acceptable for the operator to tap the sides of the dust collector with a rubber mallet to help material fall into the auger. Once half of the bin is empty, the appropriate steps of bin unloading should be performed for the other half. The operator should monitor the unloading to be sure that material is flowing into the bag and not backing up in discharge tube. When the bins are emptied, the augers are disengaged and the discharge chute valves are closed.

The shutdown procedures may involve the following steps. First, with the suction fan engaged at an idle speed, the dust collector is brought down to a low idle. The air compressor ignition is turned to the off position, and excess air pressure is relieved by opening both airline connection valves. The suction fan can then be disengaged. A swift blow with the operator's hand will disengage the clutch. The purge system is then turned to the off position (illuminated green light will go out). Failure to do these steps will drain the dust collector's battery. The air dryer is then turned off, and the dust collector ignition is turned to the off position.

U.S. Provisional Patent Application 61/786,274, filed Mar. 14, 2013, U.S. patent application Ser. No. 13/606,913, filed on Sep. 7, 2012, U.S. patent application Ser. No. 13/416,256, filed on Mar. 9, 2012, U.S. Provisional Patent Application 61/451,435, filed Mar. 10, 2011, U.S. Provisional Patent Application 61/590,233, filed Jan. 24, 2012, and U.S. Provisional Patent Application 61/601,875, filed Feb. 22, 2012, are hereby incorporated by reference as if set forth in their entirety herein.

One feature or aspect of an embodiment is believed at the time of the filing of this patent application to possibly reside broadly in a method of reducing silicosis caused by inhalation of silica-containing granular material comprising a proppant, said method comprising the steps of: moving said silica-containing granular material comprising particles of different sizes from a first location to a second location; during said moving, separating said particles of smaller sizes of said particles of different sizes into air and forming a crystalline silica dust cloud at least one position between said first location and said second location; at each said at least one position between said first location and said second location, removing a substantial portion of said dust from said crystalline silica dust cloud, with an arrangement for sucking away a substantial portion of said crystalline silica dust cloud and filtering the dust sucked away; continuing moving said silica-containing granular material to said second location; utilizing said silica-containing granular material as a proppant; and said step of moving said silica-containing granular material comprises loading said silica-containing granular material into a storage container.

Another feature or aspect of an embodiment is believed at the time of the filing of this patent application to possibly reside broadly in the method of reducing silicosis wherein: said method further comprises venting air from said storage container during loading of said silica-containing granular material and thereby venting smaller-sized particles of said silica-containing granular material into air and forming crystalline silica dust clouds; and said step of removing a substantial portion of said dust from said crystalline silica dust cloud comprises sucking away a substantial portion of said vented smaller-sized particles.

Yet another feature or aspect of an embodiment is believed at the time of the filing of this patent application to possibly reside broadly in the method of reducing silicosis wherein: said step of moving said silica-containing granular material comprises loading said silica-containing granular material into a blender and thereby separating smaller-sized particles of said silica-containing granular material into air and forming crystalline silica dust clouds; and said step of removing a substantial portion of said dust from said crystalline silica dust cloud comprises sucking away a substantial portion of said smaller-sized particles in crystalline silica dust clouds adjacent said blender.

Still another feature or aspect of an embodiment is believed at the time of the filing of this patent application to possibly reside broadly in the method of reducing silicosis wherein: said step of moving said silica-containing granular material comprises: moving said silica-containing granular material from said storage container to a first conveyor belt; moving said silica-containing granular material from said first conveyor belt to a second conveyor belt and thereby separating smaller-sized particles of said silica-containing granular material into air and forming crystalline silica dust clouds; moving said silica-containing granular material from said second conveyor belt to a T-belt conveyor and thereby separating smaller-sized particles of said silica-containing granular material into air and forming crystalline silica dust clouds; and moving said silica-containing granular material from said T-belt conveyor to said blender; and said step of removing a substantial portion of said dust from said crystalline silica dust cloud comprises sucking away a substantial portion of said smaller-sized particles in crystalline silica dust clouds adjacent said conveyor belts.

A further feature or aspect of an embodiment is believed at the time of the filing of this patent application to possibly reside broadly in the method of reducing silicosis wherein said steps of sucking away a substantial portion of said smaller-sized particles in crystalline silica dust clouds comprise: activating a vacuum system; drawing air through intake openings of said vacuum system disposed adjacent the positions at which crystalline silica dust clouds are formed; sucking air and crystalline silica dust through air ducts; and collecting said crystalline silica dust in a collecting device.

Another feature or aspect of an embodiment is believed at the time of the filing of this patent application to possibly reside broadly in the method of reducing silicosis wherein said step of sucking air and crystalline silica dust through air ducts comprises one of: sucking air and dust through air ducts connected to said storage container; and sucking air and dust through air ducts disposed within and/or formed integrally with the body of said storage container.

One feature or aspect of an embodiment is believed at the time of the filing of this patent application to possibly reside broadly in an arrangement for reducing silicosis caused by inhalation of silica-containing granular material comprising a proppant, said apparatus being configured to remove a substantial portion of crystalline silica dust from crystalline silica dust clouds formed from the moving of silica-containing granular material comprising particles of different sizes from a first location to a second location, said arrangement comprising: at least one intake disposed adjacent at least one position at which smaller-sized particles of silica-containing granular material are separated from particles of different sizes into air and form a crystalline silica dust cloud; said at least one intake being configured to remove a substantial portion of said dust from an adjacent crystalline silica dust cloud; an apparatus being configured to generate a vacuum force to suck in, through said at least one intake, a substantial portion of dust from an adjacent crystalline silica dust cloud; an air duct arrangement being configured to conduct air and crystalline silica dust therethrough; and a collection device being configured to collect crystalline silica dust received from said air duct arrangement.

Another feature or aspect of an embodiment is believed at the time of the filing of this patent application to possibly reside broadly in the arrangement in combination with a storage container configured to store silica-containing granular material, wherein air ducts are disposed within and/or are formed integrally with the body of said storage container.

Yet another feature or aspect of an embodiment is believed at the time of the filing of this patent application to possibly reside broadly in the combination, wherein: said storage container comprises outlets covered by doors; said doors being openable to permit air to vent through said outlets and to allow workers to monitor the fill level of silica-containing granular material in said storage container upon filling of said storage container with silica-containing granular material; said at least one intake comprises a plurality of intakes, wherein one of said intakes is formed into a side wall of each of said outlets; said storage container comprises a plurality of intake air ducts disposed beneath the roof of said storage container, wherein each of said intake air ducts is connected to a corresponding intake; and said storage container comprises a main air duct arrangement connected to said intake air ducts, which main air duct arrangement comprises one of: a longitudinal air duct disposed adjacent a central portion of said storage container and to run along the length of said storage container; and two longitudinal air ducts disposed along the sides of said storage container and to run along the length of said storage container.

Still another feature or aspect of an embodiment is believed at the time of the filing of this patent application to possibly reside broadly in the combination, wherein: each of said storage container intakes comprises a valve configured to open and close said storage container intakes; said intake air ducts are disposed transverse to the length of said storage container; said storage container comprises an exhaust duct disposed at an end of said storage container and configured to conduct dust and air received from said main air duct arrangement of said storage container; and said exhaust duct comprises a small air intake and a large air intake configured to be connected to a vacuum arrangement configured to collect dust produced by the transport of silica-containing granular material on a T-belt conveyor disposed transverse to the length of the storage container.

A further feature or aspect of an embodiment is believed at the time of the filing of this patent application to possibly reside broadly in the combination, wherein: said storage container comprises a conveyor belt intake and a lower connecting duct configured to connect said conveyor belt intake to said exhaust duct; said conveyor belt intake is disposed adjacent a transition between a first conveyor belt and a second conveyor belt configured to convey silica-containing granular material from said storage container to a T-belt conveyor; said conveyor belt intake is configured to collect dust produced by the transport of silica-containing granular material from a first conveyor belt to a second conveyor belt; and said exhaust duct is configured to be connected to an exhaust duct of at least one other storage container to form a single exhaust.

Another feature or aspect of an embodiment is believed at the time of the filing of this patent application to possibly reside broadly in the combination, wherein: said plurality of storage container intakes are disposed in two groups; said main air duct arrangement comprises said longitudinal air duct, which is disposed between said two groups of intakes; and said storage container comprises an upper connecting duct configured to connect said longitudinal air duct to said exhaust duct.

Yet another feature or aspect of an embodiment is believed at the time of the filing of this patent application to possibly reside broadly in the arrangement, wherein: said collection device comprises a manifold having at least one air intake opening; said air duct arrangement comprises: a plurality of tubes configured to operatively connect said collection device to said at least one intake; at least one manifold arrangement configured to be connected by said tubes to a storage container to receive dust collected from a storage container; connector arrangements connected to said manifold arrangements; table arrangements configured to support said connector arrangements adjacent a storage container; a ninety-degree step manifold arrangement configured to permit the making of turns with said tubes and a right or left hand orientation; a dual-riser manifold arrangement and dual riser arrangements; said dual-riser manifold comprises round tubing and rectangular mating flanges attached to said round tubing to permit the mating of said round tubing to said dual riser arrangements; and said dual riser arrangements are configured to take the vacuum from the vacuum source and elevate the air or vacuum to a desired height; and said air duct arrangement is configured to conduct air and dust into said manifold arrangements, then into said connector arrangements then into said ninety-degree step manifold arrangement, then into said dual-riser manifold arrangement, then into said dual riser arrangements, and then into said collection device.

Still another feature or aspect of an embodiment is believed at the time of the filing of this patent application to possibly reside broadly in the arrangement, wherein: said air duct arrangement comprises a T-belt manifold arrangement configured to be disposed adjacent a blender at the end of a T-belt conveyor; said T-belt manifold arrangement is configured to remove a substantial portion of dust from a crystalline silica dust cloud formed at least one blender; said air duct arrangement comprises a blender feed belt riser arrangement configured to take vacuum from said vacuum apparatus and elevate the air to a desired elevation; said air duct arrangement is configured to conduct air and dust into said T-belt manifold arrangement, then into said blender feed belt riser arrangement, and then into said collection device; said air duct arrangement comprises at least one tube connector configured to connect large diameter pipe with a steel, plastic, or aluminum alignment insert, an elastic water tight sock, and an elastic strap; said collection device comprises air filter units; said manifold further comprises a tube and an articulated duct; and said articulated duct is articulated at a hinge and is movable by a hydraulic piston or arm to permit the upper portion of said articulated duct to be retracted downwardly for storage during the movement of said collection device, and to be extended upwardly to be connected to said air duct arrangement.

Yet another feature or aspect of an embodiment is believed at the time of the filing of this patent application to possibly reside broadly in the arrangement in combination with a storage container configured to store silica-containing granular material, wherein air ducts are disposed within and/or are formed integrally with the body of said storage container.

Still another feature or aspect of an embodiment is believed at the time of the filing of this patent application to possibly reside broadly in the combination, wherein: said storage container comprises outlets covered by doors; said doors being openable to permit air to vent through said outlets and to allow workers to monitor the fill level of silica-containing granular material in said storage container upon filling of said storage container with silica-containing granular material; said at least one intake comprises a plurality of intakes, wherein one of said intakes is formed into a side wall of each of said outlets; said storage container comprises a plurality of intake air ducts disposed beneath the roof of said storage container, wherein each of said intake air ducts is connected to a corresponding intake; and said storage container comprises a main air duct arrangement connected to said intake air ducts, which main air duct arrangement comprises one of: a longitudinal air duct disposed adjacent a central portion of said storage container and to run along the length of said storage container; and two longitudinal air ducts disposed along the sides of said storage container and to run along the length of said storage container. each of said storage container intakes comprises a valve configured to open and close said storage container intakes; said intake air ducts are disposed transverse to the length of said storage container; said storage container comprises an exhaust duct disposed at an end of said storage container and configured to conduct dust and air received from said main air duct arrangement of said storage container; said exhaust duct comprises a small air intake and a large air intake configured to be connected to a vacuum arrangement configured to collect dust produced by the transport of silica-containing granular material on a T-belt conveyor disposed transverse to the length of the storage container; said storage container comprises a conveyor belt intake and a lower connecting duct configured to connect said conveyor belt intake to said exhaust duct; said conveyor belt intake is disposed adjacent a transition between a first conveyor belt and a second conveyor belt configured to convey silica-containing granular material from said storage container to a T-belt conveyor; said conveyor belt intake is configured to collect dust produced by the transport of silica-containing granular material from a first conveyor belt to a second conveyor belt; and said exhaust duct is configured to be connected to an exhaust duct of at least one other storage container to form a single exhaust.

A further feature or aspect of an embodiment is believed at the time of the filing of this patent application to possibly reside broadly in the combination, wherein: said plurality of storage container intakes are disposed in two groups; said main air duct arrangement comprises said longitudinal air duct, which is disposed between said two groups of intakes; and said storage container comprises an upper connecting duct configured to connect said longitudinal air duct to said exhaust duct.

One feature or aspect of an embodiment is believed at the time of the filing of this patent application to possibly reside broadly in a method of handling pneumoconiosis-causing proppant, which proppant comprises sand, ceramic, or other particulates, said method comprising the steps of: selecting a proppant material having a grain size of between 12 to 140 mesh and having a sphericity, crush resistance, and solubility sufficient for use as a proppant; blowing said proppant into a storage container; during blowing, disturbing said proppant and forcing proppant dust into the air, and thereby generating at least one proppant dust cloud; removing a substantial portion of said proppant dust from said at least one proppant dust cloud, with an arrangement for sucking away a substantial portion of said at least one proppant dust cloud, and filtering the proppant dust sucked away; moving said proppant from said storage container to a blender; during moving, disturbing said proppant and forcing proppant dust into the air, and thereby generating a proppant dust cloud at least one position between said storage container and said blender; at each said at least one position between said storage container and said blender, removing a substantial portion of said proppant dust from said proppant dust cloud, with said arrangement for sucking away a substantial portion of said proppant dust cloud, and filtering the proppant dust sucked away; continuing moving said proppant to said blender; and blending said proppant with fluid materials to form a mixture comprising about 95-99% water and about 1-5% proppant and other chemicals, which chemicals comprise at least one of: hydrochloric acid, methanol propargyl, polyacrylamide, glutaraldehyde, ethanol, ethylene glycol, alcohol, and sodium hydroxide.

Another feature or aspect of an embodiment is believed at the time of the filing of this patent application to possibly reside broadly in a method, wherein: said step of disturbing said proppant and forcing proppant dust into the air comprises venting air and proppant dust through outlets in said storage container; and said step of removing a substantial portion of said proppant dust from said at least one proppant dust cloud comprises sucking air and proppant dust through a plurality of intakes, wherein one of said intakes is formed into a side wall of each of said outlets.

Yet another feature or aspect of an embodiment is believed at the time of the filing of this patent application to possibly reside broadly in a method, wherein: said step of removing a substantial portion of said proppant dust from said at least one proppant dust cloud comprises conducting air and proppant dust from said plurality of intakes through a plurality of intake air ducts disposed beneath a roof of said storage container, wherein each of said intake air ducts is connected to a corresponding intake, and then out through an exhaust arrangement.

One feature or aspect of an embodiment is believed at the time of the filing of this patent application to possibly reside broadly in a method of reducing silicosis in workers caused by inhalation of $SiO_2$ dust, said method comprising the steps of: placing collection door arrangements over vent openings on top of a $SiO_2$-containing proppant storage trailer, which collection door arrangements comprise a vacuum portion and a door portion, which vacuum portion supplies a vacuum to the inside of the $SiO_2$-containing proppant storage trailer to suck out dust from the interior of the $SiO_2$-containing proppant storage trailer; connecting openings in said collection door arrangements to a vacuum source with a flexible hose to a manifold; connecting said manifold operatively to a source of vacuum, which source of vacuum comprises a vacuum pump arrangement and a source of power such as an internal combustion engine configured to drive said vacuum pump arrangement; activating said vacuum source; blowing said $SiO_2$-containing proppant from a pneumatic tanker into said $SiO_2$-containing proppant storage trailer, and thereby blowing $SiO_2$ dust into air and forming $SiO_2$-dust-laden air in said $SiO_2$-containing proppant storage trailer; providing a sufficient vacuum through said flexible hose to suck out dust from the interior of the $SiO_2$-containing proppant storage trailer and thus minimizing escape of dust from said vent openings on top of a $SiO_2$-containing proppant storage trailer; opening a door of at least one of said collection door arrangements to permit viewing into the interior of said $SiO_2$-containing proppant storage trailer; removing, by vacuum suction, a portion of said $SiO_2$-dust-laden air through said connecting opening in said collection door arrangement upon said portion of said $SiO_2$-dust-laden air approaching said open door, and thereby minimizing escape of said portion of said $SiO_2$-dust-laden air out through said open door; conducting said removed portion of said $SiO_2$-dust-laden air to a $SiO_2$ dust collector; collecting dust from said portion of said $SiO_2$-dust-laden air in said $SiO_2$ dust collector; dropping $SiO_2$-containing proppant onto a conveyor belt arrangement and generating $SiO_2$-dust-laden air; moving, with said conveyor belt arrangement, $SiO_2$-containing proppant from said $SiO_2$-containing proppant storage trailer to a $SiO_2$-containing proppant mixing arrangement configured to prepare said $SiO_2$-containing proppant for use in a hydraulic fracturing process; dropping said $SiO_2$-containing proppant from said conveyor belt into said $SiO_2$-containing proppant mixing arrangement and creating $SiO_2$-dust-laden air; providing a vacuum at said conveyor belt arrangement, where $SiO_2$-dust-laden air is generated, through at least one inlet operatively connected to said vacuum source, and sucking up $SiO_2$-dust-laden air; providing a vacuum at said $SiO_2$-containing proppant mixing arrangement, where $SiO_2$-dust-laden air is generated, through at least one inlet operatively connected to said vacuum source, and sucking up $SiO_2$-dust-laden air; conducting said $SiO_2$-dust-laden air to said $SiO_2$ dust collector; collecting dust from said $SiO_2$-dust-laden air in said $SiO_2$ dust collector; putting the collected dust in containers such as bags for immediate storage; and transporting said containers away from said hydraulic fracturing site.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

The purpose of incorporating patents, patent applications, patent publications, and other documents is solely to provide additional information relating to technical features of one or more embodiments, which information may not be completely disclosed in the wording in the pages of this application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading “Abstract of the Disclosure.” The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, said method comprising the steps of:

placing collection door vacuum arrangements, at a first location, over original observation hatch openings on top of a $SiO_2$-containing proppant storage trailer, each of which collection door vacuum arrangements comprises a vacuum portion and a door portion, which vacuum portion supplies a vacuum to the inside of the $SiO_2$-containing proppant storage trailer to suck out dust from an interior portion of the $SiO_2$-containing proppant storage trailer;

connecting openings of said collection door vacuum arrangements to a manifold using a flexible hose arrangement;

operatively connecting said manifold to a vacuum source, which vacuum source comprises a vacuum-generating pump arrangement and a source of power, such as an internal combustion engine, configured to drive said vacuum-generating pump arrangement;

activating said vacuum source and generating a negative pressure at least inside said interior portion of said $SiO_2$-containing proppant storage trailer;

blowing said $SiO_2$-containing proppant from a pneumatic tanker into said $SiO_2$-containing proppant storage trailer, and thereby blowing $SiO_2$ dust into air and forming $SiO_2$-dust-laden air in said $SiO_2$-containing proppant storage trailer;

providing a sufficient vacuum through said flexible hose arrangement to suck away dust traveling to said original observation hatch openings from the interior of the $SiO_2$-containing proppant storage trailer, to thereby minimize escape of dust from said original observation hatch openings, at least during checking, by a worker, of a proppant level in said $SiO_2$-containing proppant storage trailer during filling of said $SiO_2$-containing proppant storage trailer;

opening said door portion of one of said collection door vacuum arrangements to permit viewing through a corresponding one of said original observation hatch openings into the interior of said $SiO_2$-containing proppant storage trailer by a worker checking said proppant level in said $SiO_2$-containing proppant storage trailer;

removing, by vacuum suction, a substantial portion of said $SiO_2$-dust-laden air immediately prior to the escape thereof through said corresponding one of said original observation hatch openings upon said substantial portion of said $SiO_2$-dust-laden air approaching said open door portion, and thereby minimizing escape of said substantial portion of said $SiO_2$-dust-laden air out through said open door portion, and thereby reducing inhalation of $SiO_2$ dust by a worker checking said proppant level in said $SiO_2$-containing proppant storage trailer;

conducting, using vacuum suction, said substantial portion of said $SiO_2$-dust-laden air to a $SiO_2$ dust collector;

collecting dust from said substantial portion of said $SiO_2$-dust-laden air in said $SiO_2$ dust collector;

moving $SiO_2$-containing proppant from said $SiO_2$-containing proppant storage trailer to a conveyor belt arrangement at a second location, and then dropping the $SiO_2$-containing proppant onto said conveyor belt arrangement, and thereby generating a $SiO_2$-dust-laden air cloud;

moving, with said conveyor belt arrangement, $SiO_2$-containing proppant from said $SiO_2$-containing proppant storage trailer to a $SiO_2$-containing proppant mixing arrangement at a third location, which $SiO_2$-containing proppant mixing arrangement is configured to prepare said $SiO_2$-containing proppant for use in a hydraulic fracturing process;

dropping said $SiO_2$-containing proppant from said conveyor belt arrangement into said $SiO_2$-containing proppant mixing arrangement and creating an additional $SiO_2$-dust-laden air cloud;

providing a vacuum at said conveyor belt arrangement, where said $SiO_2$-dust-laden air cloud is generated, through at least one inlet operatively connected to said vacuum source, and sucking away $SiO_2$-dust-laden air at said conveyor arrangement, and thereby reducing inhalation of $SiO_2$ dust by workers at least adjacent said conveyor belt arrangement;

providing a vacuum at said $SiO_2$-containing proppant mixing arrangement, where said additional $SiO_2$-dust-laden air cloud is generated, through at least one inlet operatively connected to said vacuum source, and sucking away $SiO_2$-dust-laden air from said $SiO_2$-containing proppant mixing arrangement, and thereby reducing inhalation of $SiO_2$ dust by workers at least adjacent said $SiO_2$-containing proppant mixing arrangement;

conducting, through additional flexible hoses, said $SiO_2$-dust-laden air from said conveyor arrangement and said $SiO_2$-containing proppant mixing arrangement, to said $SiO_2$ dust collector;

collecting dust from said $SiO_2$-dust-laden air in said $SiO_2$ dust collector;

putting the collected dust in containers, such as bags, for immediate storage; and transporting said containers of collected dust away from said hydraulic fracturing site.

2. The method according to claim 1 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein:

each of said door portions is configured to replace a corresponding original observation hatch door on said $SiO_2$-containing proppant storage trailer;

each of said door portions comprises a door configured to cover a corresponding original observation hatch opening, and each of said vacuum portions comprises a vacuum inlet configured to connect to said flexible hose arrangement; and said method further comprises the steps of:

opening said original observation hatch doors and operatively replacing them with said door portions; and sucking away clouds of dust trying to exit through said door portions by creating a vacuum at or adjacent said door portions with said vacuum inlets of said vacuum portions.

3. The method according to claim 2 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein each of said vacuum inlets comprises a box structure disposed adjacent its corresponding one of said door portions.

4. The method according to claim 3 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein said box structure comprises a trapezoidal box structure with a connector configured to receive a vacuum hose structure of said flexible hose arrangement, such that said vacuum hose structure is disposed atop said trapezoidal box structure upon installation.

5. The method according to claim 4 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein said method further comprises the step of sucking away a substantial portion of a dust cloud trying to exit said door structure by concentrating the vacuum at said door structure and guiding sucked-away dust into said vacuum hose structure with said trapezoidal structure.

6. The method according to claim 1 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein:

said step of moving $SiO_2$-containing proppant from said $SiO_2$-containing proppant storage trailer to a conveyor belt arrangement comprises dispensing by gravity $SiO_2$-containing proppant out of the interior of said $SiO_2$-containing proppant storage trailer and onto a storage trailer conveyor belt arrangement configured to move $SiO_2$-containing proppant to said conveyor belt arrangement at said second location, and thereby generating a $SiO_2$ dust cloud at a lower portion of said $SiO_2$-containing proppant storage trailer; and said method further comprises disposing skirt traps at a lower portion of said $SiO_2$-containing proppant storage trailer and/or at said mixing arrangement, and thereby further minimizing escape of dust from under said proppant storage trailer and/or said mixing arrangement and into the surrounding environment.

7. The method according to claim 1 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein:

each of said $SiO_2$-containing proppant storage trailers comprises a storage trailer conveyor belt arrangement configured to move $SiO_2$-containing proppant to said conveyor belt arrangement at said second location; and said step of moving $SiO_2$-containing proppant from said $SiO_2$-containing proppant storage trailer to a conveyor belt arrangement comprises dispensing by gravity $SiO_2$-containing proppant out of the interior of said $SiO_2$-containing proppant storage trailer and onto said storage trailer conveyor belt arrangement, and then moving said $SiO_2$-containing proppant to said conveyor belt arrangement using said storage trailer conveyor belt arrangement.

8. The method according to claim 7 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein said method further comprises:

placing a first vacuum inlet operatively connected to said vacuum source at an end of said $SiO_2$-containing proppant storage trailer adjacent a transition between first and second conveyor belts of said storage trailer conveyor belt arrangement;

placing a second vacuum inlet operatively connected to said vacuum source beneath said second conveyor belt of said storage trailer conveyor belt arrangement; and using said first and second vacuum inlets to collect dust produced by the transport of $SiO_2$-containing proppant on said first and second conveyor belts of said storage trailer conveyor belt arrangement.

9. A method of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, said method comprising the steps of:

placing vacuum arrangements at a first location over observation openings in an upper portion of a $SiO_2$-containing proppant storage trailer, each of which vacuum arrangements comprises a vacuum portion configured to permit observation of a fill level in said $SiO_2$-containing proppant storage trailer, which vacuum portion supplies a vacuum to the inside of said $SiO_2$-containing proppant storage trailer to suck out dust from an interior portion of the $SiO_2$-containing proppant storage trailer and minimize leakage of dust from the $SiO_2$-containing proppant storage trailer;

connecting openings in said vacuum arrangements to a hose arrangement;

connecting said hose arrangement operatively to a vacuum source, which vacuum source comprises a vacuum-generating arrangement and a source of power configured to drive said vacuum-generating arrangement;

activating said vacuum source and generating a negative pressure at least inside of said $SiO_2$-containing proppant storage trailer;

moving said $SiO_2$-containing proppant from a delivery tanker into said $SiO_2$-containing proppant storage trailer, and thereby dispersing $SiO_2$ dust into air and forming $SiO_2$-dust-laden air inside said $SiO_2$-containing proppant storage trailer;

providing a sufficient vacuum through said hose arrangement to suck away dust from the interior of said $SiO_2$-containing proppant storage trailer, to thereby minimize escape of dust from said observation openings on said upper portion of a $SiO_2$-containing proppant storage trailer, at least during checking, by a worker, of a proppant level in said $SiO_2$-containing proppant storage trailer during filling of said $SiO_2$-containing proppant storage trailer;

checking the proppant level in said $SiO_2$-containing proppant storage trailer during filling through one of said observation openings of said $SiO_2$-containing proppant storage trailer;

removing, by vacuum suction, a portion of said $SiO_2$-dust-laden air cloud prior to the escape thereof through said observation opening upon said portion of said $SiO_2$-dust-laden air cloud approaching said observation opening, and thereby reducing escape of said portion of said $SiO_2$-dust-laden air cloud out through said observation opening;

conducting, using vacuum suction, said removed portion of said $SiO_2$-dust-laden air cloud to a $SiO_2$ dust collector;

collecting dust from said portion of said $SiO_2$-dust-laden air clouds in said $SiO_2$ dust collector;

moving $SiO_2$-containing proppant from said $SiO_2$-containing proppant storage trailer and onto a conveyor arrangement at a second location, and generating an additional $SiO_2$-dust-laden air cloud;

moving, with said conveyor arrangement, $SiO_2$-containing proppant into a $SiO_2$-containing proppant mixing arrangement at a third location, which $SiO_2$-containing proppant mixing arrangement is configured to prepare said $SiO_2$-containing proppant for use in a hydraulic fracturing process, and generating a yet additional $SiO_2$-dust-laden air cloud;

providing a vacuum at said conveyor arrangement, where said additional $SiO_2$-dust-laden air cloud is generated, through at least one inlet operatively connected to said vacuum source, and sucking away $SiO_2$-dust-laden air at said conveyor arrangement;

providing a vacuum at said $SiO_2$-containing proppant mixing arrangement, where said yet additional $SiO_2$-dust-laden air cloud is generated, through at least one inlet operatively connected to said vacuum source, and sucking away $SiO_2$-dust-laden air from said $SiO_2$-containing proppant mixing arrangement;

conducting said $SiO_2$-dust-laden air from said conveyor arrangement and said $SiO_2$-containing proppant mixing arrangement to said $SiO_2$ dust collector, and then collecting dust from said $SiO_2$-dust-laden air in said $SiO_2$ dust collector;

putting the collected dust in containers; and moving said containers from said hydraulic fracturing site.

10. The method according to claim 9 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein:

each of said vacuum arrangements comprising a door arrangement configured to replace a corresponding original hatch door on said $SiO_2$-containing proppant storage trailer;

each of said door arrangements comprises a door configured to cover a corresponding original observation hatch opening, and a vacuum inlet configured to connect to said hose arrangement;

said method further comprising the steps of:

opening said original door openings and operatively replacing them with said door arrangements; and sucking away clouds of dust approaching said door arrangements by creating a vacuum at said vacuum inlets of said door arrangements.

11. The method according to claim 10 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein each of said vacuum inlets comprises a box structure adjacent its corresponding one of said door arrangements.

12. The method according to claim 11 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein said box structure comprises a trapezoidal box structure with a connector configured to receive said hose structure, such that said hose structure is disposed atop said trapezoidal box structure upon installation.

13. The method according to claim 12 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein said method further comprises the step of sucking away a substantial portion of a dust cloud trying to exit said door structure by concentrating the vacuum at said door structure and guiding sucked-away dust into said hose structure with said trapezoidal structure.

14. The method according to claim 9 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein:

said step of moving $SiO_2$-containing proppant from said $SiO_2$-containing proppant storage trailer to a conveyor arrangement comprises dispensing by gravity $SiO_2$-containing proppant out of the interior of said $SiO_2$-containing proppant storage trailer and onto a storage trailer conveyor belt arrangement configured to move $SiO_2$-containing proppant to said conveyor arrangement at said second location, and thereby generating a $SiO_2$ dust cloud at a lower portion of said $SiO_2$-containing proppant storage trailer; and said method further comprises disposing skirt traps at a lower portion of said $SiO_2$-containing proppant storage trailer and/or at said mixing arrangement, and thereby further minimizing escape of dust from under said proppant storage trailer and/or said mixing arrangement and into the surrounding environment.

15. The method according to claim 9 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein:

each of said $SiO_2$-containing proppant storage trailers comprises a storage trailer conveyor belt arrangement configured to move $SiO_2$-containing proppant to said conveyor arrangement at said second location; and said step of moving $SiO_2$-containing proppant from said $SiO_2$-containing proppant storage trailer to a conveyor arrangement comprises dispensing by gravity $SiO_2$-containing proppant out of the interior of said $SiO_2$-containing proppant storage trailer and onto said storage trailer conveyor belt arrangement, and then moving said $SiO_2$-containing proppant to said conveyor arrangement using said storage trailer conveyor belt arrangement.

16. The method according to claim 15 of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, wherein said method further comprises:

placing a first vacuum inlet operatively connected to said vacuum source at an end of said $SiO_2$-containing proppant storage trailer adjacent a transition between first and second conveyor belts of said storage trailer conveyor belt arrangement;

placing a second vacuum inlet operatively connected to said vacuum source beneath said second conveyor belt of said storage trailer conveyor belt arrangement; and using said first and second vacuum inlets to collect dust produced by the transport of $SiO_2$-containing proppant on said first and second conveyor belts of said storage trailer conveyor belt arrangement.

17. A method of reducing silicosis in workers caused by inhalation of $SiO_2$ dust in a hydraulic fracturing operation during the handling and preparation of an $SiO_2$-containing proppant prior to injection of said $SiO_2$-containing proppant into a well bore, said method comprising the steps of:

placing vacuum arrangements at a first location over openings in an upper portion of a $SiO_2$-containing proppant storage trailer, each of which vacuum arrangements comprises a vacuum portion configured to permit observation of a fill level in said $SiO_2$-containing proppant storage trailer, which vacuum portion supplies a vacuum to the inside of said $SiO_2$-containing proppant storage trailer to suck out dust from an interior portion of the $SiO_2$-containing proppant storage trailer and minimize leakage of dust from the $SiO_2$-containing proppant storage trailer;

connecting openings in said vacuum arrangements to a vacuum source with a duct arrangement;

connecting said duct arrangement operatively to said vacuum source, which vacuum source comprises a vacuum-generating arrangement and a source of power configured to drive said vacuum-generating arrangement;

activating said vacuum source and generating a negative pressure at least inside of said $SiO_2$-containing proppant storage trailer;

moving said $SiO_2$-containing proppant from a delivery tanker into said $SiO_2$-containing proppant storage trailer, and thereby dispersing $SiO_2$ dust into air and forming $SiO_2$-dust-laden air inside said $SiO_2$-containing proppant storage trailer;

providing a sufficient vacuum through said duct arrangement to suck away dust from the interior of said $SiO_2$-containing proppant storage trailer, to thereby minimize escape of dust from said openings on said upper portion of a $SiO_2$-containing proppant storage trailer, at least during checking, by a worker, of a proppant level in said $SiO_2$-containing proppant storage trailer during filling of said $SiO_2$-containing proppant storage trailer;

checking the proppant level in said $SiO_2$-containing proppant storage trailer during filling through one of said openings of said $SiO_2$-containing proppant storage trailer;

removing, by vacuum suction, a portion of said $SiO_2$-dust-laden air cloud prior to the escape thereof through said opening upon said portion of said $SiO_2$-dust-laden air cloud approaching said opening, and thereby reducing escape of said portion of said $SiO_2$-dust-laden air cloud out through said opening;

conducting, using vacuum suction, said removed portion of said $SiO_2$-dust-laden air cloud to a $SiO_2$ dust collector;

collecting dust from said portion of said $SiO_2$-dust-laden air clouds in said $SiO_2$ dust collector;

moving $SiO_2$-containing proppant from said $SiO_2$-containing proppant storage trailer and onto a conveyor arrangement at a second location, and generating an additional $SiO_2$-dust-laden air cloud;

moving, with said conveyor arrangement, $SiO_2$-containing proppant into a $SiO_2$-containing proppant mixing arrangement at a third location, which $SiO_2$-containing proppant mixing arrangement is configured to prepare said $SiO_2$-containing proppant for use in a hydraulic fracturing process, and generating a yet additional $SiO_2$-dust-laden air cloud;

providing a vacuum at said conveyor arrangement, where said additional $SiO_2$-dust-laden air cloud is generated, through at least one inlet operatively connected to said vacuum source, and sucking away $SiO_2$-dust-laden air at said conveyor arrangement;

providing a vacuum at said $SiO_2$-containing proppant mixing arrangement, where said yet additional $SiO_2$-dust-laden air cloud is generated, through at least one inlet operatively connected to said vacuum source, and sucking away $SiO_2$-dust-laden air from said $SiO_2$-containing proppant mixing arrangement;

conducting said $SiO_2$-dust-laden air from said conveyor arrangement and said $SiO_2$-containing proppant mixing arrangement to said $SiO_2$ dust collector, and then collecting dust from said $SiO_2$-dust-laden air in said $SiO_2$ dust collector;

putting the collected dust in containers; and moving said containers from said hydraulic fracturing site.

* * * * *